United States Patent
Ozawa et al.

(10) Patent No.: US 7,814,406 B2
(45) Date of Patent: Oct. 12, 2010

(54) DISPLAY APPARATUS AND DISPLAY METHOD

(75) Inventors: Jun Ozawa, Nara (JP); Eiichi Naito, Kyoto (JP)

(73) Assignee: Panasonic Corporation, Osaka (JP)

( * ) Notice: Subject to any disclaimer, the term of this patent is extended or adjusted under 35 U.S.C. 154(b) by 1029 days.

(21) Appl. No.: 11/451,510

(22) Filed: Jun. 13, 2006

(65) Prior Publication Data
US 2006/0236233 A1    Oct. 19, 2006

Related U.S. Application Data

(63) Continuation of application No. PCT/JP2005/020074, filed on Nov. 1, 2005.

(30) Foreign Application Priority Data
Nov. 2, 2004    (JP)    ............... 2004-319544

(51) Int. Cl.
G06F 17/00    (2006.01)
(52) U.S. Cl. ................. 715/203; 715/202; 715/204; 715/243; 725/39; 725/40; 725/44; 725/50
(58) Field of Classification Search ........... 715/202, 715/203, 204, 243; 725/39, 40, 44, 50
See application file for complete search history.

(56) References Cited

U.S. PATENT DOCUMENTS

| | | |
|---|---|---|
| 4,977,455 A | 12/1990 | Young |
| 5,151,789 A | 9/1992 | Young |
| 5,251,846 A | 10/1993 | Rethorst |
| 5,353,121 A | 10/1994 | Young et al. |
| 5,358,156 A | 10/1994 | Rethorst |
| 5,479,266 A | 12/1995 | Young et al. |
| 5,479,268 A | 12/1995 | Young et al. |
| 5,532,754 A | 7/1996 | Young et al. |
| 5,619,274 A | 4/1997 | Roop et al. |
| 5,676,333 A | 10/1997 | Rethorst |
| 5,727,060 A | 3/1998 | Young |

(Continued)

FOREIGN PATENT DOCUMENTS

EP    1 248 459    10/2002

(Continued)

Primary Examiner—Stephen S Hong
Assistant Examiner—Matthew J Ludwig
(74) Attorney, Agent, or Firm—Wenderoth, Lind & Ponack L.L.P.

(57) ABSTRACT

Provided is a display apparatus by which a user can immediately browse necessary information in a large schedule table, and can browse also distributed information such as electronic mail at the same time, without being prevented from browsing the schedule table. The display apparatus includes: a display priority decision unit which decides a priority regarding displaying for each cell included in the schedule table; a time table display unit which decides a row and a column which include a high-priority cell, among rows and columns in the schedule table, and creates and displays a displayed part of the table which includes a part having the high-priority cell in the decided row and column; an information receiving unit which obtains communication information via a communication network; and an information notice place decision unit which displays the obtained communication information on a low-priority cell among cells in the displayed part of the table.

4 Claims, 60 Drawing Sheets

| | Channel 104 | Channel 108 |
|---|---|---|
| 7 | 00 <Quiz> Trick TV "Schoolchildren Tournament" <Casts> Aizawa Kinya, etc. | 00 <Cartoon> Robot Gacchan Much Ado "Happening in Sports Festival" <Voice> Suzuki Hiroshi |
| 8 | 00 <Historical Drama> Tokugawa Shogun | 00 <Hobby> The Fishing |
| 9 | 00 <Drama> Your Affairs | 00 <Variety Show> Comedy Paradise |
| 10 | 00 <Music> Music 10 <Casts> Tapestry, Ocean Matsumoto, Girls Group, etc. | 00 <News> News Forest: stock quotation, cabinet reshuffle draft, war front, etc. |

| | Channel 104 | Channel 108 |
|---|---|---|
| 7 | 00 <Quiz> Trick TV "Schoolchildren Tournament" <Casts> Aizawa Kinya, etc. | 00 <Cartoon> Robot Gacchan Much Ado "Happening in Sports Festival" <Voice> Suzuki Hiroshi |
| 8 | 00 <Historical Drama> Tokugawa Shogun | 00 <Hobby> The Fishing |
| 9 | 00 <Drama> Your Affairs | 00 <Variety Show> Comedy Paradise |
| 10 | 00 <Music> Music 10 | 00 <News> News Forest: Mail arrives from "Naito-san". Tomorrow's meeting is changed to start at 10:00 |

U.S. PATENT DOCUMENTS

| | | | |
|---|---|---|---|
| 5,790,198 A | 8/1998 | Roop et al. | |
| 5,808,608 A | 9/1998 | Young et al. | |
| 5,809,204 A | 9/1998 | Young et al. | |
| 5,812,205 A | 9/1998 | Milnes et al. | |
| 5,949,954 A | 9/1999 | Young et al. | |
| 6,167,188 A | 12/2000 | Young et al. | |
| 6,216,265 B1 | 4/2001 | Roop et al. | |
| 6,498,895 B2 | 12/2002 | Young et al. | |
| 6,769,127 B1 * | 7/2004 | Bonomi et al. | 725/39 |
| 6,832,385 B2 | 12/2004 | Young et al. | |
| 6,850,693 B2 | 2/2005 | Young et al. | |
| 7,151,886 B2 | 12/2006 | Young et al. | |
| 7,187,847 B2 | 3/2007 | Young et al. | |
| 7,289,982 B2 * | 10/2007 | Saito et al. | 707/3 |
| 2001/0014976 A1 | 8/2001 | Roop et al. | |
| 2001/0024564 A1 | 9/2001 | Young et al. | |
| 2002/0035727 A1 | 3/2002 | Numata et al. | |
| 2002/0157094 A1 | 10/2002 | Saito et al. | |
| 2002/0186959 A1 | 12/2002 | Young et al. | |
| 2003/0142957 A1 * | 7/2003 | Young et al. | 386/83 |
| 2003/0196202 A1 | 10/2003 | Barrett et al. | |
| 2004/0226051 A1 * | 11/2004 | Carney et al. | 725/135 |

FOREIGN PATENT DOCUMENTS

| | | |
|---|---|---|
| EP | 1 353 505 | 10/2003 |
| JP | 6-504165 | 5/1994 |
| JP | 9-83891 | 3/1997 |
| JP | 2838892 | 10/1998 |
| JP | 11-164217 | 6/1999 |
| JP | 2000-50181 | 2/2000 |
| JP | 2000-209520 | 7/2000 |
| JP | 2000-253325 | 9/2000 |
| JP | 2000-341593 | 12/2000 |
| JP | 2002-94893 | 3/2002 |
| JP | 2002-262220 | 9/2002 |
| JP | 2002-305695 | 10/2002 |
| JP | 2003-319282 | 11/2003 |
| JP | 2004-23118 | 1/2004 |

* cited by examiner

FIG. 2

| Date | Channel | Time | Title of Program | Category | Duration |
|---|---|---|---|---|---|
| 2 July | 104 | 7:00~7:55 | Trick TV | Quiz | 45 min |
| 2 July | 106 | 8:00~8:25 | Robot Special Operations | Cartoon | 25 min |
| ⋮ | ⋮ | ⋮ | ⋮ | ⋮ | ⋮ |
| ⋮ | ⋮ | ⋮ | ⋮ | ⋮ | ⋮ |

FIG. 3

| | Channel 104 | Channel 106 | Channel 108 | Channel 110 |
|---|---|---|---|---|
| 7 | 00 <Quiz> Trick TV "Schoolchildren Tournament" <Casts> Aizawa Kinya, etc. | 00 <News> Today's News: bubble economy burst, future of Japan | 00 <Cartoon> Robot Gacchan Much Ado "Happening in Sports Festival" <Voice> Suzuki Hiroshi | 00 <Drama> ⋮ ⋮ ⋮ |
| 8 | 00 <Historical Drama> Tokugawa Shogun "Shogunate Breakup" <Casts> Tamiya Kinjiro, Kokane Eiji, etc. | 00 <Documentary> Country Quest " Life in Aomori" <Science> Science 100 | 00 <Hobby> The Fishing "Search for liver fishing point" 45 <News> News | 00 <News> ⋮ ⋮ ⋮ |
| 9 | 00 <Drama> Your Affairs "Kazuya's School boycott" <Casts> Tamura Ippei, etc. | 00 <Drama> When the Sun Sets "President Laid Off" <Casts> Kimura Tadanori, etc. | 00 <Variety Show> Comedy Paradise <Casts> Sakura Chiharu, Inoue Sadao, Tanaka Utako, etc. | 00 <Hobby> ⋮ ⋮ ⋮ |
| 10 | 00 <Music> Music 10 | 00 <Education> Business English School | 00 <News> News Forest | ⋮ |
| 11 | 00 <Drama> Twenty Four Eyes | 00 <Education> Russian Language Course | 00 <Report> Two-Hour Debate <Casts> Hayashi Yoichi, Kato Takashi, etc. | ⋮ |
| 12 | 00 <Drama> Music Abroad | 00 <Education> Mathematics for University | | ⋮ |

FIG. 5

| | Channel 104 | Channel 106 | Channel 108 | Channel 110 |
|---|---|---|---|---|
| 7 | 00 <Quiz> Trick TV "Schoolchildren Tournament" <Casts> Aizawa Kinya, etc. | 00 <News> Today's News: bubble economy burst, future of Japan | 00 <Cartoon> Robot Gacchan Much Ado "Happening in Sports Festival" <Voice> Suzuki Hiroshi | 00 <Drama> ... ... ... |
| 8 | 00 <Historical Drama> Tokugawa Shogun "Shogunate Breakup" <Casts> Tamiya Kinjiro, Kokane Eiji, etc. | 00 <Documentary> Country Quest " Life in Aomori" <Science> Science 100 | 00 <Hobby> The Fishing "Search for liver fishing point" 45 <News> News | 00 <News> ... ... ... |
| 9 | 00 <Drama> Your Affairs "Kazuya's School boycott" <Casts> Tamura Ippei, etc. | 00 <Drama> When the Sun Sets "President Laid Off" <Casts> Kimura Tadanori, etc. | 00 <Variety Show> Comedy Paradise <Casts> Sakura Chiharu, Inoue Sadao, Tanaka Utako, etc. | 00 <Hobby> ... ... ... |

(Displayed Program Table indicates rows 7-9 / channels 104-106)

| 10 | 00 <Music> Music 10 | 00 <Education> Business English School |
|---|---|---|
| 11 | 00 <Drama> Twenty Four Eyes | 00 <Education> Russian Language Course |
| 12 | 00 <Drama> Music Abroad | 00 <Education> Mathematics for University |

FIG. 6

Recommended Programs

7:00~8:00
Channel 104
<Quiz> Trick TV "Schoolchildren Tournament"
<Casts> Aizawa Kinya, etc.

7:00~8:00
Channel 108
<Cartoon> Robot Gacchan Much Ado
"Happening in Sports Festival"
<Voice> Suzuki Hiroshi 10:00~11:00
Channel 104
<Music> Music 10

12:00~13:00
Channel 104
<Music> Music Abroad

FIG. 7

|   | Channel 104 | Channel 108 |
|---|---|---|
| 7 | 00 <Quiz> Trick TV "Schoolchildren Tournament" <Casts> Aizawa Kinya, etc. | 00 <Cartoon> Robot Gacchan Much Ado "Happening in Sports Festival" <Voice> Suzuki Hiroshi |
| 8 | 00 <Historical Drama> Tokugawa Shogun | 00 <Hobby> The Fishing |
| 9 | 00 <Drama> Your Affairs | 00 <Variety Show> Comedy Paradise |
| 10 | 00 <Music> Music 10 <Casts> Tapestry, Ocean Matsumoto, Girls Group, etc. | 00 <News> News Forest: stock quotation, cabinet reshuffle draft, war front, etc. |

FIG. 8

| | Channel 104 | Channel 108 |
|---|---|---|
| 7 | 00 <Quiz> Trick TV "Schoolchildren Tournament" <Casts> Aizaw... | 00 <Cartoon> Robot Gacchan Much Ado "Happening in ...al" ...ni |
| 8 | 00 <H... Dram... Shogu... | |
| 9 | 00 <D... Your A... | Show> ...dise |
| 10 | 00 <M... Music... <Casts> Tapestry, Ocean Matsumoto, Girls Group, etc. | stock quotation, cabinet reshuffle draft, war front, etc. |

Recording Reservation

Viewing Reservation

Alarm Reservation

Cancel

FIG. 9

|  | Channel 104 | Channel 108 |
|---|---|---|
| 7 | 00 <Quiz> Trick TV "Schoolchildren Tournament" <Casts> Aizawa Kinya, etc. | 00 <Cartoon> Robot Gacchan Much Ado "Happening in Sports Festival" <Voice> Suzuki Hiroshi |
| 8 | 00 <Historical Drama> Tokugawa Shogun | 00 <Hobby> The Fishing ▶ |
| 9 | 00 <Drama> Your Affairs | 00 <Variety Show> Comedy Paradise |
| 10 | 00 <Music> Music 10 <Casts> Tapestry, Ocean Matsumoto, Girls Group, etc. ▼ | 00 <News> News Forest: stock quotation, cabinet reshuffle draft, w▶ front, etc. |

FIG. 13

(a) Program Table of Last Week

| | Channel 104 | Channel 106 | Channel 108 |
|---|---|---|---|
| 7 | 00 <Quiz> Trick TV "Schoolchildren Tournament" <出演者> Aizawa Kinya, etc. | 00 <News> Today's News: financial meltdown, future of banks | 00 <Cartoon> Robot Gacchan Much Ado "Happening in Sports Festival" <Voice> Suzuki Hiroshi |
| 8 | 00 <Historical Drama> Tokugawa Shogun "Shogunate Breakup" <Casts> Tamiya Kinjiro, Kokane Eiji, etc. | 00 <Documentary> Country Quest "Life in Okayama" 30 <Science> Science 100 | 00 <Hobby> The Fishing "Search for surf fishing point" 45 <News> News |
| 9 | 00 <Drama> Your Affairs "Tomorrow's miracle" <Casts> Tamura Ippei, etc. | 00 <Drama> When the Sun Sets "Laid off starts" <Casts> Kimura Tadanori, etc. | 00 <Variety Show> Comedy Paradise <Casts> Sakura Chiharu, Inoue Sadao, Tanaka Utako, etc. |
| 10 | 00 <Music> Music 10 | 00 <Education> Business English School | 00 <News> News Forest |
| 11 | 00 <Drama> Twenty Four Eyes | 00 <Education> Russian Language Course | 00 <Report> Two-Hour Debate |
| 12 | 00 <Drama> Music Abroad | 00 <Education> Mathematics for University | <Casts> Hayashi Yoichi, Kato Takashi, etc. |

(b) Program Table of Today

| | Channel 104 | Channel 106 | Channel 108 |
|---|---|---|---|
| | 00 <Quiz> Trick TV "Schoolchildren Tournament" <Casts> Aizawa Kinya, etc. | 00 <News> Today's News: bubble economy burst, future of Japan | 00 <Cartoon> Iron Baseball Player "Go to Koshien" <Voice> Satomi Isao, etc. |
| | 00 <Historical Drama> Tokugawa Shogun "Shogunate Breakup" <Casts> Tamiya Kinjiro, Kokane Eiji, etc. | 00 <Documentary> Country Quest "Life in Aomori" 30 <Science> Science 100 | 00 <Hobby> The Fishing "Search for river fishing point" 45 <News> News |
| | 00 <Drama> Your Affairs "Kazuya's School boycott" <Casts> Tamura Ippei, etc. | 00 <Drama> When the Sun Sets "President Laid Off" <Casts> Kimura Tadanori, etc. | 00 <Variety Show> Comedy Paradise <Casts> Sakura Chiharu, Inoue Sadao, Tanaka Utako, etc. |
| | 00 <Sports> Olympic Hours: men's free style 100M, results of swimming | 00 <Education> Business English School | 00 <News> News Forest |
| | | 00 <Education> Russian Language Course | 00 <Report> Two-Hour Debate |
| | 00 <Music> Music Abroad | 00 <Education> Mathematics for University | <Casts> Hayashi Yoichi, Kato Takashi, etc. |

FIG. 14

| | Channel 104 | Channel 108 |
|---|---|---|
| 7 | 00 <Quiz><br>Trick TV<br>"Schoolchildren Tournament"<br><Casts><br>Aizawa Kinya, etc. | 00 <Cartoon><br>Iron Baseball Player "Go to Koshien"<br><Voice><br>Satomi Isao, etc. |
| 8 | 00 <Historical Drama><br>Tokugawa Shogun | 00 <Hobby><br>The Fishing |
| 9 | 00 <Drama><br>Your Affairs | 00 <Variety Show><br>Comedy Paradise |
| 10 | 00 <Sports><br>Olympic Hours: men's free style 100M, results of swimming | 00 <News><br>News Forest: stock quotation, cabinet reshuffle draft, war front, etc. |

FIG. 16

(a) Program Table of Last Week

| | Channel 104 | Channel 106 | Channel 108 |
|---|---|---|---|
| | 00 <Quiz> Trick TV "Schoolchildren Tournament" <Casts> Aizawa Kinya, etc. | 00 <News> Today's News: bubble economy burst, future of Japan | 00 <Cartoon> Iron Baseball Player "Go to Koshien" <Voice> Satomi Isao, etc. |
| | 00 <Historical Drama> Tokugawa Shogun "Shogunate Breakup" <Casts> Tamiya Kinjiro, Kokane Eiji, etc. | 00 <Documentary> Country Quest "Life in Aomori" 30 <Science> Science 100 | 00 <Hobby> The Fishing "Search for liver fishing point" 45 <News> News |
| | 00 <Drama> Your Affairs "Kazuya's School boycott" <Casts> Tamura Ippei, etc. | 00 <Drama> When the Sun Sets "President Laid Off" <Casts> Kimura Tadanori, etc. | 00 <Variety Show> Comedy Paradise <Casts> Sakura Chiharu, Inoue Sadao, Tanaka Utako, etc. |
| | 00 <Sports> Olympic Hours: men's free style 100M, results of swimming | 00 <Education> Business English School | 00 <News> News Forest |
| | | 00 <Education> Russian Language Course | 00 <Report> Two-Hour Debate <Casts> Hayashi Yoichi, Kato Takashi, etc. |
| | 00 <Music> Music Abroad | 00 <Education> Mathematics for University | |

(b) Program Table of Today

| | Channel 104 | Channel 106 | Channel 108 |
|---|---|---|---|
| 7 | 00 <Quiz> Trick TV "Schoolchildren Tournament" <Casts> Aizawa Kinya, etc. | 00 <News> Today's News: financial meltdown, future of banks | 00 <Cartoon> Iron Baseball Player "Go to Koshien" <Voice> Satomi Isao, etc. |
| 8 | 00 <Historical Drama> Tokugawa Shogun "Shogunate Breakup" <Casts> Tamiya Kinjiro, Kokane Eiji, etc. | 00 <Documentary> Country Quest "Life in Okayama" 30 <Science> Science 100 | 00 <Hobby> The Fishing "Search for surf fishing point" 45 <News> News |
| 9 | 00 <Drama> Your Affairs "Tomorrow's miracle" <Casts> Tamura Ippei, etc. | 00 <Drama> When the Sun Sets "Laid off starts" <Casts> Kimura Tadanori, etc. | 00 <Variety Show> Comedy Paradise <Casts> Sakura Chiharu, Inoue Sadao, Tanaka Utako, etc. |
| 10 | 00 <Music> Music 10 | 00 <Education> Business English School | 00 <News> News Forest |
| 11 | 00 <Drama> Twenty Four Eyes | 00 <Education> Russian Language Course | 00 <Report> Two-Hour Debate <Casts> Hayashi Yoichi, Kato Takashi, etc. |
| 12 | 00 <Drama> Music Abroad | 00 <Education> Mathematics for University | |

FIG. 17

|  | Schedule Table | Channel 108 |
|---|---|---|
| 7 | 7:00~<br>9:00<br>Meeting in<br>Suminoe-ku<br>@ citizen hall | \<Cartoon\><br>Iron Baseball<br>Player "Go to<br>Koshien"<br>\<Voice\><br>Satomi Isao, etc. |
| 8 |  | 00 \<Hobby\><br>The Fishing |
| 9 |  | 00 \<Variety Show\><br>Comedy Paradise |
| 10 |  | 00 \<News\><br>News Forest: stock<br>quotation, cabinet<br>reshuffle draft,<br>war front, etc. |

FIG. 18

| | Channel 104 | Channel 108 |
|---|---|---|
| 7 | 00 <Quiz> Trick TV "Schoolchildren Tournament" <Casts> Aizawa Kinya, etc. | 00 <Cartoon> Robot Gacchan Much Ado "Happening in Sports Festival" <Voice> Suzuki Hiroshi |
| 8 | 00 <Historical Drama> Tokugawa Shogun | 00 <Hobby> The Fishing |
| 9 | 00 <Drama> Your Affairs | 00 <Variety Show> Comedy Paradise |
| 10 | 00 <Music> Music 10 <Casts> Tapestry, Ocean Matsumoto, Girls Group, etc. | 00 <News> News Forest: stock quotation, cabinet reshuffle draft, war front, etc. |

| | 104 | 106 | 108 | 110 | 112 |
|---|---|---|---|---|---|
| 7 | | | | | |
| 8 | | | | | |
| 9 | | | | | |
| 10 | | | | | |
| 11 | | | | | |
| 12 | | | | | |
| 13 | | | | | |
| 14 | | | | | |

FIG. 22

| Display Region | Height | Width | Display Region (number of pixels) |
|---|---|---|---|
| R1 | 80 | 80 | 6400 |
| R2 | 50 | 80 | 4000 |
| R3 | 70 | 80 | 5600 |
| R4 | 50 | 80 | 4000 |
| R5 | 50 | 80 | 4000 |
| R6 | 50 | 160 | 8000 |
| R7 | 100 | 80 | 8000 |

FIG. 23

|   | Channel 104 | Channel 108 |
|---|---|---|
| 7 | 00 <Quiz> Trick TV "Schoolchildren Tournament" <Casts> Aizawa Kinya, etc. | 00 <Cartoon> Robot Gacchan Much Ado "Happening in Sports Festival" <Voice> Suzuki Hiroshi |
| 8 | 00 <Historical Drama> Tokugawa Shogun | 00 <Hobby> The Fishing |
| 9 | Mail arrives from "Naito-san". Tomorrow's meeting is changed to start at 10:00 ··· | |
| 10 | 00 <Music> Music 10 <Casts> Tapestry, Ocean Matsumoto, Girls Group, etc. | 00 <News> News Forest: stock quotation, cabinet reshuffle draft, war front, etc. |

FIG. 26

| Display Region | Height | Width | Aspect Ratio | Display Region |
|---|---|---|---|---|
| R1 | 80 | 80 | 1.0 | 6400 |
| R2 | 70 | 80 | 0.9 | 5600 |
| R3 | 40 | 80 | 0.5 | 3200 |
| R4 | 40 | 80 | 0.5 | 3200 |
| R5 | 110 | 80 | 1.4 | 8800 |
| R6 | 40 | 160 | 0.3 | 6400 |

| Date | Departure Time | Departure Station | Arrival Time | Arrival Station |
|---|---|---|---|---|
| 21 July | 7:38 | Gakuenmae | 8:12 | Namba |
| 21 July | 19:12 | Namba | 19:45 | Gakuenmae |
| 22 July | 7:38 | Gakuenmae | 8:12 | Namba |
| 22 July | 19:37 | Namba | 20:10 | Gakuenmae |
| ... | ... | ... | ... | ... |

FIG. 34

|  | For Namba (Inbound) | For Saidaiji (Outbound) |
|---|---|---|
| 5 | 55 | |
| 6 | 10, 30, 40, 50 | 10, 40, 50 |
| 7 | 0, 8, 10, 15, 23, 25, 30, 38, 40, 45, 50 | 0, 10, 15, 25, 30, 40, 45, 50 |
| 8 | 0, 10, 15, 25, 30, 40, 45, 50 | 0, 10, 15, 25, 30, 40, 45, 50 |
| 9 | 0, 10, 15, 25, 30, 40, 45, 50 | 0, 10, 15, 25, 30, 40, 45, 50 |
| 10 | 0, 10, 15, 25, 30, 40, 45, 50 | 0, 10, 15, 25, 30, 40, 45, 50 |
| 11 | 0, 10, 15, 25, 30, 40, 45, 50 | 0, 10, 15, 25, 30, 40, 45, 50 |
| ... | ... | ... |

FIG. 35

| | For Namba (Inbound) | For Saidaiji (Outbound) |
|---|---|---|
| 7 | 0, 8, 10, 15, 23, 25, 30, 38, 40, 45, 50 | 0, 10, 15, 25, 30, 40, 45, 50 |
| 8 | 0, 10, 15, 25, 30, 40, 45, 50 | 0, 10, 15, 25, 30, 40, 45, 50 |
| 9 | 0, 10, 15, 25, 30, 40, 45, 50 | 0, 10, 15, 25, 30, 40, 45, 50 |
| 18 | 0, 10, 15, 25, 30, 40, 45, 50 | 0, 10, 15, 25, 30, 40, 45, 50 |
| 19 | 0, 10, 15, 25, 30, 40, 45, 50 | 0, 8, 10, 15, 23, 25, 30, 38, 40, 45, 50 |
| 20 | 0, 10, 15, 25, 30, 40, 45, 50 | 0, 10, 15, 25, 30, 40, 45, 50 |

FIG. 37

| | For Namba (Inbound) | For Saidaiji (Outbound) |
|---|---|---|
| 7 | 0, 8, 10, 15, 23, 25, 30, 38, 40, 45, 50 | 0, 10, 15, 25, 30, 40, 45, 50 |
| 8 | 0, 10, 15, 25, 30, 40, 45, 50 | 0, 10, 15, 25, 30, 40, 45, 50 |
| 9 | 0, 10, 15, 25, 30, 40, 45, 50 | 0, 10, 15, 25, 30, 40, 45, 50 |
| 18 | Thank you for continuing to boarding. From 30th December to 4th January, the services are operated according to holiday time table. | 0, 10, 15, 25, 30, 40, 45, 50 |
| 19 | | 0, 8, 10, 15, 23, 25, 30, 38, 40, 45, 50 |
| 20 | 40, 45, 50 | 0, 10, 15, 25, 30, 40, 45, 50 |

FIG. 40

| Schedule ID (corresponding to each cell) | Input Date | Inputter | Job/Private | Update Number | Browsing Number | Display Importance of Cell |
|---|---|---|---|---|---|---|
| 1 | 2004/8/10 | Sato | Job | 2 | 2 | 10.1 |
| 2 | 2004/8/11 | Tanaka | Private | 1 | 1 | 5.5 |
| 3 | 2004/8/11 | Yamamoto | Private | 1 | 3 | 3.3 |
| ... | ... | ... | ... | ... | ... | ... |

FIG. 42

| | Channel 104 | Channel 108 |
|---|---|---|
| 7 | 00 <Quiz> Trick TV | 00 <Cartoon> Robot Gacchan Much Ado |
| | Q1 | |
| 8 | 00 <Historical Drama> Tokugawa Shogun | 00 <Hobby> The Fishing |
| 9 | 00 <Drama> Your Affairs | 00 <Variety Show> Comedy Paradise |
| 10 | 00 <Music> Music 10 | 00 <News> News Forest: |
| | Q2 | |

| | Channel 104 | Channel 108 |
|---|---|---|
| 7 | 00 <Quiz> Trick TV "Schoolchildren Tournament" <Casts> Aizawa Kinya, etc. | 00 <Cartoon> Robot Gacchan Much Ado "Happening in Sports Festival" <Voice> Suzuki Hiroshi |
| 8 | 00 <Historical Drama> Tokugawa Shogun | 00 <Hobby> The Fishing |
| 9 | 00 <Drama> Your Affairs | 00 <Variety Show> Comedy Paradise |
| 10 | 00 <Music> Music 10 <Casts> Tapestry, Ocean Matsumoto, Girls Group, etc. | 00 <News> News Forest: stock quotation, cabinet reshuffle draft, war front, etc. |

FIG. 43

| | Channel 104 | Channel 108 |
|---|---|---|
| 7 | 00 <Quiz> Trick TV "Schoolchildren Tournament" <Casts> Aizawa Kinya, etc. | 00 <Cartoon> Robot Gacchan Much Ado "Happening in Sports Festival" <Voice> Suzuki Hiroshi |
| 8 | 00 <Historical Drama> Tokugawa Shogun | 00 <Hobby> The Fishing |
| 9 | 00 <Drama> Your Affairs | 00 <Variety Show> Comedy Paradise |
| 10 | 00 <Music> Music 10 <Casts> Tapestry, Ocean Matsumoto, Girls Group, etc. | 00 <News> News Forest: stock quotation, cabinet reshuffle draft, war front, etc. |

| | Channel 104 | Channel 108 |
|---|---|---|
| 7 | 00 <Quiz> Trick TV "Schoolchildren Tournament" <Casts> Aizawa Kinya, etc. | 00 <Cartoon> Robot Gacchan Much Ado "Happening in Sports Festival" <Voice> Suzuki Hiroshi |
| 8 | 00 <Historical Drama> Tokugawa Shogun | 00 <Hobby> The Fishing |
| 9 | 00 <Drama> Your Affairs | 00 <Variety Show> Comedy Paradise |
| 10 | 00 <Music> Music 10 | 00 <News> News Forest: Mail arrives from "Naito-san". Tomorrow's meeting is changed to start at 10:00 |

FIG. 45

| | Channel 104 | Channel 108 |
|---|---|---|
| 7 | 00 <Quiz> Trick TV "Schoolchildren Tournament" <Casts> Aizawa Kinya, etc. | 00 <Cartoon> Robot Gacchan Much Ado "Happening in Sports Festival" <Voice> Suzuki Hiroshi |
| 8 | 00 <Historical Drama> Tokugawa Shogun | 00 <Hobby> The Fishing |
| 9 | 00 <Drama> Your Affairs | 00 <Variety Show> Comedy Paradise |
| 10 | 00 <Music> Music 10 <Casts> Tapestry, Ocean Matsumoto, Girls Group, etc. | 00 <News> News Forest: stock quotation, cabinet reshuffle draft, war front, etc. |

| | Channel 104 | Channel 108 |
|---|---|---|
| 7 | 00 <Quiz> Trick TV "Schoolchildren Tournament" Mail arrives from "Naito-san". Tomorrow's meeting is changed to start at 10:00 | 00 <Cartoon> Robot Gacchan Much Ado |
| 8 | 00 <Historical Drama> Tokugawa Shogun | 00 <Hobby> The Fishing |
| 9 | 00 <Drama> Your Affairs | 00 <Variety Show> Comedy Paradise |
| 10 | 00 <Music> Music 10 Mail arrives from "Sato-san". Thank you for | 00 <News> News Forest: |

FIG. 48

| | Channel 104 | Channel 108 |
|---|---|---|
| 7 | 00 <Quiz> Trick TV "Schoolchildren Tournament" <Casts> Aizawa Kinya, etc. | 00 <Cartoon> Robot Gacchan Much Ado "Happening in Sports Festival" <Voice> Suzuki Hiroshi |
| 8 | 00 <Historical Drama> Tokugawa Shogun | 00 <Hobby> The Fishing |
| 9 | 00 <Drama> Your Affairs | 00 <Variety Show> Comedy Paradise |
| 10 | Mail arrives from "Naito-san". Tomorrow's meeting is changed to start at 10:00 | 00 <News> News Forest: stock quotation, cabinet reshuffle draft, war front, etc. |

| | Channel 110 | Channel 112 |
|---|---|---|
| 7 | 00 <Quiz> Trick TV "Schoolchildren Tournament" <Casts> Aizawa Kinya, etc. | Mail arrives from "Naito-san". Tomorrow's meeting is changed to start at 10:00 Suzuki Hiroshi |
| 8 | 00 <News> Today's News | 00 <Movie> The Driver <Casts> Harris Mackie, Kaia Store, etc. |
| 9 | 00 <Drama> Tomorrow God | |
| 10 | 00 <Variety Show> Gold Mountain in Sado <Casts> Tanaka ···, Suzuki ···, etc. | 00 <Sports> Result of today's night game, tomorrow's match, golf info, etc. |

FIG. 50

| | Channel 104 | Channel 108 |
|---|---|---|
| 7 | 00 <Quiz> Trick TV "Schoolchildren Tournament" <Casts> Aizawa Kinya, etc. | 00 <Cartoon> Robot Gacchan Much Ado "Happening in Sports Festival" <Voice> Suzuki Hiroshi |
| 8 | 00 <Historical Drama> Tokugawa Shogun | 00 <Hobby> The Fishing |
| 9 | 00 <Drama> Your Affairs | 00 <Variety Show> Comedy Paradise |
| 10 | Mail arrives from "Naito-san". Tomorrow's meeting is changed to start at 10:00 | 00 <News> News Forest: stock quotation, cabinet reshuffle draft, war front, etc. |

| | Channel 104 | Channel 108 |
|---|---|---|
| 8 | 00 <Historical Drama> Tokugawa Shogun | 00 <Hobby> The Fishing |
| 9 | 00 <Drama> Your Affairs | 00 <Variety Show> Comedy Paradise |
| 10 | Mail arrives from "Naito-san". Tomorrow's meeting is changed to start at 10:00 | 00 <News> News Forest: stock quotation, cabinet reshuffle draft, war front, etc. |
| 11 | 15 <Variety Show> Stormy Desert <Casts> Kawamoto Takeshi, Sakuragi Hanamiti, etc. | 00 <Sports> Sports Highlight: today's sports, Olympic info, World Championships in athletics, etc. |

FIG. 51

| | Channel 104 | Channel 108 |
|---|---|---|
| 7 | 00 <Quiz> Trick TV "Schoolchildren Tournament" <Casts> Aizawa Kinya, etc. | 00 <Cartoon> Robot Gacchan Much Ado "Happening in Sports Festival" <Voice> Suzuki Hiroshi |
| 8 | 00 <Historical Drama> Tokugawa Shogun | 00 <Hobby> The Fishing |
| 9 | 00 <Drama> Your Affairs | 00 <Variety Show> Comedy Paradise |
| 10 | Mail arrives from "Naito-san". Tomorrow's meeting is changed to start at 10:00 | 00 <News> News Forest: stock quotation, cabinet reshuffle draft, war front, etc. |

| | 104CH | 108CH |
|---|---|---|
| 6 | 00 <Cartoon> Hanshin Spirits 30 <Cartoon> Kick's Homeland <Voice> Satonaka Satoru | Mail arrives from "Naito-san". Tomorrow's meeting is changed to start at 10:00 |
| 7 | 00 <Quiz> Trick TV "Schoolchildren Tournament" <Casts> Aizawa Kinya, etc. | 00 <Cartoon> Robot Gacchan Much Ado "Happening in Sports Festival" <Voice> Suzuki Hiroshi |
| 8 | 00 <Historical Drama> Tokugawa Shogun | 00 <Hobby> The Fishing |
| 9 | 00 <Drama> Your Affairs | 00 <Variety Show> Comedy Paradise |

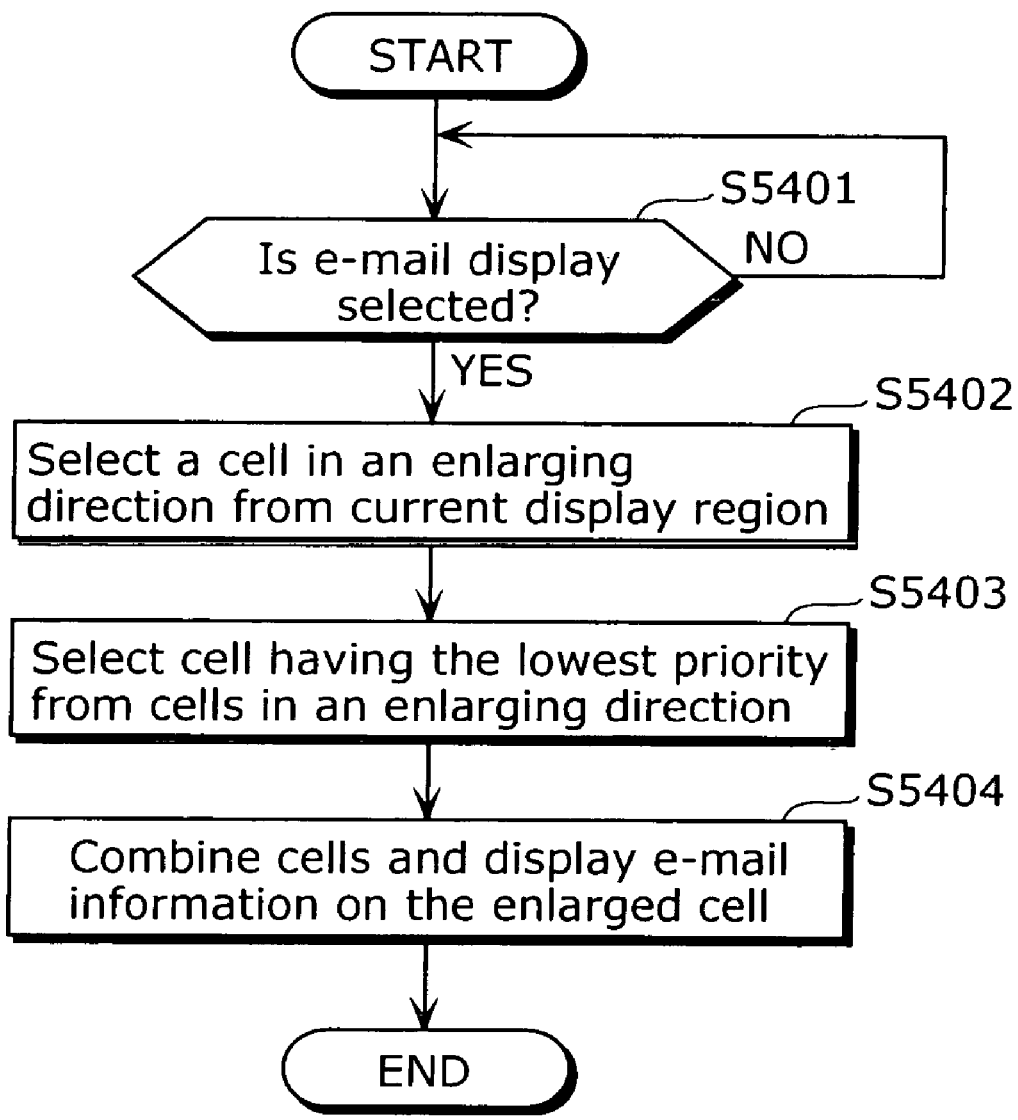

FIG. 56

| | Channel 104 | Channel 108 |
|---|---|---|
| 7 | 00 <Quiz> Trick TV "Schoolchildren Tournament" <Casts> Aizawa Kinya, etc. | 00 <Cartoon> Robot Gacchan Much Ado "Happening in Sports Festival" <Voice> Suzuki Hiroshi |
| 8 | 00 <Historical Drama> Tokugawa Shogun | 00 <Hobby> The Fishing |
| 9 | 00 <Drama> Your Affairs | 00 <Variety Show> Comedy Paradise |
| 10 | Mail arrives from "Naito-san". Tomorrow's meeting is changed to start at 10:00 | 00 <News> News Forest: stock quotation, cabinet reshuffle draft, war front, etc. |

| | Channel 104 | Channel 108 |
|---|---|---|
| 7 | 00 <Quiz> Trick TV "Schoolchildren Tournament" <Casts> Aizawa Kinya, etc. | 00 <Cartoon> Robot Gacchan Much Ado "Happening in Sports Festival" <Voice> Suzuki Hiroshi |
| 8 | Mail arrives from "Naito-san". Tomorrow's meeting is changed to start at 10:00. The place is not changed. Looking forward to your attendance. Regarding documents at the meeting, please use the same documents at the last meeting. The number of attendances is not yet certain, so that the number of copies | 00 <Hobby> The Fishing |
| 9 | | 00 <Variety Show> Comedy Paradise |
| 10 | | |

FIG. 59

| | Channel 104 | Channel 108 |
|---|---|---|
| 7 | 00 <Quiz> Trick TV "Schoolchildren Tournament" <Casts> Aizawa Kinya, etc. | 00 <Cartoon> Robot Gacchan Much Ado "Happening in Sports Festival" <Voice> Suzuki Hiroshi |
| 8 | 00 <Historical Drama> Tokugawa Shogun | "Robot Gacchan" theme music is now on sale. [Download] |
| 9 | 00 <Drama> Your Affairs | |
| 10 | 00 <Music> Music 10 <Casts> Tapestry, Ocean Matsumoto, Girls Group, etc. | 00 <News> News Forest: stock quotation, cabinet reshuffle draft, war front, etc. |

| | Channel 104 | Channel 108 |
|---|---|---|
| 7 | 00 <Quiz> Trick TV "Schoolchildren Tournament" <Casts> Aizawa Kinya, etc. | 00 <Cartoon> Robot Gacchan Much Ado "Happening in Sports Festival" <Voice> Suzuki Hiroshi |
| 8 | 00 <Historical Drama> Tokugawa Shogun | 00 <Hobby> The Fishing |
| 9 | 00 <Drama> Your Affairs | 00 <Variety Show> Comedy Paradise |
| 10 | 00 <Music> Music 10 <Casts> Tapestry, Ocean Matsumoto, Girls Group, etc. | 00 <News> News Forest: stock quotation, cabinet reshuffle draft, war front, etc. |

DISPLAY APPARATUS AND DISPLAY METHOD

CROSS REFERENCE TO RELATED APPLICATION

This is a continuation application of International Application No. PCT/JP2005/020074 filed on Nov. 1, 2005, designating the United States of America.

BACKGROUND OF THE INVENTION (1) Field of the Invention

The present invention relates to an apparatus which displays a schedule table, such as a program table, and more particularly to an apparatus which extracts a part of the schedule table and displays the extracted part.

(2) Description of the Related Art

In recent years, as digital broadcasting has become popular, various programs have been getting broadcast. Further, with the wide use of electronic program guides (hereinafter, referred to as EPG), it has become possible to check, on a television screen, a schedule of programs to be broadcast. Furthermore, with the wide use of hard disks and DVDs, recording of the programs has been getting easier.

Under such circumstances, various technologies have conventionally been proposed to aid in easily selecting a program which a user desires, from a number of broadcast programs. One of such technologies is disclosed in, for example, Japanese Patent Application Laid-Open No. 11-164217 publication, to provide a system in which user's preference for television programs is extracted based on a history of program recording reservation on a hard disk or the like, or a history of viewing programs, and then programs in matching with the preference are selected from programs to be broadcast, in order to be recommended. Another technology is disclosed in, for example, Japanese Patent Application Laid-Open No. 2000-253325 publication, to provide an apparatus which selects programs which a user desires, using information indicating whether or not recorded programs have been viewed. Still another technology is disclosed in, for example, Japanese Patent No. 2838892 publication, to provide a method of displaying an EPG in a table format arranged in broadcasting times by channels, so that a user can easily browse program information.

Still another technology is disclosed in, for example, Japanese Patent Application Laid-Open No. 2002-94893 publication and Japanese Patent Application Laid-Open No. 2004-23118 publication, to provide a method of deciding a priority of displaying program information in a program table, thereby efficiently displaying the program information. Still another technology is disclosed in, for example, Japanese Patent Application Laid-Open No. 9-83891 publication, to provide a method of deciding the priority using a program viewing history.

However, there is a problem that the above-mentioned conventional technologies lack consideration for application to apparatuses, such as a portable telephone, which have a small display area. Therefore, due to such a small area, many bothersome operations are required to search for desired program information from the program table, for example.

In general, a portable apparatus, such a portable telephone, has constraints of a limited screen size, so that it is necessary to extract, from the table or the like, only a part which a user needs, and display the extracted part. For portable telephones, a standard display screen size is 240×320 dots, 2 to 3 inches. A screen of this size generally displays 9 lines each of which contains 10 characters. Although the same screen can display up to 380 characters by reducing a font size, screens of portable telephones have display constraints more than screens of in-home apparatuses. Therefore, in order to display program information on small-sized screens, such as screens of portable telephones, it is required to conceive another technology which is different from the conventional technologies for large-sized screens, such as screens of in-home apparatuses.

In the meanwhile, a terminal, such as a portable telephone, is always connected with a communication network, so that electronic mail, information via local radio waves, information regarding geographic positions, and the like, are asynchronously distributed without a user's intention. Even if such information is distributed when the user is browsing a program table or the like, it is necessary to keep displaying the program table or the like without preventing from the browsing, and also to enable the user to check the distributed information. For example, when a user is outdoors and is checking a program table using a portable telephone in order to reserve recording of a television program, if the user's portable telephone receives electronic mail, the user needs to delete the currently displayed program table from the screen, and change the current mode to a mode of checking mail, in order to check detail of the mail. Then, after checking the detail of the mail, the user has to resume the previous operations from the displaying of the program table, even if the user has once been in the middle of the operation of program recording reservation. Thus, for a purpose of increasing portability by users, the terminal, such as a portable telephone, is obligated to have a physically small display screen, so that it is difficult to simultaneously perform plural processing (browsing of the program table and browsing of the received mail, for example) on a single screen.

SUMMARY OF THE INVENTION

Accordingly, the present invention is conceived in view of the above-described problems, and an object of the present invention is to provide a display apparatus by which a user can browse necessary information at once from a large schedule table, such as a program table, even on a small-sized screen, such as a screen of a portable telephone, and moreover, by which the user can simultaneously browse not only the schedule table but also distributed information, such as electronic mail, without being prevented from the browsing of the necessary information.

In order to achieve the above object, a display apparatus according to the present invention displays information in a table including plural cells each of which is specified by a row and a column. The display apparatus comprising: a first priority decision unit which decides a priority regarding displaying for each cell; a row and column decision unit which decides, among the rows and the columns in the table, a row and a column which include a high-priority cell decided by the first priority decision unit; a table display unit which creates and displays a displayed part of the table which includes a part having the high-priority cell in the decided row and column; and an information obtainment unit which obtains communication information via a communication network, wherein the table display unit displays the obtained communication information, on a low-priority cell among cells in the displayed part of the table.

Thereby a row and a column including a high-priority cell are displayed in a table format, so that, without performing bothersome searching operations, the user can immediately and intuitively find out the high-priority cell and browse the found cell, in checking other cells in the same row and the same column. Moreover, communication information, which is asynchronously received, is displayed as overlapped on a low-priority cell, so that, when the user is browsing information such as a program table by a terminal such as a portable telephone, even if the communication information is distributed via a communication network, the user can also browse the distributed information at the same time by the terminal, without being prevented from the browsing of the information such as a program table.

Note that the present invention can be realized, not only as the above-described display apparatus, but also as a display method, as a computer program which causes a computer to serve as the display apparatus, and as a computer-readable recording medium in which the computer program is recorded.

By the display apparatus according to the present invention, it is possible to browse necessary information at once from a large schedule table such as a program table, even on a small-sized screen, such as a screen of a portable telephone, and also possible to browse distributed information such as electronic mail at the same time, without being prevented from the browsing of the necessary information.

That is, by the display apparatus according to the present invention, a part necessary for a user is selectively displayed in a table format. Therefore, without performing bothersome display operations, it is possible to browse desired information immediately and intuitively. Further, even if the display apparatus is an apparatus having a small display area, such as a portable terminal, necessary information such as program information is efficiently provided to a user, so that, in order to perform recording reservation or the like, program information can be selected by less number of operations. Still further, even if different information is distributed via a communications network during browsing program information, the distributed information is displayed on low-priority program information, so that the user can simultaneously browse both of other program information and the distributed information, without being prevented from the browsing of necessary program information.

Thus, the present invention is a display apparatus useful as a portable telephone, an in-home television set, or the like, which needs to display information whose whole display size is larger than a display screen, so that the present invention is highly suitable for practical use.

FURTHER INFORMATION ABOUT TECHNICAL BACKGROUND TO THIS APPLICATION

The disclosures of Japanese Patent Application No. 2004-319544 filed on Nov. 2, 2004, and International Application No. PCT/JP2005/020074 filed on Nov. 1, 2005, including specifications, drawings and claims, are incorporated herein by references in their entirety.

BRIEF DESCRIPTION OF THE DRAWINGS

These and other objects, advantages and features of the present invention will become apparent from the following description thereof taken in conjunction with the accompanying drawings that illustrate specific embodiments of the present invention. In the drawings:

FIG. 2 is a diagram showing an example of a program viewing history accumulated in a viewing history external accumulation unit;

FIG. 3 is a diagram showing an example of program information accumulated in a program table accumulation unit;

FIG. 5 is a diagram showing a situation in which a part of a program table is displayed;

FIG. 6 is a diagram showing a display example of information of recommended programs;

FIG. 7 is a diagram showing a display example of a program table;

FIG. 8 is a diagram showing a display example of a pop-up menu screen overlapped on the program table;

FIG. 9 is a diagram showing a display example in which arrow icons are displayed on the program table;

FIG. 13 is a diagram showing an example of a program table of last week and a program table of a present day;

FIG. 14 is a diagram showing a display example of a program table;

FIG. 16 is a diagram explaining a new program and a special program;

FIG. 17 is a diagram showing an example in which schedule information and a program table are displayed;

FIG. 18 is a diagram showing an example in which a part of the program table is displayed, and an example in which the whole program table is displayed;

FIG. 22 is a diagram showing a size of each display region shown in FIG. 21;

FIG. 23 is a diagram showing a display example in which a text of electronic mail is overlapped on the program table;

FIG. 26 is a diagram showing an aspect ratio of each display region shown in FIG. 24;

FIG. 34 is a diagram showing an example of a time table accumulated in a time table accumulation Unit;

FIG. 35 is a diagram showing a display example of a time table;

FIG. 37 is a diagram showing a display example in which electronic mail is overlapped on the time table;

FIG. 40 is a diagram showing display importance of each cell;

FIG. 42 is a diagram showing a display example of a program table having vacant regions;

FIG. 43 is a diagram showing an example in which electronic mail and the program table are displayed;

FIG. 45 is a diagram showing an example in which a plurality of electronic mail and the program table are displayed;

FIG. 48 is a diagram showing a display example in which the program table is scrolled in a horizontal direction;

FIG. 50 is a diagram showing a display example in which the program table is scrolled in a vertical direction;

FIG. 51 is a diagram showing a display example in which the program table is scrolled in a horizontal direction;

FIG. 55 is a flowchart showing processing performed by a portable information terminal in the program distribution system;

FIG. 56 is a diagram showing an example in which the electronic mail is displayed in a combined enlarged region;

FIG. 59 is a diagram showing an example in which advertisement mail and the program table are displayed.

DESCRIPTION OF THE PREFERRED EMBODIMENT(S)

Figure 1:
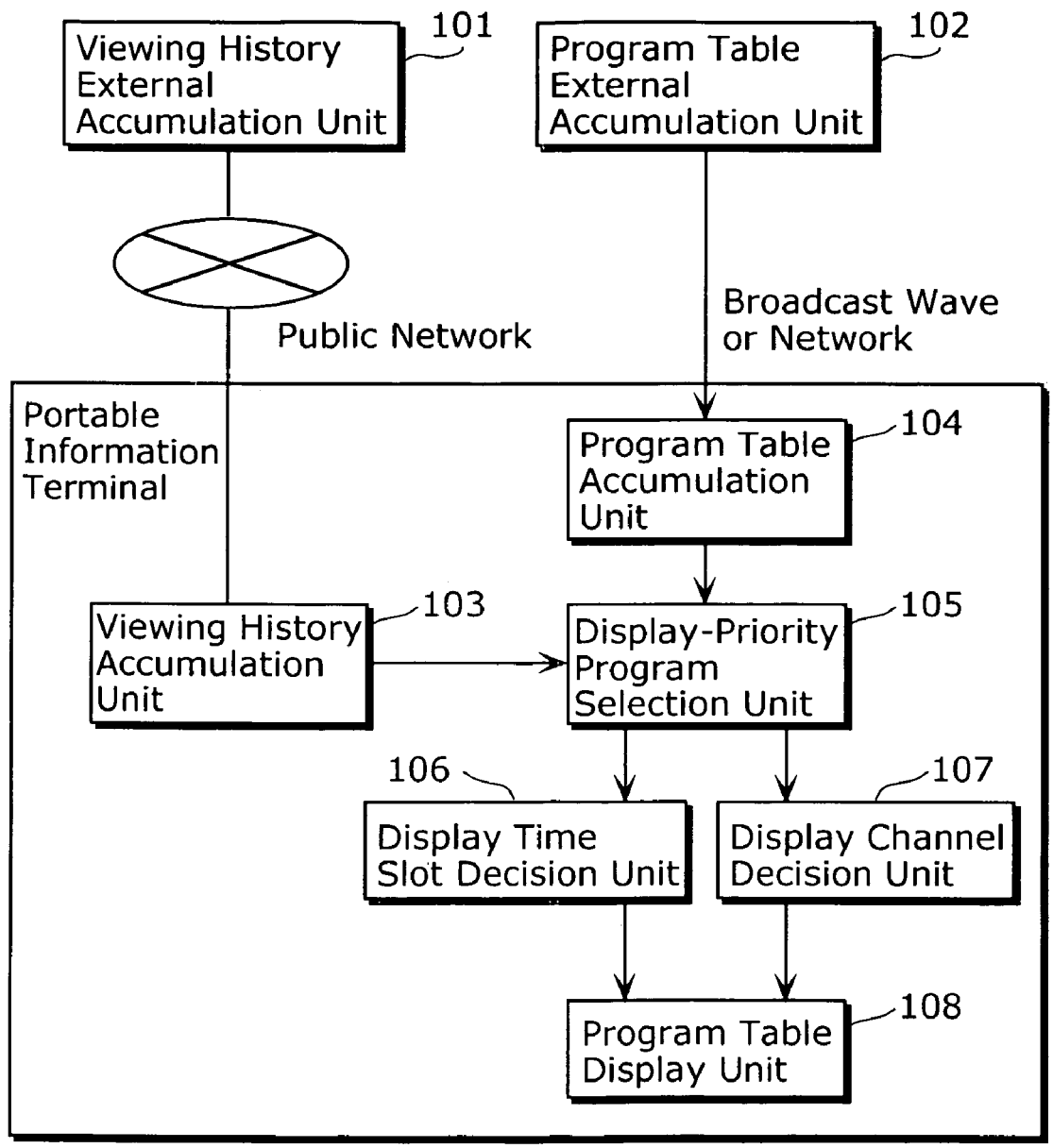
FIG. 1 is a block diagram of a program distribution system according to the first embodiment of the present invention.

A display apparatus according to the present invention displays information in a table including plural cells each of which is specified by a row and a column. The display apparatus comprising: a first priority decision unit which decides a priority regarding displaying for each cell; a row and column decision unit which decides, among the rows and the columns in the table, a row and a column which include a high-priority cell decided by the first priority decision unit; a table display unit which creates and displays a displayed part of the table which includes a part having the high-priority cell in the decided row and column; and an information obtainment unit which obtains communication information via a communication network, wherein the table display unit displays the obtained communication information, on a low-priority cell among cells in the displayed part of the table. Thereby a row and a column including a high-priority cell are displayed in a table format, so that, without performing bothersome searching operations, the user can immediately and intuitively find out the high-priority cell and browse the found cell, in checking other cells in the same row and the same column. Moreover, the communication information obtained from the outside is displayed as being overlapped on and covering a low-priority cell among the cells in the displayed part of the table, so that, when the user is browsing information such as a program table by a terminal such as a portable telephone, even if the communication information is distributed via a communication network, the user can also browse the distributed information at the same time by the terminal, without being prevented from the browsing of the information such as a program table.

Here, it is preferable that the first priority decision unit decides the priority, based on one of a program viewing history and a program recording history regarding a user of the display apparatus. Thereby information of a program which, for example, the user has viewed or recorded more frequently is displayed as priority, so that the user can easily discover the information of the program in which the user is interested.

Note that the table display unit may display the program table, so that the high-priority program information is displayed in a form different from a form of other program information, and in the cell, program information regarding detail of a program may be indicated, and the table display unit may display the program table, so that the high-priority program information is displayed in more detail as compared to low-priority program information. Thereby program information is efficiently abridged to be displayed on a small-sized screen, so that the user can easily discover high-priority program information, and also can get the information in more detail, in browsing low-priority program information positioned adjacent to the discovered information.

Note that the display apparatus according to the present invention may further include a program table accumulation unit in which a program table regarding information of already broadcast programs is accumulated, wherein the first priority decision unit (i) compares the program table regarding the information of the already broadcast programs accumulated in the program table accumulation unit, with a program table regarding information of programs to be broadcast in the future, (ii) thereby judges whether or not there is a change between plural pieces of program information corresponding to the same time slot and channel in the both program tables, and (iii) decides a high priority for the program information having the change. Thereby information of a new or special program is displayed as priority, so that the user does not need to perform particular operations for searching for the information of the new or special program.

Note that it is preferable that in the program table accumulation unit, program tables for at least past two weeks is accumulated, and the first priority decision unit (i) compares plural pieces of program information corresponding to the same time slot and channel, among a program table of two weeks ago, a program table of one week ago, and a program table of a current week, and (ii) thereby decides a low priority for program information in the program table of the current week, the program information being different from corresponding program information in the program table of one week ago, but being the same as corresponding program information in the program table of two weeks ago. Thereby, when a temporarily broadcasted special program is changed back to a regular program next week, it is possible to prevent that the regular program is erroneously treated as a new program.

Here, the communication information obtained by the information obtainment unit may have a two-dimensional display shape, and the table display unit may display the communication information on a low-priority cell having a shape whose aspect ratio is similar to an aspect ratio of the communication information. Thereby, when information such as an image is distributed, the information such as an image can be displayed maintaining a layout (aspect ratio) of the information. In addition, even if the information is large, the information can be displayed covering a part of the schedule table without hiding a high-priority cell.

Note that the information obtainment unit may obtain, as the communication information, electronic mail sent to a user of the display apparatus, and the table may be a time table of transportation, the cell may be a frame in which a departure time is indicated, the departure time corresponding to a combination of a departure time slot and a destination of the transportation, and the first priority decision unit may decide the priority, based on a history of using the transportation by a user of the display apparatus.

Note that the table display unit may display a pop-up menu on a part in the displayed part of the table, when a cell is selected from the displayed part of the table, the pop-up menu providing an operation instruction option regarding the selected cell. Thereby the user can immediately perform subsequent necessary operations for the selected cell.

Note that the table display unit may display the displayed part of the table together with an icon, when in the whole table there is a high-priority cell which is not included in the displayed part of the table, the icon indicating a position of the cell. Thereby, the user can be notified of existence of another high-priority cell which is not displayed on the screen, and of an approximate position of the cell, and eventually the user can easily access the cell.

Note that the table may be schedule information indicating a schedule of a user, and the first priority decision unit may decide the priority, based on at least one of (i) indication inputted in each cell in the table, (ii) a user who inputs the indication, (iii) the number of times the indication is checked, and (iv) the number of times the indication is updated. Thereby, even in the case of a private schedule table, the same effects as described for the program table and the time table can be obtained.

Note that the table display unit may further display the whole table, in order to show which part in the whole table corresponds to the displayed part of the table, and the table display unit may (i) select the high-priority cell from the cells in the displayed part of the table, by sequentially moving among such high-priority cells, according to an instruction from a user, and (ii) display the selected cell in a different form from a form of other cells. Thereby the user can easily understand where a part displayed on the screen is positioned in the whole schedule table, and also can select only high-priority cells by sequentially switching the target cell at a high speed among only the high-priority cells.

Note that in the cell, program information regarding detail of a program may be indicated, the table display unit may include a program information detail degree change unit which changes a detail degree of the program information displayed in the cell, and the table display unit may display the communication information at a vacant region in the cell, the vacant region being generated due to the changing of the detail degree of the program information by the program information detail degree change unit. Here, it is preferable that the table display unit displays the communication information at a vacant region in a lowest-priority cell decided by the first priority decision unit, when there are plural cells having vacant regions, for example. It is also preferable that the table display unit displays the communication information at vacant regions in plural cells, when there are the plural cells having the vacant regions. Thereby when, for example, the communication information such as electronic mail is received thereby causing interruption, the user can read the electronic mail in browsing the program information at the same time.

Further, the display apparatus according to present invention may further include: a scroll instruction input unit which receives an instruction for scrolling the table; and a display position change judgment unit which judges whether or not a display position on a screen of the communication information displayed by the table display unit is to be changed, based on one of a direction and an amount of the scrolling, when the scroll instruction input unit receives the instruction, wherein the table display unit displays the table, by scrolling the table according to the instruction received by the scroll instruction input unit, and the table display unit (i) changes the display position, when the display position change judgment unit judges that the display position is to be changed, and (ii) displays the communication information at the changed display position. Here, it is preferable that the display position change judgment unit judges that the display position on the screen of the communication information is not to be changed, when the scroll instruction input unit receives the instruction, and one of the direction and the amount of the scrolling enables a cell hidden under the communication information to be displayed. Thereby it is automatically judged whether the scrolling operation enables the user to browse (i) a cell hidden under the displayed communication information such as electronic mail, or (ii) cells which have not been displayed on the screen, so that loads of user's operations can be reduced.

Further, the display apparatus according to present invention may further include: a display selection input unit which receives selection of the communication information displayed by the table display unit; and a display position enlargement judgment unit which (i) judges that the selected communication information is to be displayed at a display region enlarged from a current display region, when the display selection input unit receives the selection, and (ii) decide the enlarged region, wherein the table display unit displays the communication information at the enlarged region decided by the display position enlargement judgment unit. Here, it is preferable that the display position enlargement judgment unit decides, as the enlarged display region, a region including a low-priority cell decided by the first priority decision unit. Thereby, when an amount of the communication information such as electronic mail is large, it is possible, with a simple operation, to enlarge a place for displaying the information, so that the user can check the communication information at one view.

Further, the display apparatus according to the present invention may further include: a program relevance degree calculation unit calculates a relevance degree between the communication information obtained by the information obtainment unit and each cell in the program table; and a second priority decision unit which decides a priority regarding displaying for program information in each cell, based on the relevance degree calculated by the program relevance degree calculation unit, wherein the table display unit displays the communication information on a low-priority cell decided by the second priority decision unit. Here, it is preferable that the second priority decision unit decides a priority for a cell positioned near a cell having a high relevance degree calculated by the program relevance degree calculation unit, the priority being lower than a priority of the cell having the high relevance degree. For example, if the communication information is music information related to certain program information, it is preferable that the program relevance degree calculation unit calculates a high relevance degree for a cell of the program information to which the music information obtained by the information obtainment unit is related, and the table display unit displays the communication information on a cell positioned near the cell of the program information to which the music information is related. Thereby, when the communication information obtained from the outside is related to certain program information, the communication information is displayed near a cell of the program information, so that it is possible, without special operations, to browse the communication information and the related program information simultaneously on the same screen.

The following describes embodiments according to the present invention with reference to the drawings.

Like a schedule table as typified by a program table, a time table, or the like, in which information is displayed according to time, displaying in a table format enables a user to more easily check, with a quick view, time relationships in the whole table. For this reason, a program table, a time table, or the like is often displayed in a table format. On the other hand, when information of programs, which is to be browsed by a user as priority, is selected and displayed based on a user's program viewing history or the like, it is possible, as shown in FIG. 6, to display broadcasting times, channels, and details of the programs in a text format. However, when the user wishes to know a relationship of the program broadcasting times, or know whether or not the presented programs are to be broadcast on the same channel, the user needs to check times and channels of the respective programs. Thus, as compared to the displaying in such a text format in which the program information is merely listed, the displaying in a table format as shown in FIG. 5 makes it easier to check various information on a quick view, for example, to check a relationship of program broadcasting times, or check whether or not programs are to be broadcast on the same channel. Note that a hatched part in the accompanying drawings is a display with a special color, a highlighted display, or the like, and such a part shows program information to be browsed by the user as priority.

However, when information of recommended programs and the like is displayed in a table format, the table sometimes includes many unnecessary parts (hereinafter, referred to as cells). For example, in a program table, information of programs, in which the user is not interested, is sometimes displayed. To solve this, in the following embodiments, provided is an apparatus which displays, in a table format, information of high-priority programs such as recommended programs, and also displays the information efficiently by modifying indication in cells in the table.

The following describes the first to eighth embodiments of the present invention. In these embodiments, an example of the present invention for which protection is claimed is equivalent to each of program distribution systems described in the third to eighth embodiments. The first and second embodiments relate to a program distribution system which includes only a basic part of the program distribution system of the third to eighth embodiments. In other words, the first and second embodiments relate to a display apparatus which includes elements of the present invention for which protection is claimed, except an information obtainment unit and the like. That is, the first and second embodiments describe a functional part (a function of displaying a schedule table) which is shared by the program distribution systems of the third to eighth embodiments. These first to eighth embodiments are described sequentially below.

First Embodiment

FIG. 1 is a block diagram of a program distribution system according to the first embodiment. This program distribution system is a system which distributes a program, a program table representing a schedule table, and the like, to a portable information terminal via broadcast waves or a communication network. The program distribution system includes a viewing history external accumulation unit 101, a program table external accumulation unit 102, a viewing history accumulation unit 103, a program table accumulation unit 104, a display-priority program selection unit 105, a display time slot decision unit 106, a display channel decision unit 107, and a program table display unit 108. Note that the units 103 to 108 are modules included in the portable information terminal, such as a portable telephone. Note also that the program table is one example of a table having cells, each of which is specified by a row and a column.

The viewing history external accumulation unit 101 is a hard disk, a computer apparatus, or the like, in which a program viewing history of a user is accumulated. In the viewing history external accumulation unit 101, the history of programs which the user has viewed by a television set, a recording apparatus, or the like, is accumulated in a format as shown in FIG. 2. As shown in FIG. 2, the user has viewed, on 2nd of July, on Channel 104, from 7:00 to 7:55, "Trick TV" in a category of "Quiz", for 45 minutes, for example. Thus, it is possible to extract information regarding user's preference, from the accumulated program viewing history using statistical processing.

The program table external accumulation unit 102 is a storage apparatus in which information of already broadcasted programs, currently broadcasting programs, and programs to be broadcast in the future, is accumulated. Where the information is accumulated may be a server, a database in a broadcast station, a private hard disk at home, or the like.

The viewing history accumulation unit 103 is a storage unit, in which a program viewing history necessary for selecting programs is selected from the program viewing histories accumulated in the viewing history external accumulation unit 101, and the selected program viewing history is accumulated. Examples of this viewing history accumulation unit 103 are a circuit having a semiconductor memory in a portable telephone, and the like. The viewing history accumulation unit 103 extracts, from the program viewing histories in the viewing history external accumulation unit 101, information indicating, for example, that the user often views quiz programs and cartoon programs, that the user often views programs in which a particular cast appears, that the user never misses to view a certain program every week, and the like.

Figure 4:
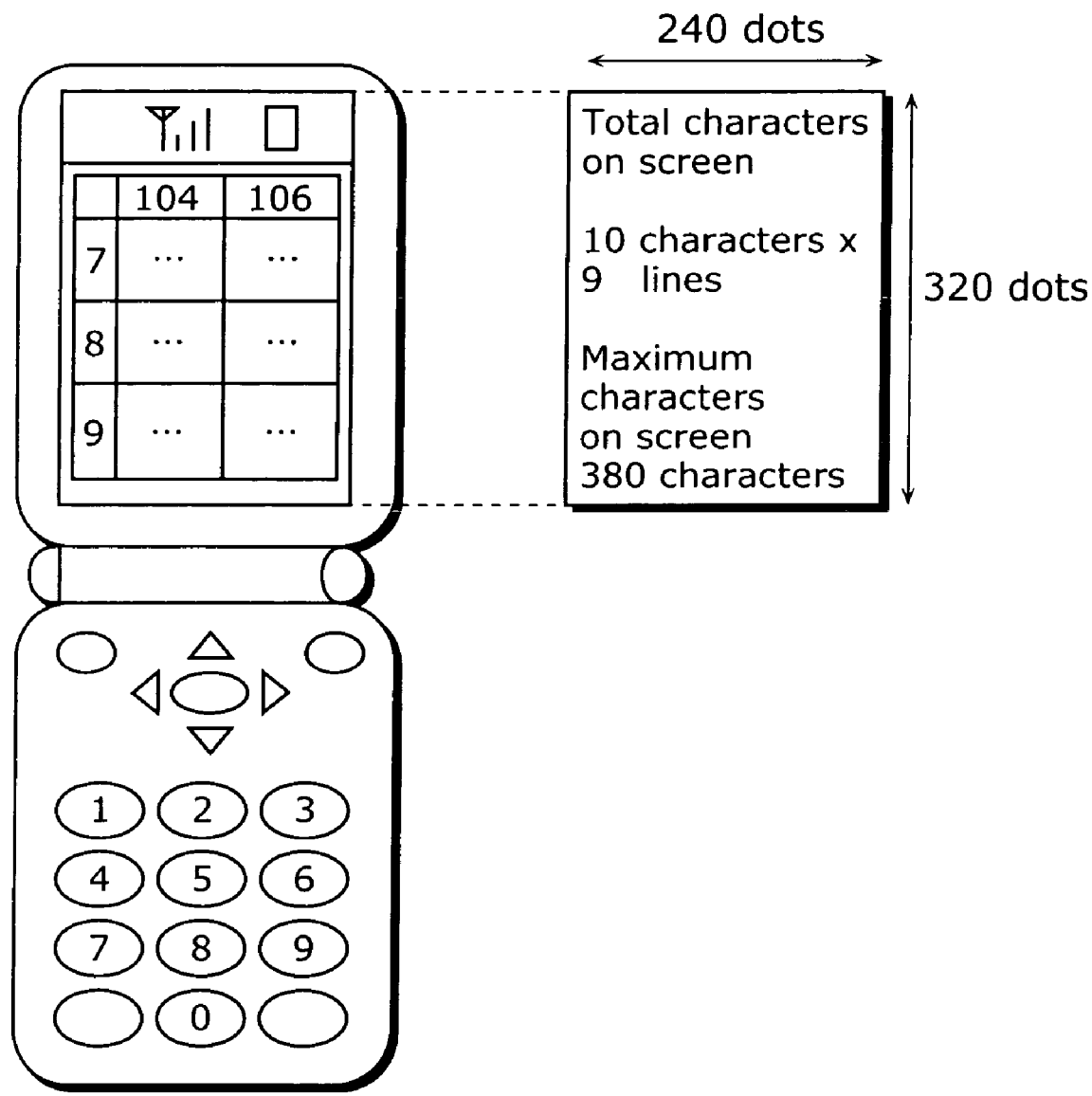
FIG. 4 is a diagram showing a display example of a program table.

The program table accumulation unit 104 is a memory or the like, in which program information to be displayed is selected from the program tables accumulated in the program table external accumulation unit 102, and the selected program information is accumulated. For example, information as shown in FIG. 3 is accumulated. However, a screen of a portable telephone or the like is not large enough to display all of the information shown in FIG. 3 at once. Therefore, as shown in FIG. 4, a part of the program table is displayed, for example. The displayed part of the program table in FIG. 4 is shown in a dotted frame of FIG. 5. As shown in the dotted frame (displayed program table) of FIG. 5, the screen can display only information of programs on Channels 104 and 106 in time slots from 7:00, 8:00, and 9:00 at once. Therefore, in order to see Channels 108 and 110 shown outside of the dotted frame in FIG. 5, the screen is scrolled to the left or right, using a left or right arrow key or the like. Further, in order to see program information in different time slots, the screen is scrolled up or down, using an up or down arrow key or the like.

The display-priority program selection unit 105 is a processing unit which decides, based on the history information accumulated in the viewing history accumulation unit 103, priority in an order of displaying the program information accumulated in the program table accumulation unit 104. In other words, the display-priority program selection unit 105 is one example of a first priority decision unit which decides a priority regarding displaying for each cell included in the schedule table. For example, when the user's program viewing history shows that the user often views programs in a category of "Quiz", "Quiz" programs are decided as high-priority programs whose information is to be displayed as priority. For example, when the user's program viewing history shows that the user prefers programs in categories of "Quiz", "Cartoon", and "Music", programs in hatched parts of FIG. 5 are decided as programs in matching with the user's preference. Note that, in the conventional program table display, the program table is displayed as it is, as shown in FIG. 5. In other words, the conventional display method merely includes displaying the program information in a limited range, and changing a display color for the programs in matching with the user's preference, and the like. Therefore, if there is another recommended program in the same time slot, the user has to scroll the screen to check information of the program. Thus, when the user wishes to perform program recording reservation by checking only the program table displayed in the portable telephone, or when the user wishes to compare the recommended programs, the user has to scroll the screen. On the other hand, in the first embodiment, the program table shown in FIG. 5 is displayed as shown in FIG. 7, as described further below.

The display time slot decision unit 106 is a processing unit which decides time slots to be displayed in the program table, so that information of the high-priority programs selected by the display-priority program selection unit 105 can be displayed as many as possible. In other words, the display time slot decision unit 106 is one example of a row and column decision unit which decides a row and a column including a high-priority cell, among rows and columns in the schedule table. In addition, the display time slot decision unit 106 sets a detail degree corresponding to the priority, regarding the program information to be displayed. For instance, as the simplest displaying (for displaying low-priority program information), only a starting time and a program title are displayed; as the next simplest displaying (for displaying medium-priority program information), detail of the program is added to be displayed; and as detail displaying (for displaying high-priority program information), cast information is further added to be displayed. Thereby, displayable time slots (the number of lines displayable on the screen) are controlled, by changing the detail degree depending on the displayed program information. Note that the detail degree of program information may be a ratio of the number of characters in a piece of program information to a total number of characters in the program table, for example. Note also that the detail degree of program information may be decided by the number of lines in a piece of program information if the information is displayed on the screen, for example.

The display channel decision unit 107 is a processing unit which decides channels to be displayed, so that information of the priority programs selected by the display-priority program selection unit 105 can be displayed as many as possible. Especially, when there are plural pieces of information of high-priority programs on different channels in the same time slot, these channels are decided to be displayed as priorities, so that the user can compare and examine these pieces of program information. In addition, based on the user's program viewing history, the display channel decision unit 107 can decide, as priorities, channels which the user has viewed most frequently. In other words, the display channel decision unit 106 is another example of the row and column decision unit which decides a row and a column including a high-priority cell, among rows and columns in the schedule table.

The program table display unit 108 is a display device, such as a liquid crystal display (LCD), or a display control unit, which displays the program table with information in the time slots and the channels decided by the display time slot decision unit 106 and the display channel decision unit 107. This program table display unit 108 is one example of a table display unit which creates a displayed part of the table which includes parts that exist in the time slots and the channels decided by the display time slot decision unit 106 and the display channel decision unit 107, and the parts include information of the high-priority programs. For example, as shown in FIG. 7, information of programs to be displayed to the user as priorities (high-priority programs) is displayed as many as possible on a single screen.

Figure 10:
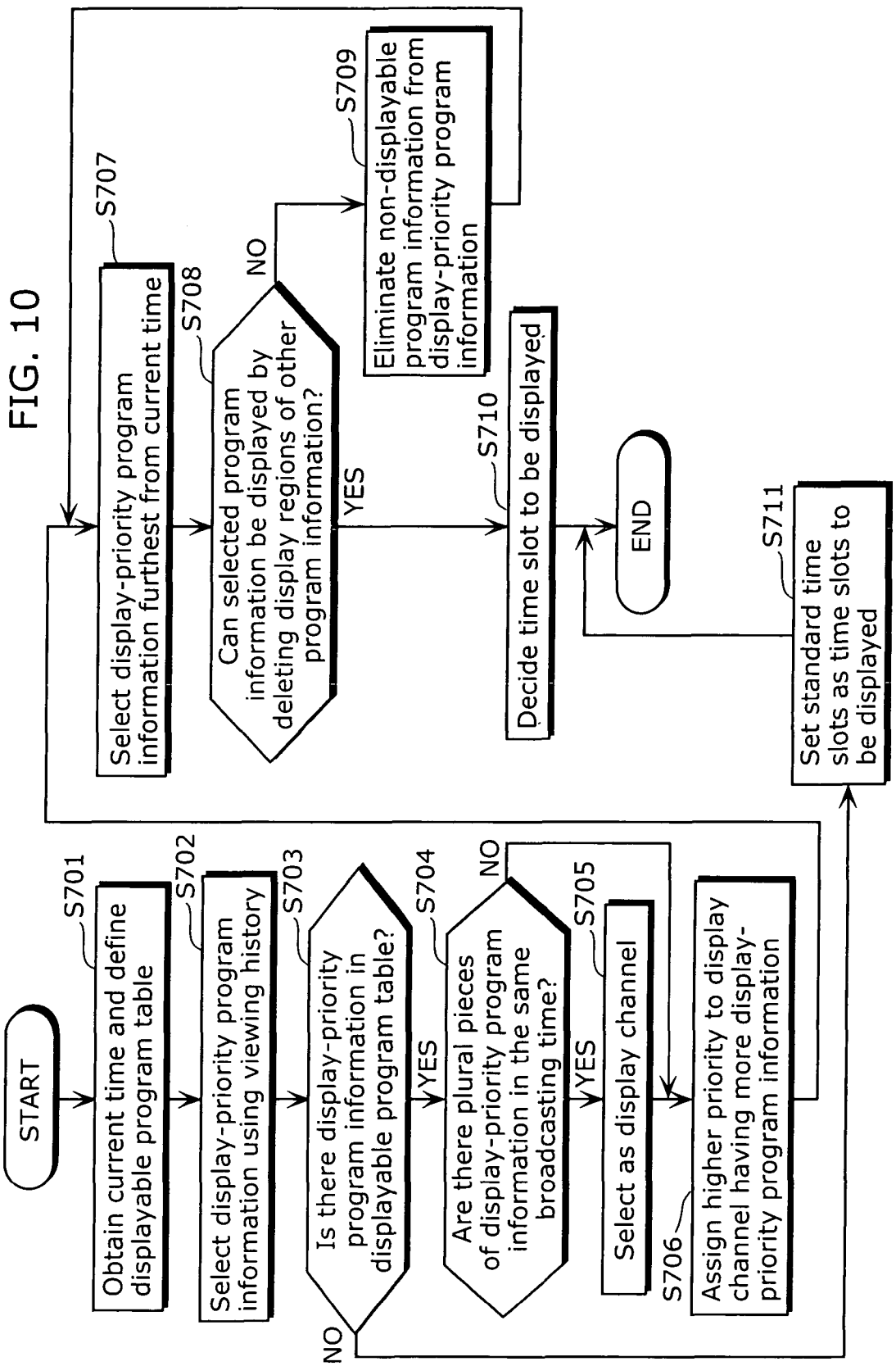
FIG. 10 is a flowchart showing processing performed by a portable information terminal in the program distribution system.

Next, processing performed by the portable information terminal in the program distribution system having the above structure according to the first embodiment is described with reference to a flowchart of FIG. 10.

Firstly, the program table accumulation unit 104 obtains a current time, then, based on the current time, obtains displayable program tables from the program table external accumulation unit 102, and accumulates the obtained program tables (S701). An example of the accumulated program table is shown in FIG. 3. Next, the display-priority program selection unit 105 decides program information to be displayed as priority, among the program information accumulated in the program table accumulation unit 104, using information of the user's program viewing history accumulated in the viewing history accumulation unit 103 (S702). If there is such program information to be displayed as priority (hereinafter, referred to as a display-priority program information) among the displayable program information, then the processing proceeds to a subsequent step. On the other hand, if display-priority program information does not exist (S703), then the processing proceeds to Step S711. At Step S711, based on the current time, the program table is displayed in a common way, and the processing is completed.

In the case where there is display-priority program information, the display channel decision unit 107 determines whether or not there are plural high-priority programs on different channels in the same time slot (S704). If there are plural high-priority programs in the same time slot, then the channels of those high-priority programs are selected as channels to be displayed (S705). On the other hand, if there are no plural high-priority programs, then the processing proceeds to Step S706. For example, if the program table shown in FIG. 3 is accumulated, the user is interested in "Quiz", "Cartoon", and "Music" programs, so that, as shown in FIG. 5, from 7:00 on Channels 104 and 108, there are plural programs whose information are to be displayed. Therefore, the Channels 104 and 108 are selected as display channels by priority. Then, the display channel decision unit 107 assigns a higher priority to the selected channel having more high-priority programs (S706). In comparing the Channel 104 to the Channel 108, as shown in FIG. 5, the Channel 104 has more high-priority programs, so that the Channel 104 is displayed firstly.

Subsequently, the display time slot decision unit 106 selects a high-priority program whose time slot is the temporally furthest from the current time (S707). A range of the temporally furthest program is assumed to be, for example, a range from program information in a current time slot to the temporally furthest high-priority program on the display screen, when in the current time slot, the most pieces of program information are displayed. In the example of FIG. 5, "Music Abroad" starting at 12:00 on the Channel 104 is the temporally furthest among the high-priority programs, so that the "Music Abroad" is selected as the furthest program. Then, the display time slot decision unit 106 determines whether or not all of the display-priority program information can be displayed by deleting other program information except the display-priority program information (S708). If all of the display-priority program information can be displayed, then the processing proceeds to Step S710, and the selected time slots are set as time slots to be displayed. If all of the display-priority program information can not be displayed, then the processing proceeds to Step S709. In this example, even if only titles of the programs starting at 8:00, 9:00, and 11:00 are displayed, the programs starting as 12:00 are not able to be displayed. Therefore, the processing proceeds to Step S709. At Step S709, the programs which are not able to be displayed are eliminated from the high-priority programs, and the processing returns to Step S707. In this example, "Music Abroad" from 12:00 cannot be displayed, so that the program is eliminated from the high-priority programs, and the processing returns to Step S707. At Step S707 again, since the "Music Abroad" has been eliminated from the high-priority programs, the temporally furthest program becomes "Music 10" from 10:00. Now, by displaying only titles of the programs from 8:00 and 9:00, the "Music 10" can be displayed, so that the display time slot decision unit 106 decides the time slots starting at 7:00 to 10:00 as time slots to be displayed in the program table (S710).

Based on the channels to be displayed and a display order of the channels which are decided by the display channel decision unit 107, and the time slots to be displayed and a display order of the time slots which are decided by the display time slot decision unit 106, as described above, the program table display unit 108 modifies the program table shown in FIG. 5 to the program table shown in FIG. 7 to be displayed. In this example, the channels to be displayed are the Channels 104 and 108 which have the largest number of recommended programs that the user prefers, and these channels are displayed firstly from the Channel 104 from the left side, while regarding the time slots, information of the programs from 7:00 and from 10:00, which are recommended programs that the user prefers, is displayed in detail.

As described above, in the first embodiment, based on the user's program viewing history, information of programs which the user prefers is displayed as priority and in detail. Therefore, without bothersome displaying operations, it is possible to find out desired information immediately and intuitively. For example, when program recording reservation or the like is to be performed, it is possible to select a target program with the less number of operations.

Note that, it has been described in the first embodiment that the program information to be displayed as priority is decided using the user's program viewing history, but it is also possible to use a user's program recording history, in order to decide program information to be displayed as priority. Thereby, it is possible to remind the user of recording a program which the user usually records. For example, when a program cell is selected in the program table as shown in FIG. 7, a pop-up menu screen as shown in FIG. 8 appears, so that it is possible to perform remote control for an in-home apparatus or the like.

Note also that, it has been described in the first embodiment that the program information to be displayed is decided using the category information, based on the user's preference information extracted from the user's program viewing history, but it is also possible to use keywords included in the program table, information regarding casts, or the like, which are obtained from the program viewing history.

Note also that, it has been described in the first embodiment that the program information to be displayed is decided based on the user's preference, but it is also possible to decide the programs based on programs (new programs) which a broadcast station wishes the user to view as priorities.

Note also that, it has been described in the first embodiment that the priority program information is decided using the program viewing history, but it is also possible to use program setting information regarding user's manual input setting, in order to decide the programs.

Note also that, it has been described in the first embodiment that the high-priority programs are set using information indicating whether or not the programs are priority programs, but it is also possible to use the weight of importance (a weight coefficient that is from 0 to 1, for example). Thereby, when the time slots and the channels to be displayed as priorities are decided, it is possible to more finely perform the decision using the weight information.

Note also that, it has been described in the first embodiment that the display region in the program table are reduced by displaying only program titles in the program information, but it is also possible to reduce the display region by not displaying other program information except the high-priority program information.

Note also that, it has been described in the first embodiment that the program information to be displayed is decided by selecting, based on the preference information extracted from the user's program viewing history, the high-priority programs (programs in a channel with more programs which the user prefers) whose information is displayed as priority. However, when there are a great number of preferred programs, all of the programs are not always able to be displayed. Therefore, when there is another program to be browsed outside the screen, it is possible to display, on a cell, a symbol indicating that there is another recommended program. For example, as shown in FIG. 9, when there is another piece of program information to be browsed which exists in the same time slot of the displayed program information, it is possible to display, in a cell in the time slot, an icon such as a horizontal-directional arrow. Furthermore, when there is another piece of program information to be browsed which exists in the same channel but in a later time slot outside of the screen, it is possible to display, in a cell in the channel, a vertical-directional arrow. These icons are not general icons which are displayed in a portable telephone or the like in order to show possibility of scrolling a screen, but icons which indicate existence of other programs to be checked by the user. Moreover, by varying a size of the icon depending on the number of hidden priority programs, the user can judge importance of checking the hidden programs, only with a view of the currently displayed screen.

Note also that, it has been described in the first embodiment that, as shown in the screen display example of FIG. 7, the channel having no high-priority program ("Channel 106" in the display example of FIG. 7) is not displayed, so that the columns (channels) in the program table can be squeezed. On the other hand, it is also possible, as shown in the screen display example of FIG. 11, to set a time slot having no high-priority program not to be displayed, in order to squeeze the rows (time slots) in the program table. Thereby, it becomes easy to check programs on different channels, which are scheduled to be broadcast in the same time slot of the preferred program.

Figure 11:
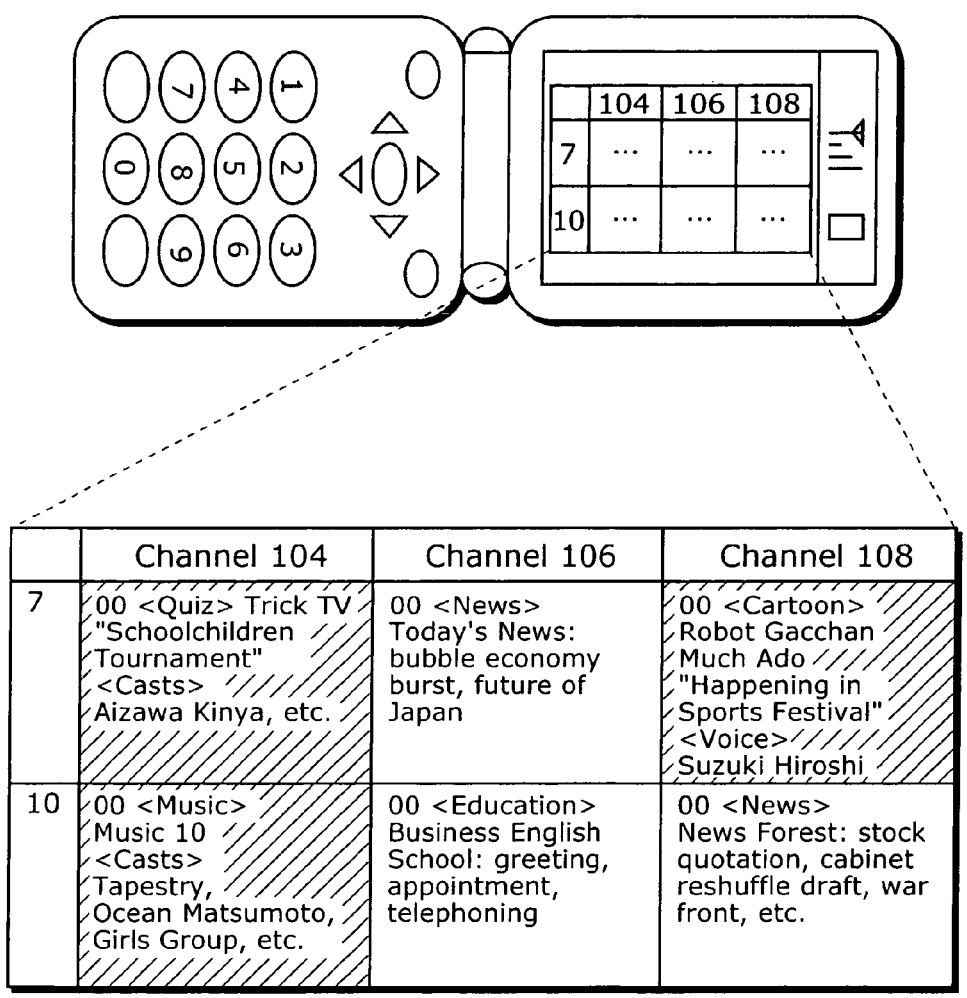
FIG. 11 is a diagram showing a display example of a program table.

Note also that, as shown in this FIG. 11, when the program table is a horizontal rectangle, it is also possible to display the program table in a layout in which the user sees the screen of the portable information terminal as a horizontal rectangle. Especially when there are a great number of high-priority programs in the same time slot, it is necessary to increase the number of channels to be displayed on a single screen. It has been described in the first embodiment that, on one screen, two channels are displayed. However, if there are three or more channels having high-priority programs from 7:00 to 8:00, it is also possible to display a table including three or more channels. In this case, the number of channels is increased, so that, when the screen of the display terminal is used as a horizontal rectangle, the program information can be more efficiently displayed.

Furthermore, instead of using the screen of the display terminal as a horizontal rectangle, it is also possible to exchange display arrangement between the rows and the columns, by arranging the channels in a vertical direction, and the time slots in a horizontal direction. For example, in the case where the program table is displayed in a portable telephone having a broadcast receiving function, when a broadcast content is received, the broadcast content can be displayed on the screen, both as a vertical rectangle (portrait) screen and as a horizontal rectangle (landscape) screen. Therefore, depending on the direction of displaying the broadcast content, a direction of displaying the program table can be decided. Thereby, when the user views the broadcast content immediately after browsing the program table, or when the user browses the program table immediately after viewing the broadcast content, the user can see the screen without changing the direction of the display apparatus. The direction of displaying the program table may be decided not only depending on the direction of displaying the broadcast content, but also a display direction of any application software program which is viewed prior to the program table.

Second Embodiment

Next, the second embodiment according to the present invention is described.

In the first embodiment, the program information to be displayed as priority is decided using the user's program viewing history. However, if a new program or a special program (program that is not a regular program) is scheduled to be broadcast, it is also possible to display information of such a program as priority, without using the user's program viewing history. Thus, as an example of the displaying of the program table without using the program viewing history, the second embodiment describes a display apparatus which decides program information to be displayed as priority, by accumulating information of already broadcasted programs and detecting difference from information of programs to be broadcast in the future.

Figure 12:
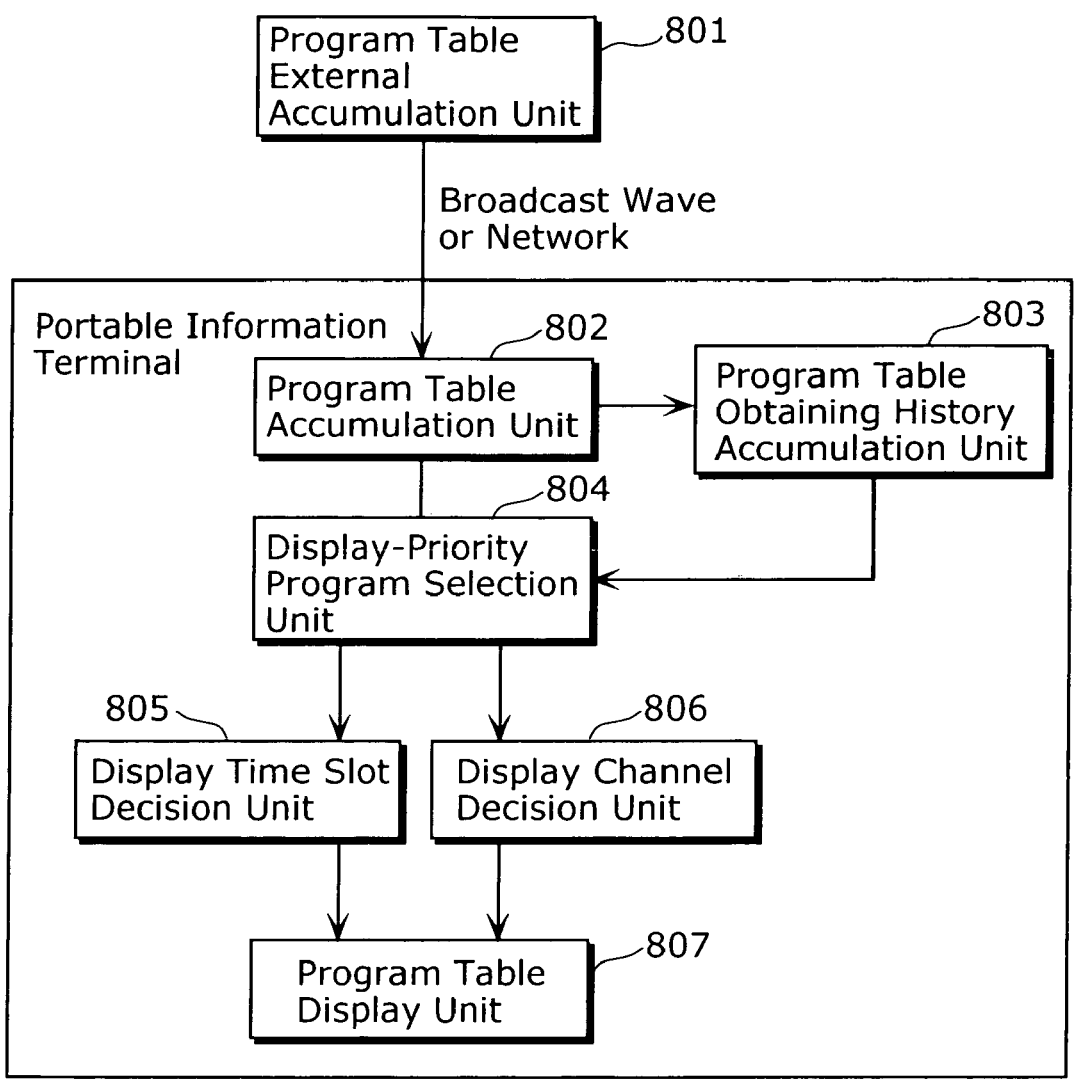
FIG. 12 is a block diagram of a program distribution system according to the second embodiment of the present invention.

FIG. 12 is a block diagram of a program distribution system according to the second embodiment of the present invention. This program distribution system is a system which distributes a program, a program table representing a schedule table, and the like, to a portable information terminal via broadcast waves or a communication network. The program distribution system includes a program table external accumulation unit 801, a program table accumulation unit 802, a program table obtaining history accumulation unit 803, a display-priority program selection unit 804, a display time slot decision unit 805, a display channel decision unit 806, and a program table display unit 807. Here, the program table external accumulation unit 801, the program table accumulation unit 802, the display time slot decision unit 805, and the display channel decision unit 806, and a program table display unit 807 correspond to the same name units shown in FIG. 1, so that details of these units are not described again below.

The program table obtaining history accumulation unit 803 is a processing unit having a storage unit, such as a memory, in which information of already broadcasted programs is accumulated as a program table obtaining history. Programs, such as dramas, are often broadcasted weekly on the specific day of week, so that it is necessary to accumulate program information for at least past one week. In other words, this program table obtaining history accumulation unit 803 is one example of a program table accumulation unit which accumulates a program table regarding already broadcasted programs.

The display-priority program selection unit 804 is a processing unit which selects program information to be displayed as priority, by comparing program information currently obtained by the program table accumulation unit 802, to program information in a program table of one week ago which is accumulated in the program table obtaining history accumulation unit 803, in order to detect difference in text information in both program information on the same channel and in the same time slot. In other words, this display-priority program selection unit 804 is one example of a first priority decision unit which compares an accumulated program table regarding already broadcasted programs, to a program table regarding programs to be broadcast in the future, then judges whether or not there is any change between programs corresponding to the same channel and the same time slot, and assigns a high priority to a program with the change.

For example, it is assumed that, as shown in FIG. 13, in comparing of a currently obtained program table (FIG. 13 (*b*))

to a program table (FIG. 13 (a)) of one week ago, regarding a program on Channel 108 from 7:00, and a program on Channel 104 from 10:00 (hatched parts in FIG. 13(b)), text information indicating program titles are different from the corresponding information in the last-week program table. In this case, there is a high possibility that each of these programs is a new program starting from a present date, or a special program which is not broadcast regularly. Therefore, this display-priority program selection unit 804 judges that information of these programs needs to be displayed as priority in a program table. In the case of FIG. 13, "Iron Baseball Player" on Channel 108, and "Olympic Hours" on Channel 104 are judged as programs whose information is to be displayed as priority.

In the meanwhile, regarding programs such as dramas, for example a program on Channel 104 from 8:00, text information indicating detail of the programs is changed. In such a case, however, there is a low possibility that those programs are new programs, so that, by judging based on a category of the programs ("Drama", for example), this display-priority program selection unit 804 does not assign a high display priority to information of the programs such as dramas.

Note that if the distributed program table includes tags for specifying new programs, special programs, and the like, priority of displaying programs may be decided using the tags. Note also that, when an amount of a text indicating program details is large, it is also possible to judge that a providing broadcaster is devoted especially to such a program, and to assign a high display priority to information of the program. For example, when a text amount in certain program information is more than twice as much as a text amount of last week, a display priority of the program information can be set higher. Note also that, when cast information in the program information is different from cast information of last week, a display priority of the program information can be set higher.

After the display-priority program selection unit 804 decides program information to be displayed as priority, in the same manner as described in the first embodiment, a program table is created by the display time slot decision unit 805 and the display channel decision unit 806, and then displayed on a screen by the program table display unit 807. FIG. 14 is a diagram showing a display example of the program table according to the second embodiment.

Figure 15:
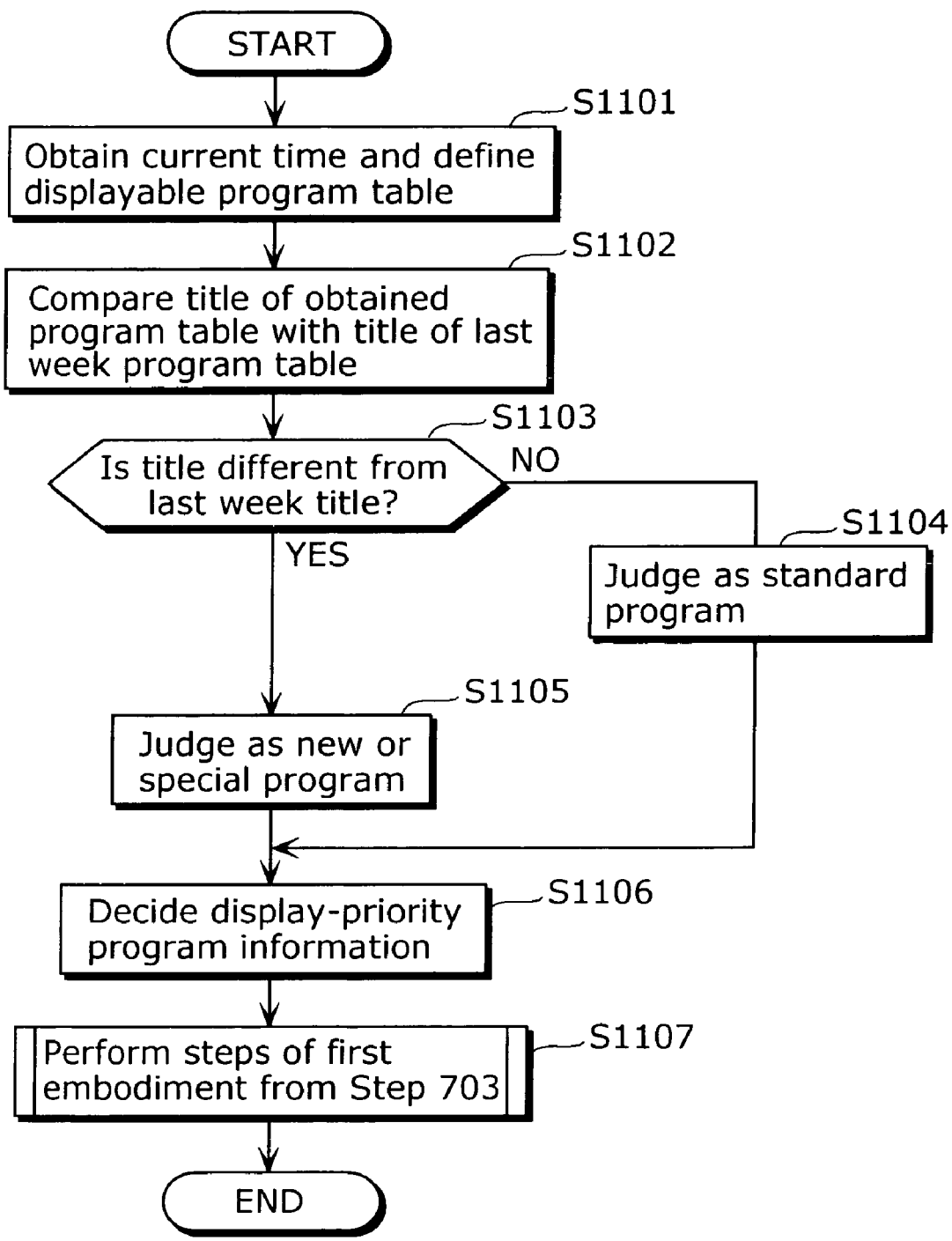
FIG. 15 is a flowchart showing processing performed by a portable information terminal in the program distribution system.

Next, processing performed by the portable information terminal in the program distribution system having the above structure according to the second embodiment is described with reference to a flowchart of FIG. 15.

Firstly, the program table accumulation unit 802 obtains a current time, then, based on the current time, obtains program tables accumulated in the program table external accumulation unit 801, and accumulates the obtained program tables (S1101). The display-priority program selection unit 804 detects difference between a program table accumulated in the program table obtaining history accumulation unit 803 and a current program table obtained by the program table accumulation unit 802 (S1102). In this example, program titles are compared between the current program table and a program table of one week ago. More specifically, it is judged whether or not titles of programs of the same channel and time slot are different between these program tables (S1103). If the titles are identical, then the processing proceeds to Step S1104, and the program in the current program table is judged as a regular program. If the titles are different, then the processing proceeds to Step 1105, and the program in the current program table is judged as a new program or a special program. Then, the display-priority program selection unit 804 sets the new or special program to a program whose information is to be displayed as priority (S1106). After that, the processing proceeds to the steps described in the first embodiment subsequently from Step S703.

Thereby, as the display example shown in FIG. 14, it is possible to create a program table to be displayed to the user as priority. Here, information of the program on Channel 104 from 10:00 and the program on Channel 108 from 7:00 (hatched parts in FIG. 14) is displayed on a screen as priority.

Note that, in the second embodiment, the special program is changed back to the regular program next week, and thereby the program information is changed again next week, so that, next week, the regular program is erroneously judged as a new program. For this reason, if a program is judged as a new program or a special program, in order to confirm a display priority of program information of one week later, the display priority is judged by comparing a text information in current program information to a text information in program information of two weeks ago when the program has judged as a new program or a special program. For the above judging, a channel and a time slot of the program, which is judged as a new program or a special program, may be accumulated as history information in order to be compared to a program table of next week.

For example, currently, as shown in FIG. 16 (a), in the same manner in the example of FIG. 13 (b), "Iron Baseball Player" and "Olympic Hours" are assumed to be judged as new or special programs. However, regarding the "Iron Baseball Player" on Channel 108 from 7:00, a title of the program is not changed in a program table of one week later (FIG. 16 (b)), so that, on week later, it can be judged that "Iron Baseball Player" of last week has been a new program. On the other hand, regarding Channel 104, in a program table of one week later, from 10:00 a music program is broadcast, and from 11:00 a drama is broadcast (FIG. 16 (b)), which is different from "Olympic Hours" in the program table of last week, but which is the same in a program table of two weeks ago (FIG. 13 (a)). Therefore, it can be judged that "Olympic Hours" of last week has been a special program, in other words, that the music program from 10:00 and the drama from 11:00 are regular programs whose information is not to be displayed as priority.

As described above, according to the second embodiment, program tables are accumulated for two weeks, so that, by using not only information of programs broadcasted one week ago, but also information of programs broadcasted two weeks ago, it is possible to automatically judge whether or not a program is a new program, a special program, or a program which a broadcast station especially wishes the user to view, and possible to display information of such a program as priority.

Note that it has been described in the second embodiment that the program information to be displayed as priority is decided using the program table obtaining history or the user's program viewing history. However, if the portable information terminal can obtain schedule information of the user, it is also possible that the schedule information is referred in order to judge whether or not a user's schedule conflicts with a recommended program, and if there is such conflict, information of the recommended program is displayed as priority. For example, as shown in FIG. 17, when the schedule information indicates a schedule from 7:00 to 9:00, if a recommended program is to be broadcast in the same time slot, it is possible to display, as priority, a time table of a channel including the recommended program. Note also that, in the second embodiment, the program information to be displayed as priority is displayed on one screen as many as possible. In addition to such displaying, however, it is also possible to add another displaying on the screen for showing a position of the displayed program table in the whole table. For example, as shown in FIG. 18, by switching detail displaying of a program table (left-hand diagram in FIG. 18) to whole displaying of the program table (right-hand diagram in FIG. 18), the whole displaying shows which part in the whole table is displayed in the detail displaying. Thereby, this enables the user to know which part in the program table the user has browsed.

Figure 19:
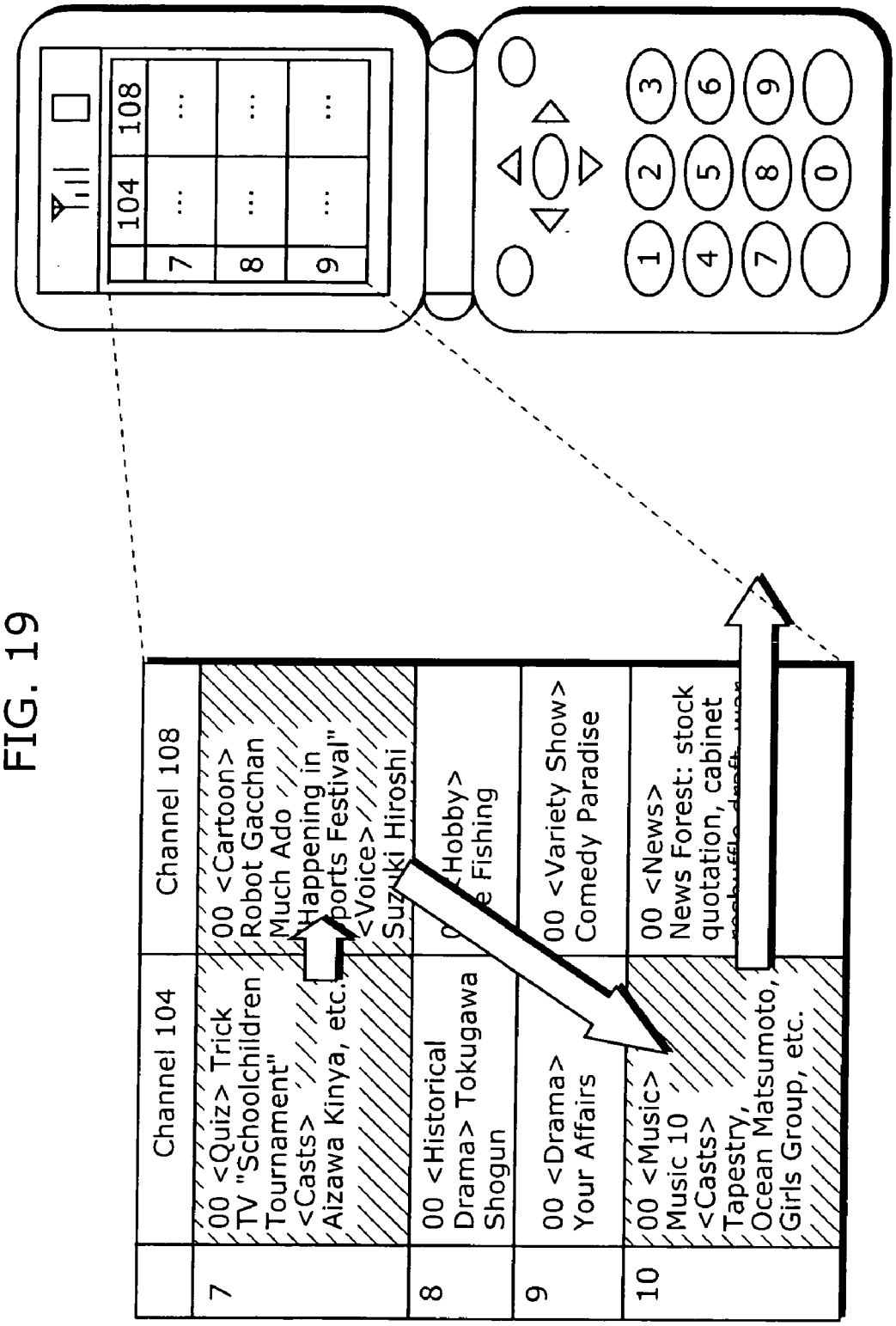
FIG. 19 is a diagram showing an example of moving among plural pieces of program information which are displayed as priorities.

Note also that it has been described in the second embodiment that the program information to be displayed as priority is displayed on one screen as much as possible. In addition to such displaying, however, it is also possible to move among the plural programs whose information is displayed as priority, in the table format. For instance, as shown in FIG. 19, it is also possible to move among plural high-priority programs, by using "Next" and "Return" keys on a portable telephone. For example, by repeatedly pressing the "Next" key, it is possible to sequentially move to a high-priority program in the same time slot, rather than on the same channel, among the plural high-priority programs whose information is to be displayed as priority on the screen. By pressing the "Return" key, it is possible to return to the high-priority programs in a reverse order. Here, "to move" means to switch target information of a program to be viewed or recorded (program which the user is checking), or to change program information to be positioned at the top left of the screen. In addition, it is also possible to display the program information selected by the moving, in a form different from forms for other non-selected programs, for example by framing the selected program information using a thick line.

Third Embodiment

Next, the third embodiment according to the present invention is described.

The first and second embodiments have described the apparatus which efficiently displays the program table, by assigning a display priority to each piece of program information corresponding to each cell in the table. The third embodiment, on the other hand, describes a display apparatus, by which, when program information or the like is displayed in a table format, if another information is distributed from the outside via a communication network or the like, the distributed information is also displayed to be checked, without preventing the displaying of the table format information. For example, when electronic mail is received during browsing a program table, in the conventional browsing methods, it has been necessary to switch a program table displaying mode to an electronic mail displaying mode, and to display only indication of the electronic mail. Therefore, in order to see the program table again, it has been necessary to change the electronic mail displaying mode back to the program table displaying mode, which requires a number of operations. In order to solve the above problem, in the third embodiment, when information such as electronic mail is received during displaying a program table, since a display priority is assigned to a piece of program information (cell), information of the electronic mail can be displayed, as being overlapped on and covering a low-priority part in the table, so that both of the program table and the electronic mail can be displayed at the same time.

Figure 20:
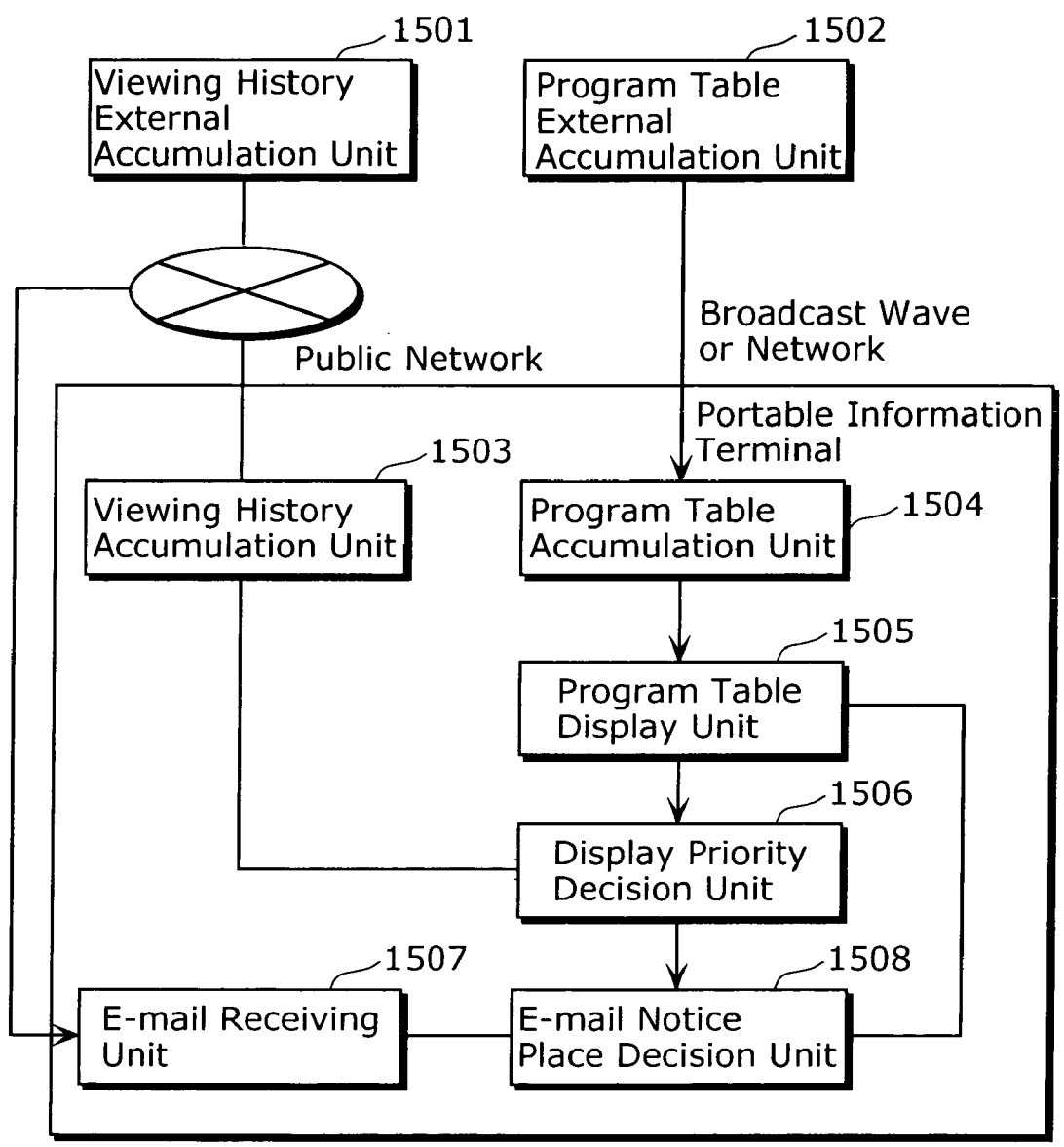
FIG. 20 is a block diagram of a program distribution system according to the third embodiment of the present invention.

FIG. 20 is a block diagram of a program distribution system according to the third embodiment. This program distribution system is a system which distributes a program, a program table representing a schedule table, and the like, to a portable information terminal via broadcast waves or a communication network. This program distribution system includes a viewing history external accumulation unit 1501, a program table external accumulation unit 1502, a viewing history accumulation unit 1503, a program table accumulation unit 1504, a program table display unit 1505, a display priority decision unit 1506, an e-mail receiving unit 1507, and an e-mail notice place decision unit 1508. Here, the viewing history external accumulation unit 1501, the program table external accumulation unit 1502, the viewing history accumulation unit 1503, and the program table accumulation unit 1504 correspond to the same name units shown in FIG. 1, so that details of these units are not described again below.

Figure 21:
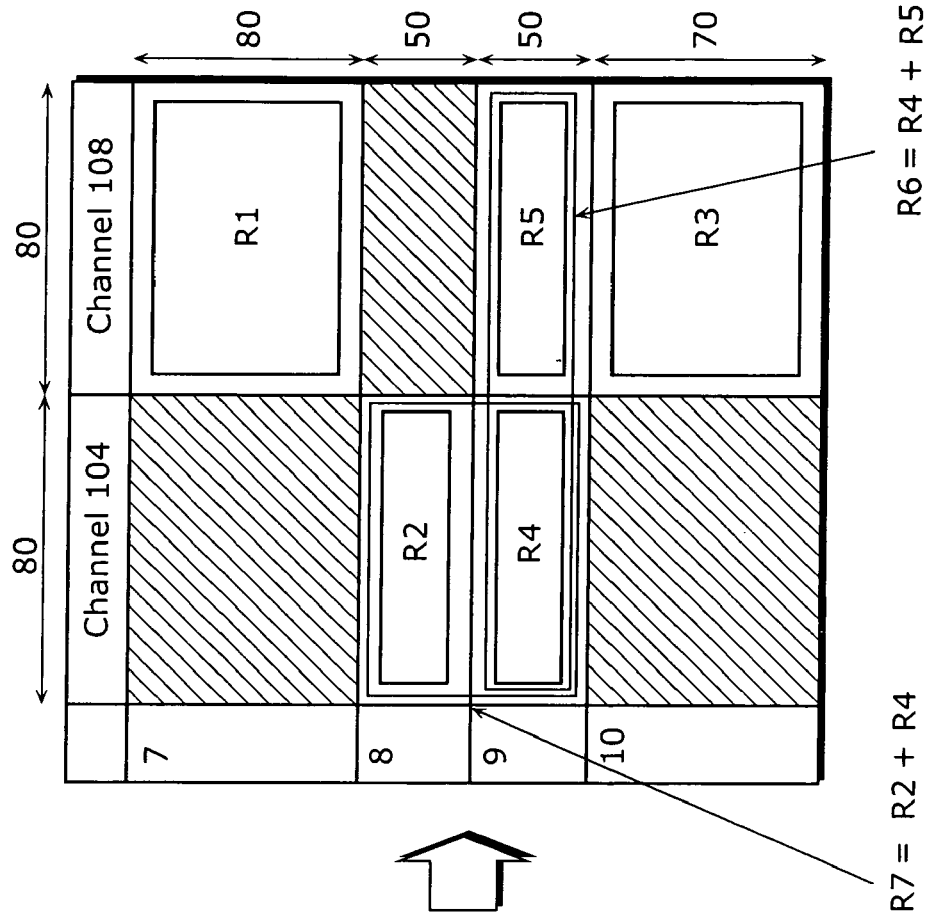
FIG. 21 is a diagram showing display regions at which electronic mails are displayed as overlapped on a program table.

The program table display unit 1505 is a display device, such as a liquid crystal display (LCD), or a display control unit, which displays a program table in a table format, as shown in a left-hand diagram of FIG. 21. Each piece of the displayed program information (cell) is assigned with a priority of a displaying order, based on the program viewing history, the program recording history, or the like. In other words, this program table display unit 1505 is one example of a row and column decision unit which decides a row and a column including a high-priority cell which is selected by the display priority decision unit 1506 or the like, from rows and columns in the schedule table, and is also one example of a table display unit which creates a displayed part of the table which includes parts having high-priority cells in the decided row and column.

The display priority decision unit 1506 is a processing unit which decides a priority of each piece of displayed program information (cell), based on the history information in the viewing history accumulation unit 1503. In other words, this display priority decision unit 1506 is one example of a first priority decision unit which decides a priority regarding displaying for each cell included in the schedule table. In the same manner as described in the first embodiment, by extracting, from the program viewing history, user's tendency to view specific programs frequently, program information to be displayed as priority is decided according to the tendency. In the left-hand diagram of FIG. 21, programs in categories of "Quiz" and "Music", and programs related to fishing (hatched parts in the diagram) are judged, based on the past program viewing history, as programs which the user often views, so that a display priority of information of these programs is set to high.

The e-mail receiving unit 1507 is a communication interface or the like, which receives electronic mail via a public line, such as the Internet. In other words, this e-mail receiving unit 1507 is one example of an information obtainment unit which obtains information via a communication network. Electronic mail sometimes includes not only text information, but also image information. Note that in the third embodiment, an example of the information distributed from the outside is electronic mail received via the Internet, but the information may be information received via local radio waves, such as Bluetooth™.

The e-mail notice place decision unit 1508 is a processing unit which decides, depending on priorities of programs (cells) decided by the display priority decision unit 1506, and indication in the electric mail received by the e-mail receiving unit 1507, a place and a range on a display screen, at which the distributed information is displayed to be notified. By the display priority decision unit 1506, a display priority of each piece of program information (cell) is previously decided. Here, a program (cell) having a low priority is selected for as a place candidate at which the electronic mail is notified. As a result, as shown in the right-hand diagram of FIG. 21, programs on Channel 104 from 8:00 to 9:00 (region R2) and from 9:00 to 10:00 (region R4), and programs on Channel 108 from 7:00 to 8:00 (region R1), from 9:00 to 10:00 (region R5), and from 10:00 to 11:00 (region R3) are selected as candidates of display places. In addition, candidate cells adjacent to each other are also set to as one display place candidate. In the example of the right-hand diagram of FIG. 21, a region R7 in which the region R2 and the region R4 are combined, and a region R6 in which the region R4 and the region R5 are combined, are also selected as displayable place candidates. In other words, this e-mail notice place decision unit 1508 corresponds to a part of a table display unit (a function of deciding a part at which communication information is displayed) which displays communication information obtained from the outside, on a low-priority cell among cells included in a displayed table.

If the received mail has text information only, this e-mail notice place decision unit 1508 decides a displayable place, after confirming that an aspect ratio of a display range for the information does not need to be considered. In this example, regarding the candidate regions R1 to R6, an area of each of the regions is calculated. The calculation results are shown in FIG. 22. In FIG. 22, an area of the region R6 is 8000 (=50× 160) that is the largest among the regions, so that the region R6 is set to as a place where the electronic mail is displayed, and the resulting displaying is shown in FIG. 23, for example. Here, if the received text information has a large amount, it is also possible to display only sender data and summarized information. As the summarizing technology, already disclosed technologies can be applied.

Figure 24:
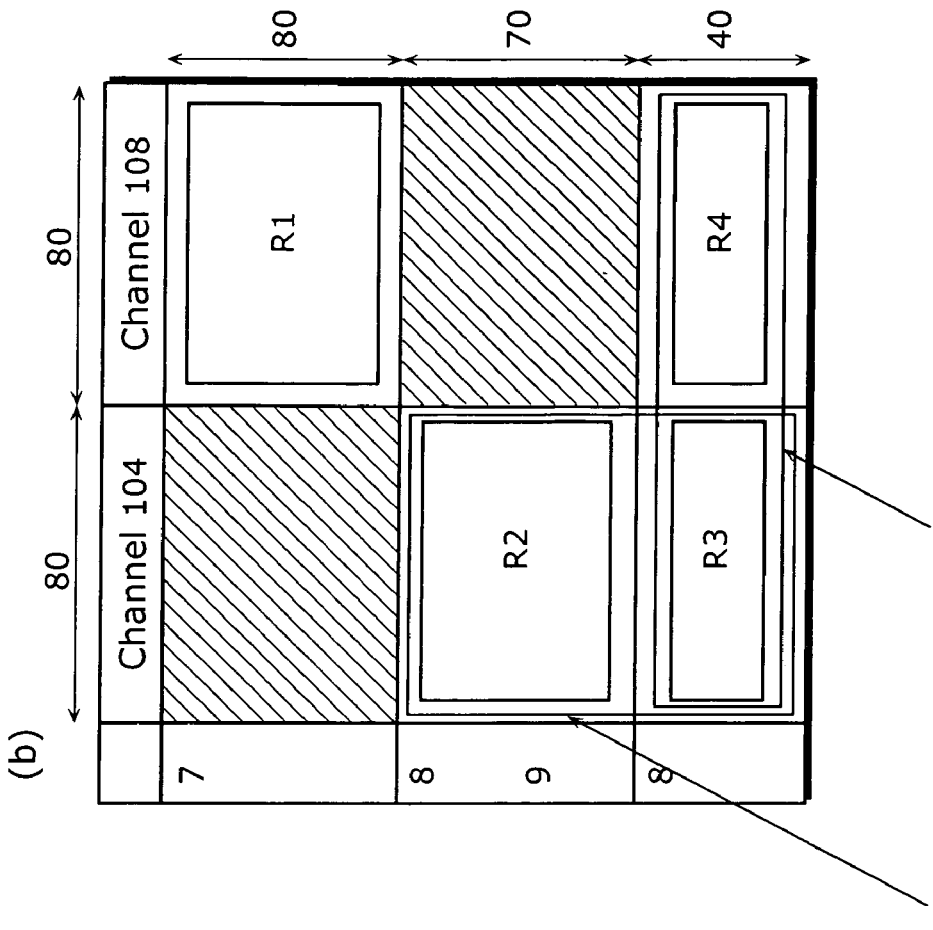
FIG. 24 is a diagram showing display regions at which images are displayed as overlapped on the program table.
Figure 25:
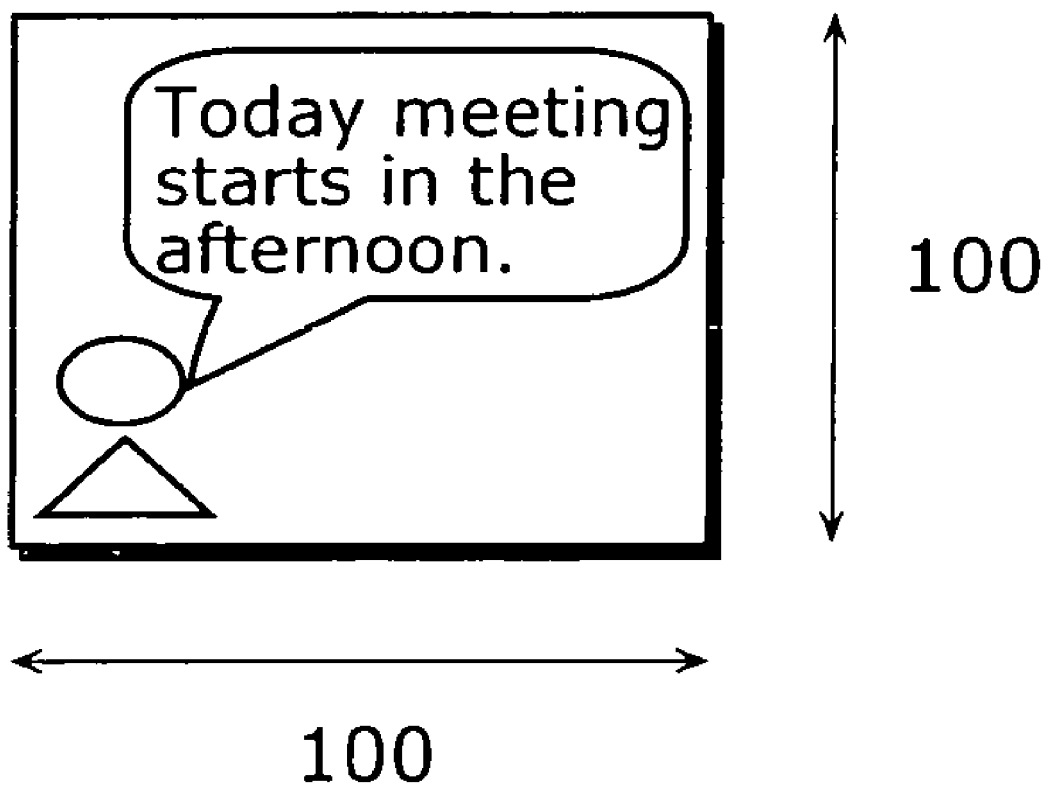
FIG. 25 is a diagram showing an example of an image size.
Figure 27:
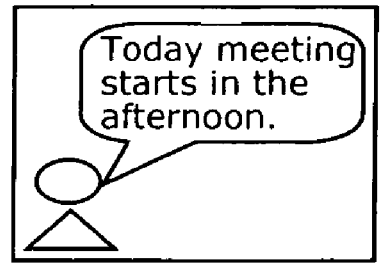
FIG. 27 is a diagram showing a display example in which the image is overlapped on the program table.

In addition, in a program display example shown in FIG. 24 (a), in which high-priority program information is shown in a hatched part, region candidates at which the electronic mail can be displayed are, as shown in FIG. 24 (b), single-cell regions from R1 to R4, and combined regions R5 and R6. Here, it is assumed that electronic mail received by the e-mail receiving unit 1507 has image information, or the like, and a layout (aspect ratio) of the information to be displayed is previously decided. For example, as shown in FIG. 25, the information to be displayed is assumed to be image information whose aspect ratio is 1.0. In this case, the e-mail notice place decision unit 1508 calculates an aspect ratio of each of the regions, and decides a region, whose aspect ratio is the most similar to the aspect ratio of the received information, as a display region. The regions in FIG. 24 (b) have aspect ratios as shown in FIG. 26, so that region R1 is decided as a region at which the information is to be displayed. As a result, as shown in FIG. 27, the received information is displayed. Note that, regarding the received image information, it is possible to delete a blank part in the image to calculate the aspect ratio, and display the image without the blank part in the table format, which makes it possible to display the image information more efficiently. Note also that, if the information includes both of text information and image information, it is necessary to calculate an aspect ratio of combination of the text information and the image information to be displayed.

In general, when image information is displayed on a display screen, any user considers that a part at which the image does not exist is a part without information, so that it is easy to decide to display another image or the like on such a part. In the present invention, on the other hand, when text information is to be displayed on a display screen, a necessary part to be displayed is different depending on each user. This means that, according to indication in the text information, an amount and a value of the information are different depending on each user. Here, by varying the number of the characters included in a single line, a layout of the text information can be changed. However, regarding the text information to be positioned inside a cell defined by a row and a column, even if the number of characters in one line or the number of lines is changed, a whole layout of the text information is not able to be changed. If a layout of this display screen showing cells using rows by columns is changed, it becomes difficult for the user to browse such a layout. For example, in the case of the program table, each cell is defined by a time slot row and a channel column, but if difference of the time slot and the channel is not considered, and the cells are arranged single-dimensionally, it becomes difficult to compare programs in the same time slot or compare programs in the same channel. Thus, when new information is to be displayed on a part of a table format in which each cell has text information, it is necessary to evaluate the displayed information in each cell depending on each user, and then to decide, based on a priority from the evaluation result, a region at which the new information is to be displayed.

Note that, in the third embodiment, when the program table has cells, as shown in FIGS. 23 and 27, a low-priority cell is selected, and on the selected cell the information such as received mail is displayed. The information may be displayed covering the text information in the cell in the program table, or may be displayed after deleting the text information in the cell. Furthermore, if an amount of text information in the received mail is large enough, the text can conceal all of the text information in the cell in the program table, but if the amount is not enough, it is also possible to locate the text information of the electronic mail not to hide a program title in the cell. Thus, a priority of displaying is set not only on a cell-by-cell basis, but also for each part in information in a low-priority cell, for example by displaying information obtained from the outside, on a part of the text information in the cell which is not an important part nor a summarized part from which the user can guess the whole information (program title, for example). This makes it possible to perform the displaying more efficiently on the screen.

Figure 29:
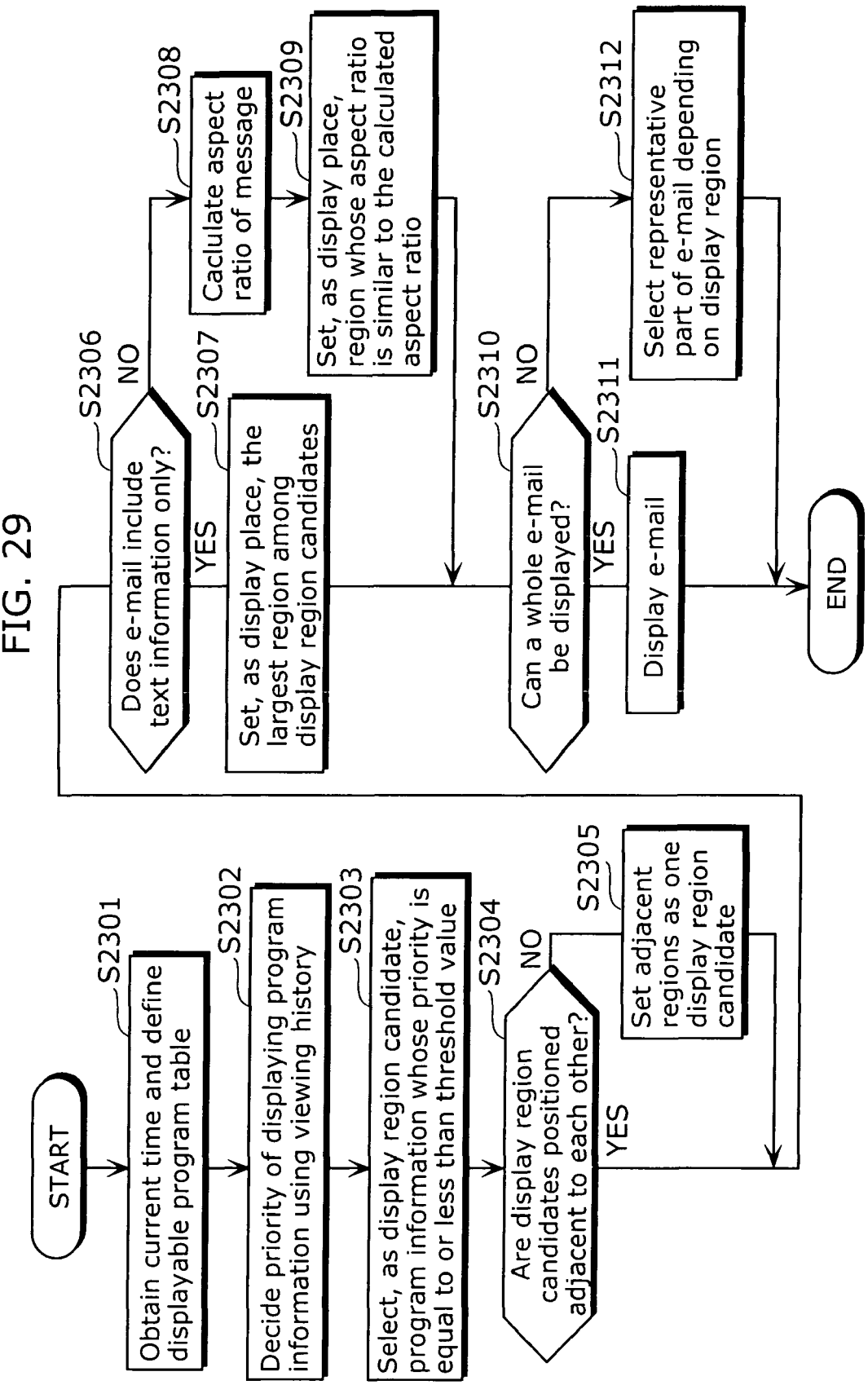
FIG. 29 is a flowchart showing processing performed by a portable information terminal in the program distribution system.

Next, processing performed by the portable information terminal in the program distribution system having the above structure according to the third embodiment is described with reference to a flowchart of FIG. 29.

Firstly, the program table accumulation unit 1504 obtains a current time, then, based on the current time, obtains displayable program tables from the program table external accumulation unit 1502, and accumulates the obtained program tables (S2301). Next, the display priority decision unit 1506 selects and decides program information to be displayed for the user as priority, according to a program viewing history accumulated in viewing history accumulation unit 1503 (S2302). Then, the e-mail notice place decision unit 1508 selects places having program information whose display priority is equal to or less than a threshold value, as display place candidates for electronic mail (S2303). In the program display example of the left-had diagram of FIG. 21, the regions from R1 to R5 are selected as the display place candidates. Subsequently, it is judged whether or not the display region candidates are positioned adjacent to each other (S2304), and if the candidates are adjacent, then the adjacent regions are combined as an additional display region candidate. In the example of FIG. 21, the regions R4 and R5 are adjacent to each other, so that the region R6 is added as another display region candidate, and the regions R2 and R4 are adjacent to each other, so that the region R7 is added as still another display region candidate.

If the electronic mail to be displayed has text information only (S2306), then the processing proceeds to Step S2307. If an image is included in the electronic mail, then the processing proceeds to Step S2308. The e-mail notice place decision unit 1508 selects the largest region among the display region candidates, as the display place (S2307). In the example of FIG. 21, the region R6 is decided as a display region for the electronic mail.

Here, when the electronic mail includes image information and an aspect ratio of the electronic mail is to be considered, the e-mail notice place decision unit 1508 firstly calculates an aspect ratio of the electronic mail (S2308). The display region candidate whose aspect ratio is similar to the calculated aspect ration is selected as a display place (S2309). In the example of FIG. 24, an aspect ratio of the region R1 is the same as the aspect ratio of the electronic mail, so that the region R1 is selected as a display region.

The program table display unit 1505 judges whether or not all parts of the received electronic mail can be displayed (S2310). If all parts can be displayed, then the processing proceeds to Step S2311, and the electronic mail is displayed. If the whole electronic mail cannot be displayed, then only a sender and summarized information of the electronic mail is displayed (S2312). In this way, when the electronic mail includes text information only, as shown in the program display example of FIG. 23, the electronic mail is displayed covering the low-priority program information (here, program information that is not recommended program information), while when the electronic mail includes image information, as shown in the program display example of FIG. 27, the electronic mail is displayed on the low-priority program information, maintaining an aspect ratio of the image information.

As described above, according to the third embodiment, even during displaying the program table, when information such as electronic mail is received, the information can be displayed on program information (cell) in which the user is not interested, so that indication of the mail can be immediately checked without switching to a mode of receiving electronic mail.

Figure 30:
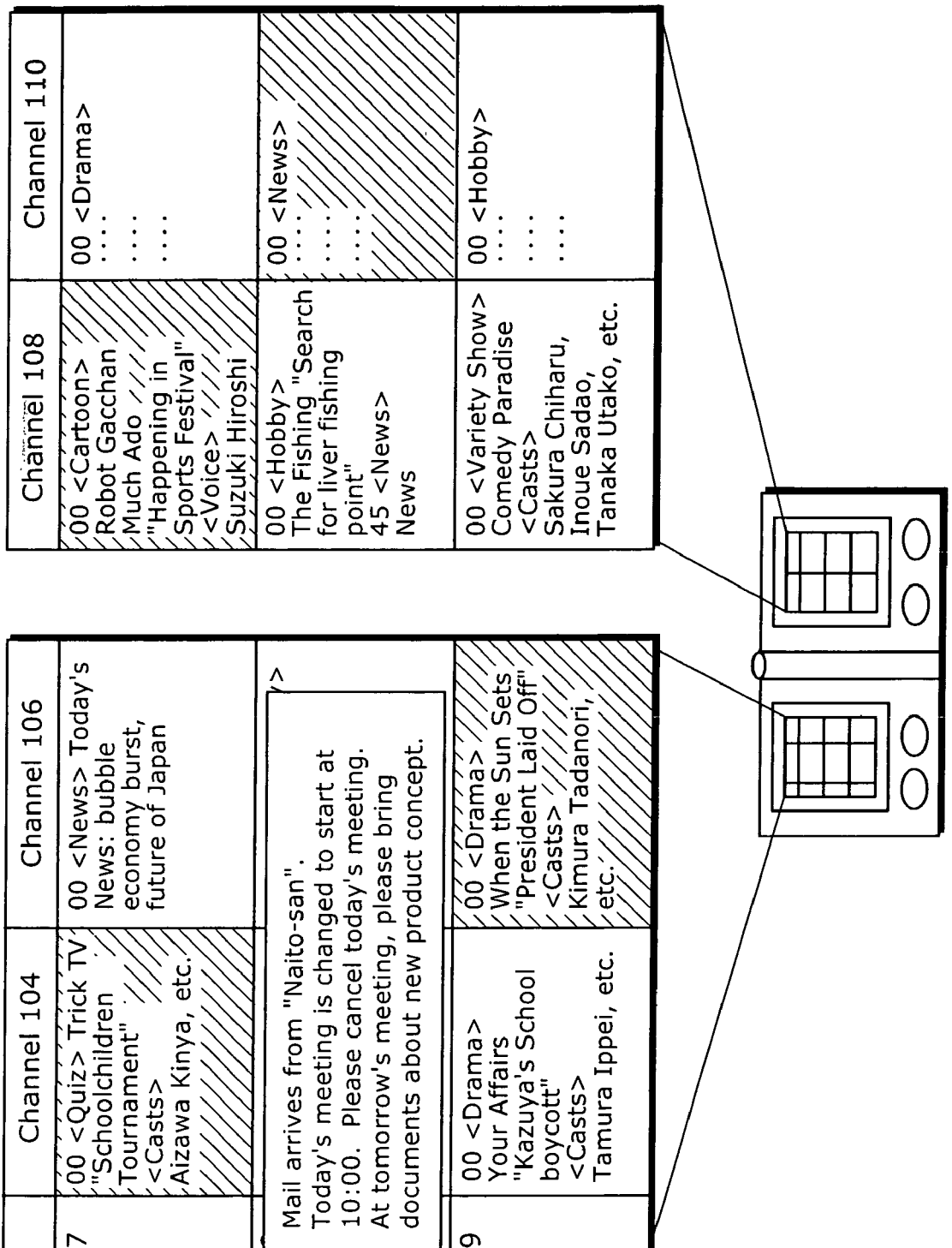
FIG. 30 is a diagram showing an example in which a portable information terminal having a plurality of display screens display the program table.

Note that the third embodiment has described an example of displaying the program table on a single screen. However, a portable information terminal sometimes has plural display screens. Even in the case of such a portable information terminal, as shown in a program display example of FIG. 30, in the same manner as described in the third embodiment, by calculating a display priority for each piece of program information (cell) displayed in the display screens, it is possible to decide a display place for electronic mail or the like.

Note also that it has been described in the third embodiment that the information received from the outside is displayed on receiving, but if on receiving, the screen is being scrolled, it is preferable to display the information on the low-priority program information (cell), after the scrolling is completed and then the user browses the same program table for a certain time period (for three ore more seconds, for example).

Figure 28:
FIG. 28 is a diagram showing an example in which electronic mail is displayed by scrolling the program table.

Note also that, when indication of electronic mail is being displayed during displaying the program table, if the user instructs to display time slots or channels which do not appear in the currently displayed program table (up-down scrolling, left-right scrolling), a low-priority place is searched on each scrolled screen, as shown in the program display example of FIG. 28, and a display place for the electronic mail is updated to display the electronic mail.

Note that the third embodiment has described the processing performed when common electronic mail is received during displaying the program table. Further, when the received electronic mail includes text information regarding a broadcasting television program, it is also possible to specify a program information cell to which the text information is related, and if there are low-priority cells around the specified cell, the mail information can be displayed on a region combining the low-priority cells. Thereby, both of the indication of the electronic mail and the program information can be checked on one screen, which makes it possible to easily realize an operation for program recording reservation or the like.

Fourth Embodiment

Next, the fourth embodiment according to the present invention is described.

The first to third embodiments have described the program table displayed in a table format. The fourth embodiment, on the other hand, describes an example of a time table displayed in a table format. In the fourth embodiment, parts to be displayed as priorities, and parts not to be displayed as priorities in the displayed time table are decided based on a use history of public transportation, such as a railroad.

Figure 31:
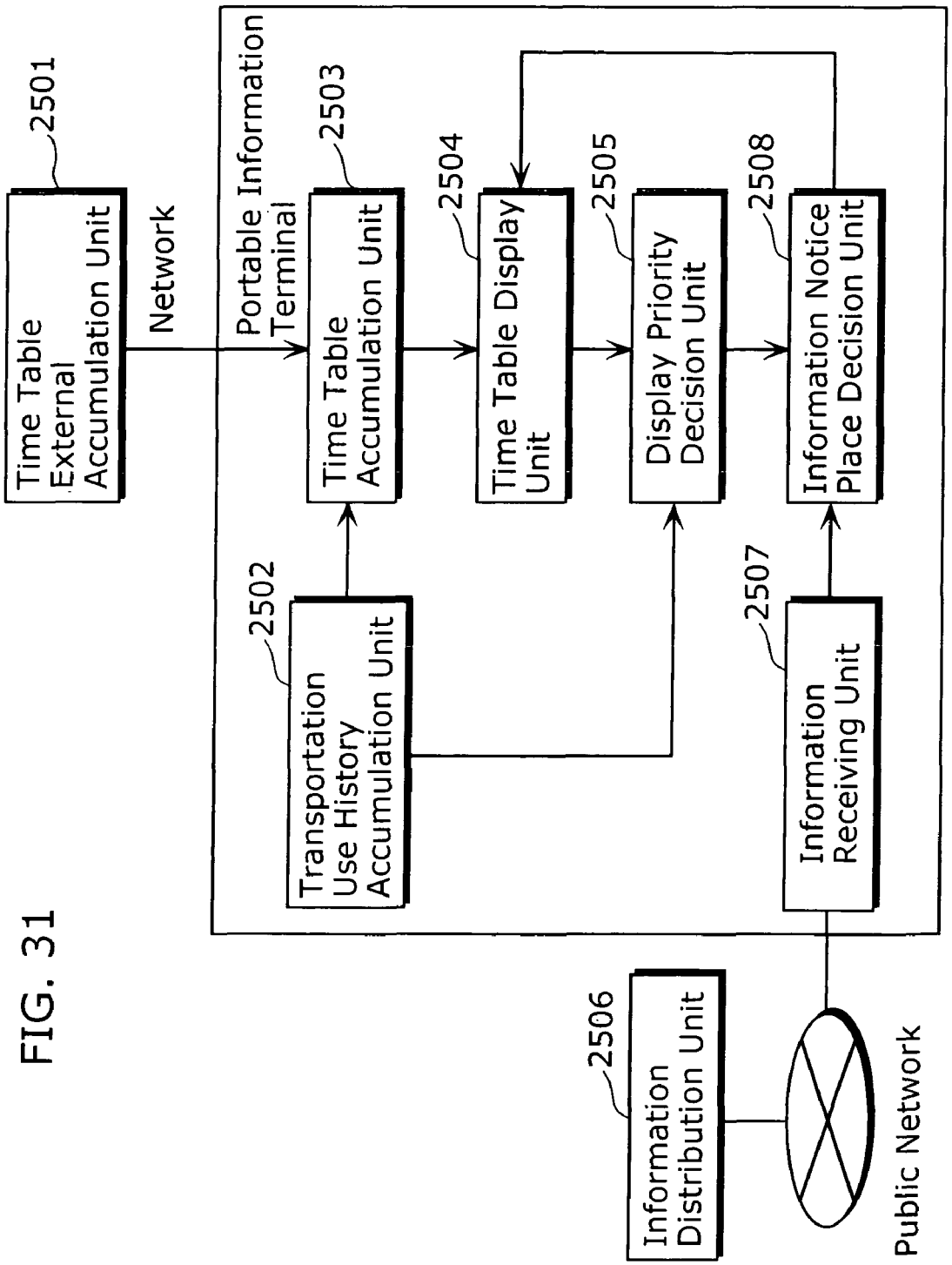
FIG. 31 is a block diagram of a time table distribution system according to the fourth embodiment of the present invention.

FIG. 31 is a block diagram of a time table distribution system according to the fourth embodiment. This time table distribution system is a system which distributes a time table that is the schedule table, to a portable information terminal via a communication network. The time table distribution system includes a time table external storage unit 2501, a transportation use history accumulation unit 2502, a time table accumulation unit 2503, a time table display unit 2504, a display priority decision unit 2505, an information distribution unit 2506, an information receiving unit 2507, and an information notice place decision unit 2508.

Figure 32:
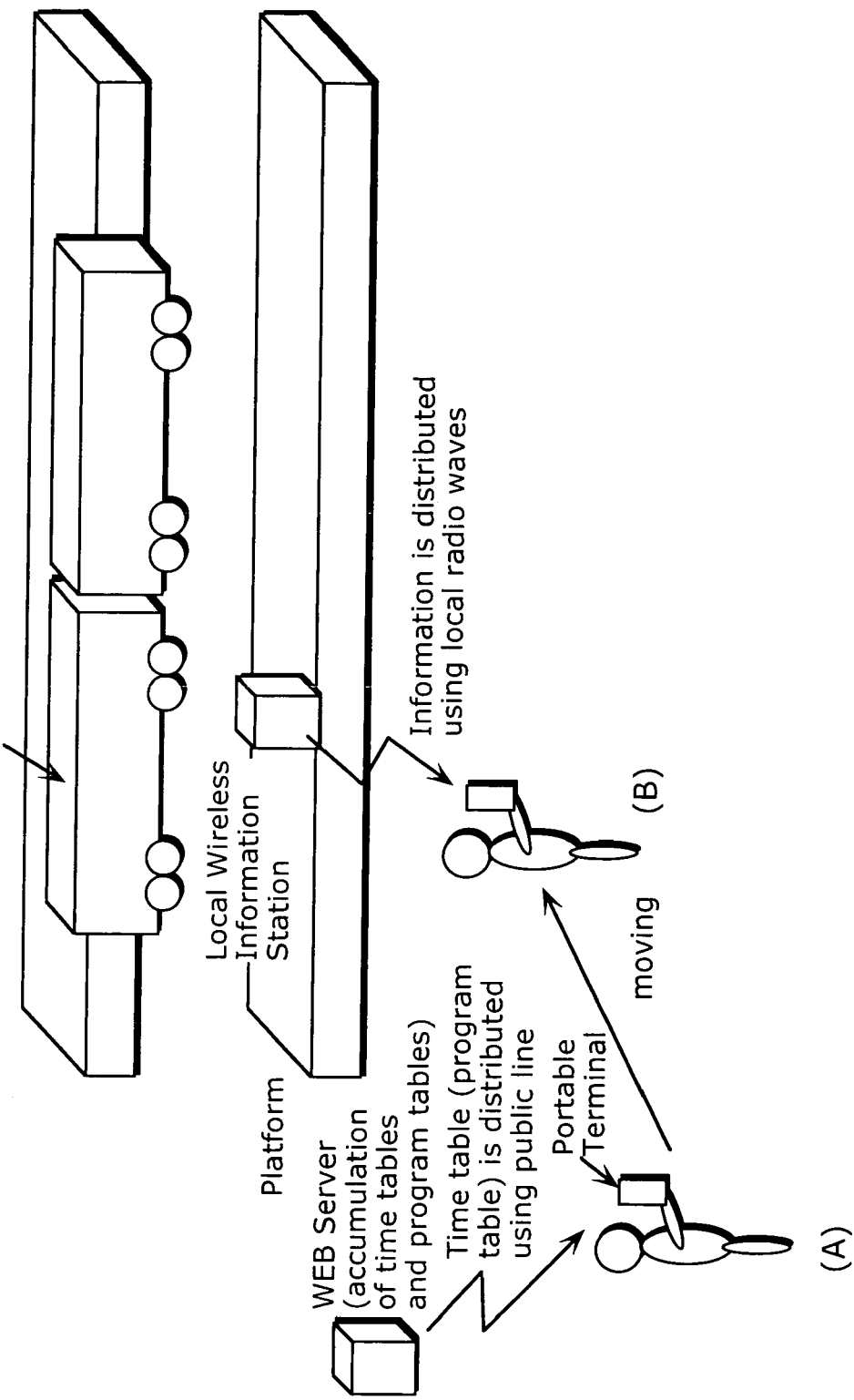
FIG. 32 is a diagram showing a situation in which the time table distribution system can be used.

A situation in which this system can be used is described with reference to FIG. 32. Here, a user going to a platform in a train station is checking a train time table at a location (A). Next, as approaching the platform, service starts for distributing information to a portable information terminal from an information distribution server equipped in the platform. The information distribution server distributes information regarding the station and business facilities near the station via a local wireless network, while the portable information terminal has a function of receiving the information via the local wireless network. When the user reaches a location (B), information, such as information regarding a change in a train schedule of the station, is distributed.

It is assumed that the user is still checking the train time table even when the user reaches the location (B). Now, if the user wishes to check the changed time table distributed from the station, the user usually needs to delete the displayed train time table in order to check the distributed time table. However, in a display apparatus according to the fourth embodiment, on a screen displaying the train time table, a place having a low possibility of being used by the user can be automatically determined and used to display the changed time table distributed from the station.

Next, each of the units shown in FIG. 31 is described.

The time table external accumulation unit 2501 is a Web server, or the like, which accumulates information regarding a time table.

Figures 33A, 33B:
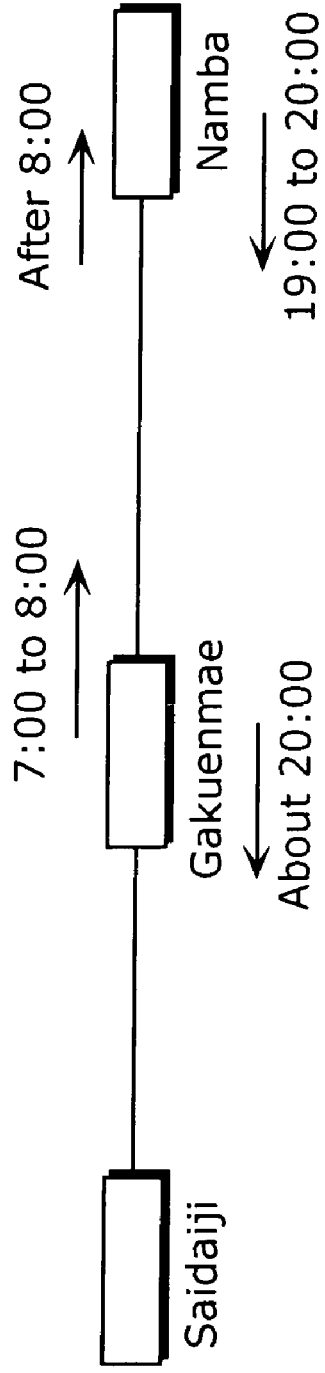
FIG. 33A is a diagram showing an example of a use history accumulated in a transportation use history accumulation unit.
FIG. 33B is a diagram explaining relationships between stations and times in the use history.

The transportation use history accumulation unit 2502 is a storage unit, such as a memory, which accumulates a user's use history regarding transportation. If a portable information terminal has a ticket examination function for the transportation, this transportation use history accumulation unit 2502 is a memory or the like in the portable information terminal, in which the use history is stored. The transportation use history accumulation unit 2502 may be a memory or the like, for temporarily holding, in the portable information terminal, transportation use information which is accumulated outside and obtained via a communication network. The use history accumulated in the transportation use history accumulation unit 2502 is information as shown in a table of FIG. 33A, for example. FIG. 33B is a diagram explaining relationships between stations and times in FIG. 33A.

The time table accumulation unit 2503 is a memory or the like, which obtains the time table accumulated in the time table external accumulation unit 2501, such as a Web server, and accumulates the time table in the portable information terminal. For example, the time table accumulation unit 2503 accumulates the time table as shown in FIG. 34. Note that regarding the time table, a station whose time table is to be displayed may be automatically determined, based on the railroad use history shown in FIG. 33A, or position information.

The time table display unit 2504 is a display device, such as a LCD, or a display control unit, which displays the time table accumulated in the time table accumulation unit 2503 in the portable information terminal. In other words, the time table display unit 2504 is one example of a row and column decision unit which decides a row and a column including a high-priority cell which is selected by the display priority decision unit 2505 or the like, from rows and columns in the schedule table, and is also one example of a table display unit which creates a displayed part of the table which includes parts having high-priority cells in the decided row and column. For example, the history accumulated in the transportation use history accumulation unit 2502 shows that the user usually gets on a train heading to Namba from 7:00 to 8:00, while the user gets on a train heading to Saidaij at Namba station and arrives at Gakuenmae station around 20:00. Therefore, as shown in FIG. 35, time information around 7:00 and 20:00 are extracted to be displayed from the time table.

The display priority decision unit 2505 is a processing unit which decides a priority of displaying a part in the displayed time table, using the use history in the transportation use history accumulation unit 2502. In other words, this display priority decision unit 2505 is one example of a first priority decision unit which decides a priority regarding displaying for each cell included in the schedule table. Regarding the display priority, as shown in FIG. 36, a time slot, during which the user gets on a train, is set to as a high priority, and other display parts are set to as candidates of display regions for the electronic mail.

The information distribution unit 2506 is a computer apparatus or the like, which distributes information to the portable information terminal via a local wireless network, or the like.

The information receiving unit 2507 is a communication interface or the like, which receives the information by the portable information terminal from the information distribution unit 2506. In other words, this information receiving unit 2507 is one example of an information obtainment unit which obtains information via a communication network.

Figure 36:
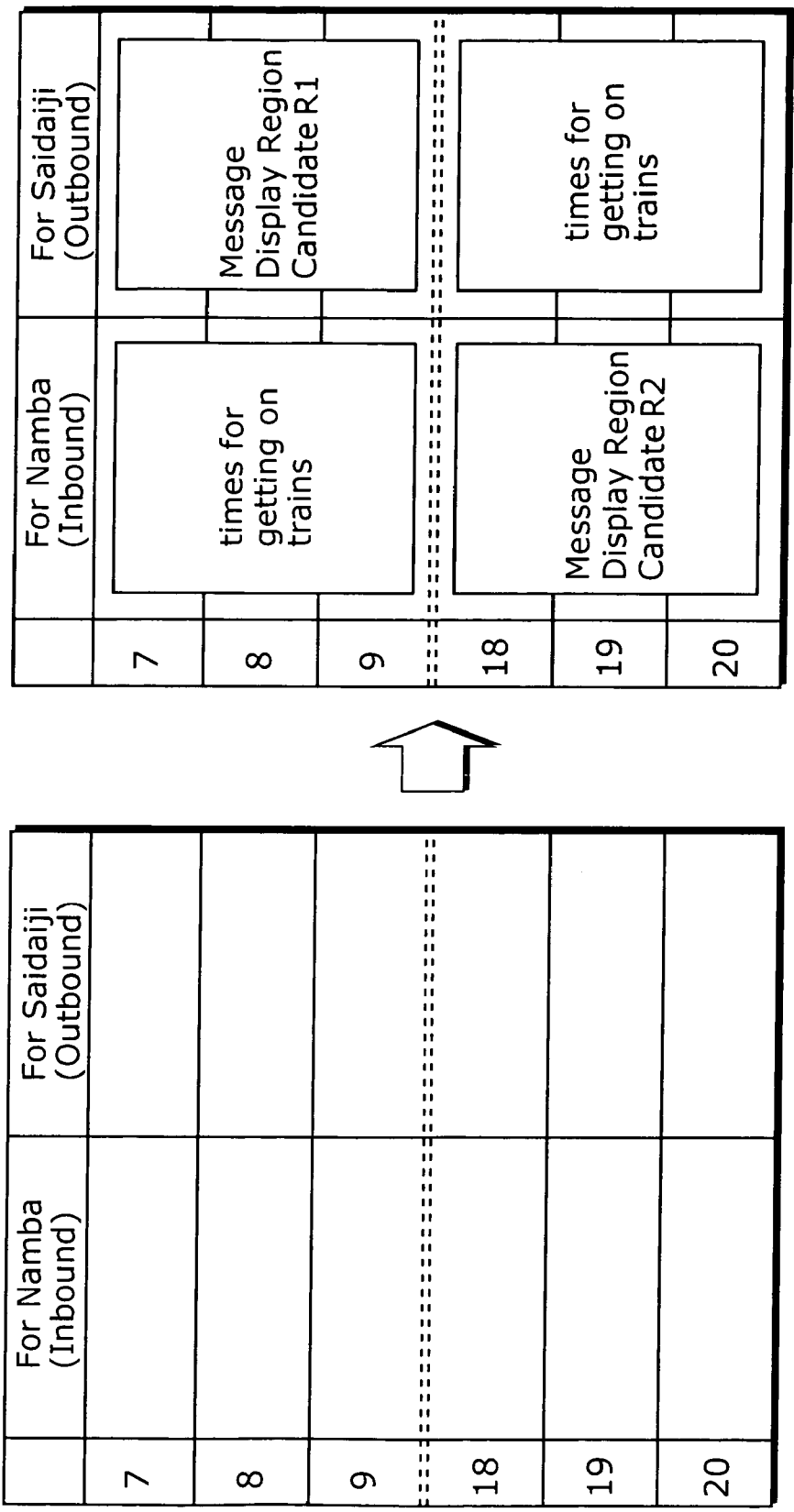
FIG. 36 is a diagram showing display regions at which electronic mails are displayed as overlapped on the time table.

The information notice place decision unit 2508 is a processing unit which selects and decides a region at which the information received by the information receiving unit 2507 is to be displayed, among electronic mail display region candidates R1 and R2 in a right-hand diagram of FIG. 36. Time information which is the furthest from a current time is judged to have a low display priority, and when the current time is in the morning, the electronic mail display area candidate R2 is selected. As a result, as shown in FIG. 37, electronic mail is displayed on a time table of a station which the user rarely uses. In other words, the information notice place decision unit 2508 is one example of a table display unit which displays communication information obtained from the outside, as overlapped on a low-priority cell among the cells included in the displayed table.

Figure 38:
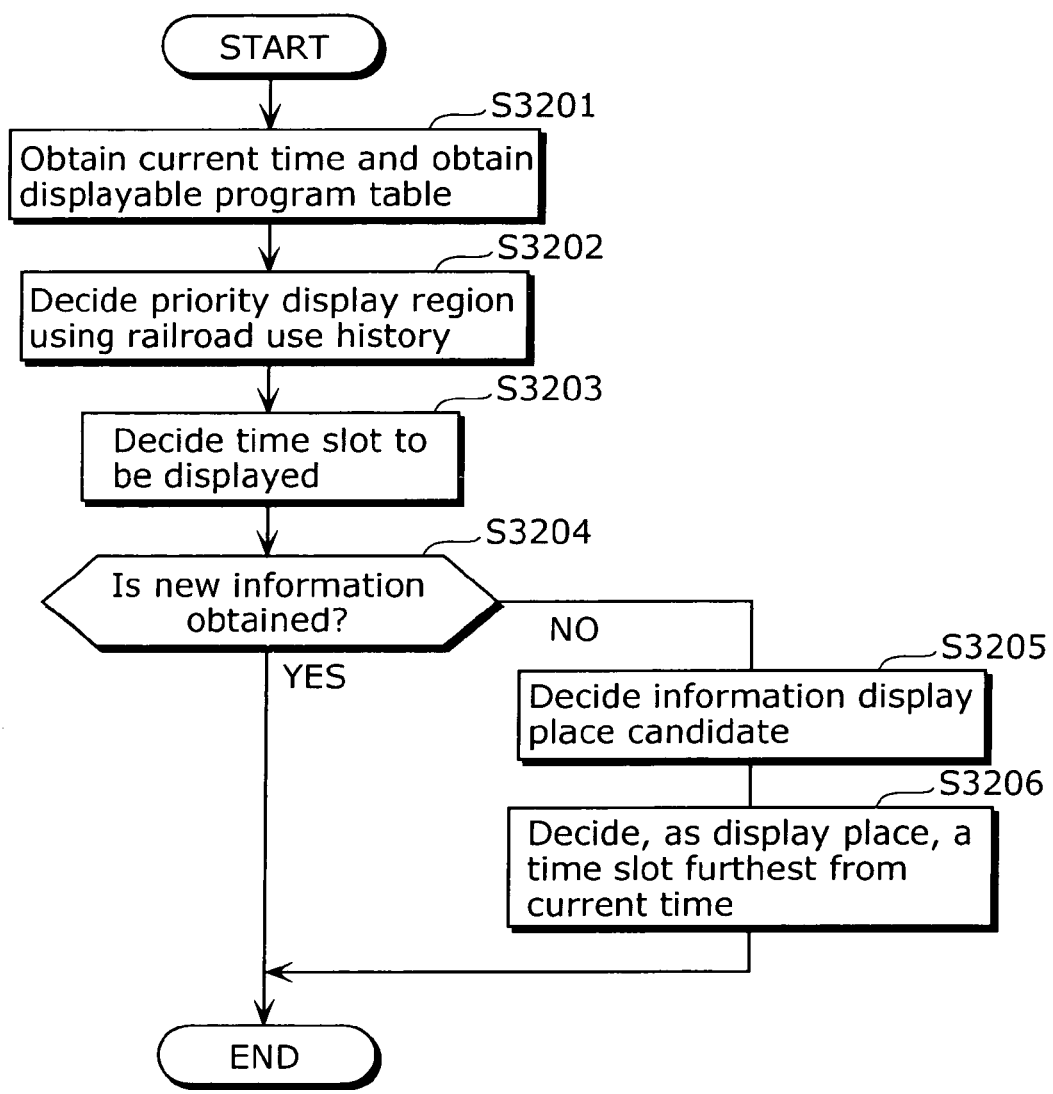
FIG. 38 is a flowchart showing processing performed by a portable information terminal in the time table distribution system.

Next, processing performed by the portable information terminal in the time table distribution system having the above structure according to the fourth embodiment is described with reference to a flowchart of FIG. 38.

Firstly, the time table accumulation unit 2503 obtains a current time, then, based on the current time, obtains a time table from the time table external accumulation unit 2501, and accumulates the obtained time table (S3201). Next, the display priority decision unit 2505 sets a place at which the distributed information is to be displayed as priority, by selecting in the time table a part (cell) in a time slot during which the user usually uses trains, based on the history accumulated in the transportation use history accumulation unit 2502 (S3202). The time table display unit 2504 displays the time information in the time slot during which the user usually uses trains (S3203). When the information receiving unit 2507 obtains new information via a local radio or the like (S3204), the processing proceeds to Step S3205. The information notice place decision unit 2508 selects the electronic mail display region candidates R1 and R2 in the right-hand diagram of FIG. 36, for example, as candidates of the display region (S3205). A time slot which is far from the current time is judged to have a low display priority (S3206). As a result, as the time table display example shown in FIG. 37, the time table display unit 2504 displays the information received from a local wireless information station in the railroad station, as overlapped on the time information in the low-priority time slot.

As described above, in the fourth embodiment, based on the history of user's transportation use, a part of the time table with a high possibility (high priority) that the user uses is extracted and displayed. Therefore, without bothersome displaying operations, it is possible to find out desired time information immediately and intuitively. In addition, when electronic mail or local radio information is received, the received massage is displayed on a low-priority display region in the time table, so that both of the time table and the received electronic mail can be browsed at the same time, without preventing browsing of the time table.

Figure 39:
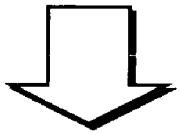
FIG. 39 is a diagram showing a display example in which electronic mail is overlapped on a schedule table.

Note that it has been described in the fourth embodiment that, when electronic mail is obtained, a place for displaying the electronic mail is decided based on display importance of each cell which is the information in the time table displayed in a table format. However, as shown in FIG. 39, if information regarding a private schedule is displayed, it is also possible to calculate priority importance of each cell in the schedule table, and decide, based on the value of the importance, a place for displaying received electronic mail. It is also possible, when the schedule is displayed, to calculate importance for an individual, as display importance of each cell, from input indication in each schedule, a person who inputs the schedule, the number of times when the schedule is confirmed, the number of times when the schedule is changed, and the like, as shown in FIG. 40, in order to assign the weight of importance to each cell. In the case of private schedule information, the importance of the schedule is different depending on the individual, so that a display place can be decided in the same processing described in the first to third embodiments.

Note also that, in the fourth embodiment, using information in the time during which the user uses trains as the transportation use history, a part with a user's high priority is judged in the displayed time table. However, as the transportation use history, only history information regarding destinations of trains may be used. For example, In FIG. 37, for a user who gets on, at Gakuenmae station, only trains heading to Saidaiji, a time table of Gakuenmae station for Namba direction is hardly used. At least, a display priority of the time table is considered as low. Therefore, it is possible to display the received information on the time information regarding trains for Namba direction. On the other hand, if at Saidaiji station, the user often gets on trains heading to Namba, time information for Namba direction has a high priority, and the received information is displayed on other low-priority time information. This is realized by considering the user's transportation use history, and information regarding a station whose time table is displayed by the user (information regarding transportation).

Fifth Embodiment

Next, the fifth embodiment according to the present invention is described.

In the third embodiment, when the interrupting information such as electronic mail is to be displayed during displaying the program table, efficient displaying can be realized by calculating a display priority of each piece of program information (cell) in the displayed program table.

In the fifth embodiment, however, a detail degree of the program information can be changed, and using the characteristics, the interrupting information such as electronic mail is displayed efficiently. In general, in the program information, a great amount of information can be displayed to indicate the program in detail, including a program title, cast information, a category, detail of each episode, and the like. On the other hand, even displaying of only a program title enables the user to check a channel, a starting time, and an ending time of the program. Therefore, in the fifth embodiment, a detail degree of the displayed program information is changed to display only summarized information, so that a region for displaying other information can be created. As characteristic processing, if the program table is being displayed when electronic mail is received, the displayed detailed program information is changed to only summarized information, and a region is created to display indication of the electronic mail.

Figure 41:
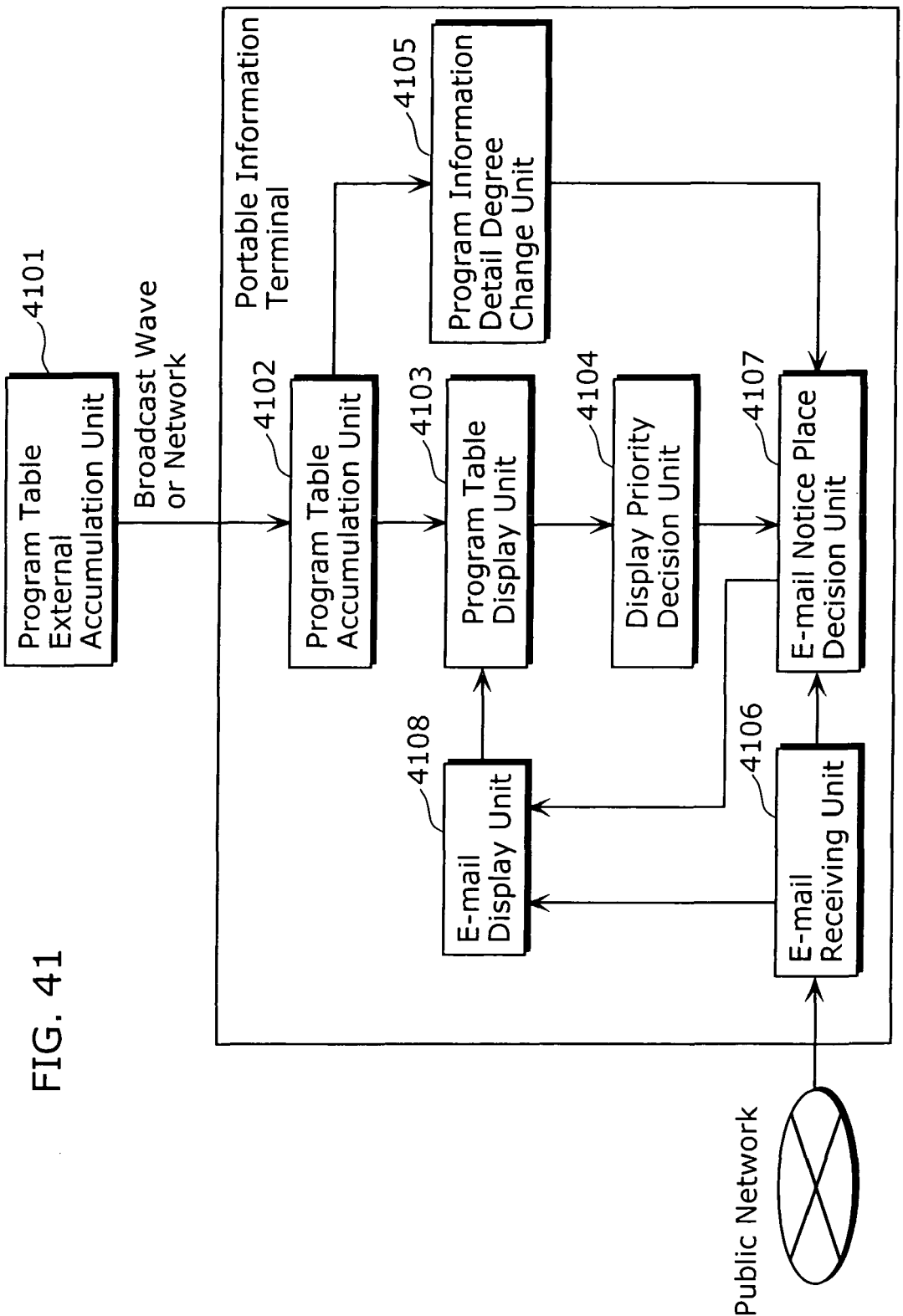
FIG. 41 is a block diagram of a program distribution system according to the fifth embodiment of the present invention.

FIG. 41 is a block diagram of a program distribution system according to the fifth embodiment. This program distribution system is a system which distributes a program, a program table representing a schedule table, and the like, to a portable information terminal via broadcast waves or a communication network. The program distribution system includes a program table external accumulation unit 4101, a program table accumulation unit 4102, a program table display unit 4103, a display priority decision unit 4104, a program information detail degree change unit 4105, an e-mail receiving unit 4106, an e-mail notice position decision unit 4107, and an e-mail display unit 4108. Here, the program table external accumulation unit 4101, the program table accumulation unit 4102, the program table display unit 4103, the display priority decision unit 4104, and the e-mail receiving unit 4106 correspond to the same name units described in the third embodiment, so that details of these units are not described again in the fifth embodiment.

The program information detail degree change unit 4105 changes a detail degree of each piece of program information displayed by the program table display unit 4103 accumulated in the program table accumulation unit 4102, in order to display only program titles of the program information. It is assumed that, in the program information accumulated in the program table accumulation unit 4102, plural pieces of information, such as a title or cast information, are separated by tags, such as an extensible Markup Language (XML). Here, the program information displayed by the program table display unit 4103 sometimes includes only a title, and sometimes includes cast information and detail of the program in addition to the title. For example, in a display example shown in a left-hand diagram of FIG. 42, eight pieces of program information are displayed, but, each of four pieces of the program information includes only a title, while each of other program information includes detail of the program in addition to the title. Therefore, the program information detail degree change unit 4105 sets the program information in which further information is added, to display only summarized information such as a title. Thereby, as shown in a right-hand diagram of FIG. 42, two parts Q1 and Q2 can be obtained as display regions.

The e-mail notice position decision unit 4107 decides a place at which indication of the electronic mail received by the e-mail receiving unit 4106 is to be displayed, according to (i) the priority of each piece of program information calculated by the display priority decision unit 4104, and (ii) the display regions created by changing the detail degree of the program information by the program information detail degree change unit 4105. Particularly if there are plural regions created by the program information detail degree change unit 4105, the place for displaying the electronic mail is decided using the priority of each piece of program information calculated by the display priority decision unit 4104. For example, as shown in the right-hand diagram of FIG. 42, when the plural regions Q1 and Q2 are created, and it is determined that information of a program starting from 7:00 that is near the current time has a higher priority, the display priority decision unit 4104 selects the region Q2 and decides to display the indication of the electronic mail in the region Q2.

The e-mail display unit 4108 displays the indication of the electronic mail received by the e-mail receiving unit 4106, in the place decided by the e-mail notice position decision unit 4107, covering the program information displayed by the program table display unit 4103. As a result, for example, as shown in FIG. 43, the electronic mail is displayed in the region Q2, and in the region Q1, the program information is displayed as before.

In other words, the e-mail notice position decision unit 4107 and the e-mail display unit 4108 are table display units which display communication information obtained from the outside, on a low-priority cell among cells included in the displayed table.

Figure 44:
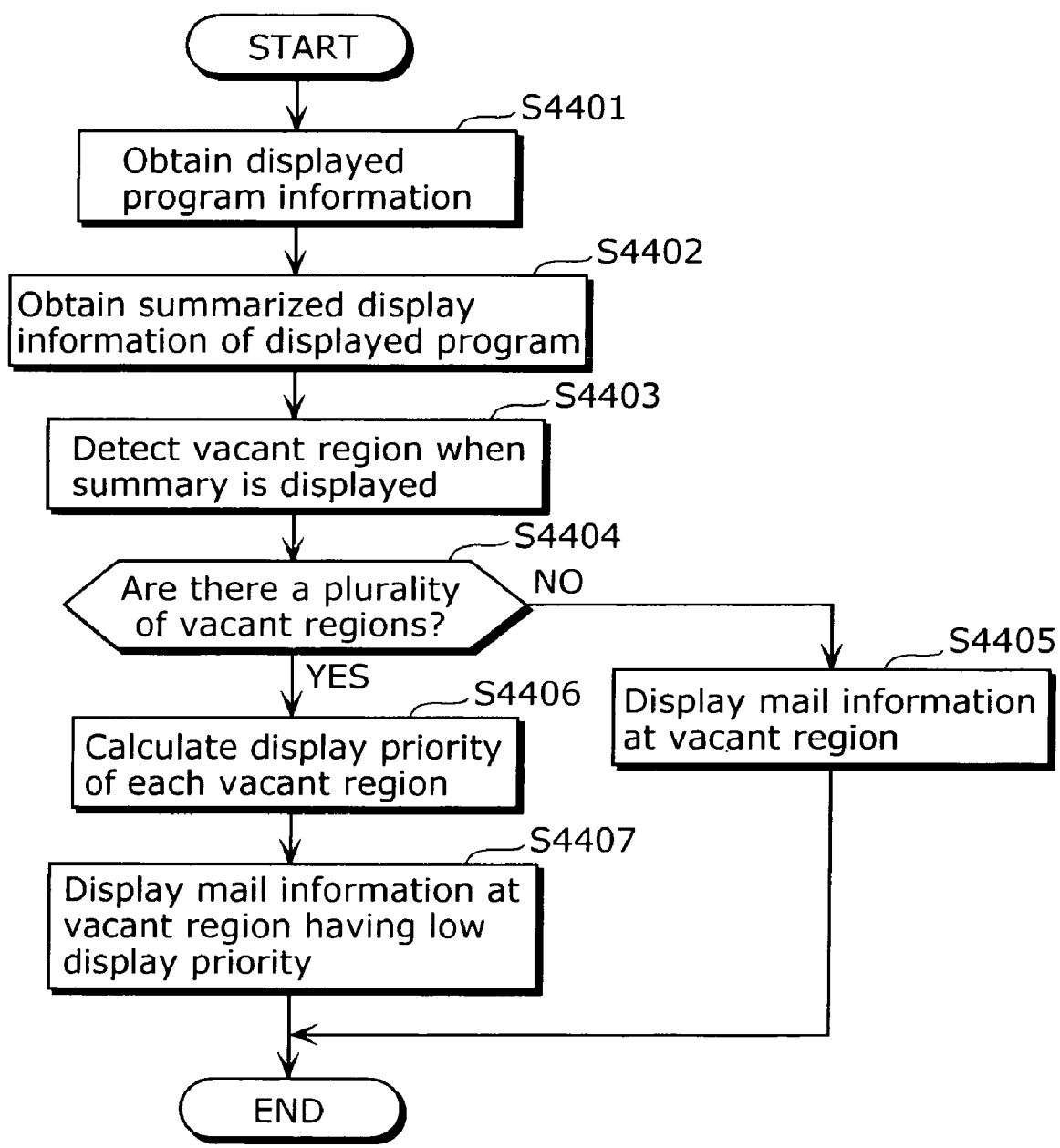
FIG. 44 is a flowchart showing processing performed by a portable information terminal in the program distribution system.

Next, processing performed by the portable information terminal in the program distribution system having the above structure according to the fifth embodiment is described with reference to a flowchart of FIG. 44.

Firstly, each piece of program information is obtained from the program table displayed by the program table display unit 4103 (S4401). Regarding each piece of program information obtained at Step S4401, the program information detail degree change unit 4105 judges whether or not summarized information can be displayed instead of the detail program information (S4402). In addition, the program information detail degree change unit 4105 detects a vacant region which is to be obtained when the summarized program information is displayed (S4403). As a result, in the case of FIG. 42, Q1 and Q2 are detected.

Next, the e-mail notice position decision unit 4107 judges whether or not plural vacant regions are detected at S4403 (S4404), and if there is only one vacant region, then the region is decided as a place for noticing the electronic mail (S4405).

On the other hand, if there are plural vacant regions, then a priority is calculated by the display priority decision unit 4104 for each of the vacant regions (S4405). As a result of calculating the priority for each of the plural vacant regions, a low-priority region (Q2 in the case of FIG. 42) is decided as a place for noticing the electronic mail (S4407). The e-mail display unit 4108 displays the indication of the electronic mail obtained by the e-mail receiving unit 4106, in the place for noticing the electronic mail.

As a result of the above described processing, when the electronic mail is received during browsing the program table, the detail program information is automatically changed to the summarized information, in order to obtain a place for displaying the electronic mail, without switching to a mode of browsing electronic mail. Thereby, without preventing the browsing of the program table, it is also possible to check indication of the electronic mail. In addition, by displaying only a sender and a subject of the electronic mail, the user can judge whether or not the mail is to be browsed immediately, so that even when the user is searching a preferred program in the program table, the user can also check the indication of the electronic mail, without being prevented from the searching.

Note that, in the fifth embodiment, the e-mail notice position decision unit 4107 selects, based on a display priority of a cell, one region from the plural regions which are obtained by changing detail degrees by the program information detail degree change unit 4105. However, when a text amount of the electronic mail is too large in one region, the indication of the electronic mail may be displayed in a combination of the regions obtained by changing the detail degrees. Especially when plural electronic mails are received, text information of each electronic mail may be displayed in each region. For example, as shown in FIG. 45, the received mails are displayed in respective regions. It is also possible to display sender information of one electronic mail in an upper region, and to display detail information of the same electronic mail in a lower region. Note also that when both of the program information or the like and the information of the electronic mail are displayed, a direction of arranging characters may be fixed, which enables the user to check the information easily.

Sixth Embodiment

Next, the sixth embodiment according to the present invention is described.

In the third embodiment, when the interrupting information such as electronic mail is to be displayed during displaying the program table, efficient displaying can be realized by calculating a display priority of each piece of program information (cell) in the displayed program table.

However, since the electronic mail is displayed covering a part of the program table, the user sometimes wishes to see program information hidden under the electronic mail. Therefore, it is necessary to enable the user to check both the program table and the electronic mail, by scrolling the displayed program table. In this case, only the program table is scrolled, while the electronic mail is fixed on the same position on the screen. On the other hand, when the program table is scrolled enough to display a part totally different from the previous part in which the electronic mail is displayed, it is necessary to calculate again a display priority of each new cell to decide a place for displaying again the electronic mail. The sixth embodiment describes characteristic processing by which, when both of the program table and the electronic mail are displayed, a cell (or display position on the screen) at which the electronic mail is to be displayed is decided again, according to an amount of user's scrolling of the program table.

Figure 46:
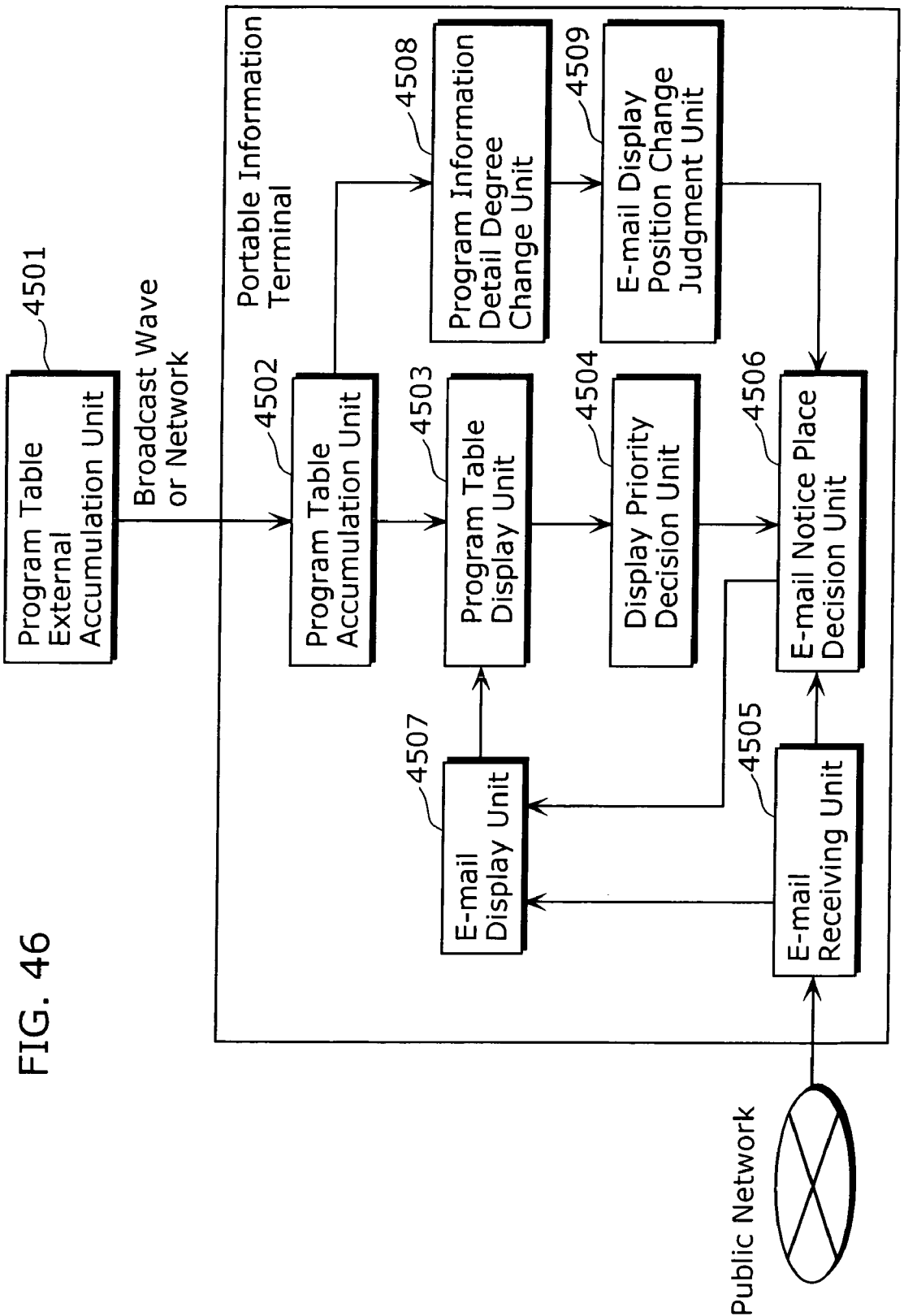
FIG. 46 is a block diagram of a program distribution system according to the sixth embodiment of the present invention.

FIG. 46 is a block diagram of a program distribution system according to the sixth embodiment of the present invention. This program distribution system is a system which distributes a program, a program table representing a schedule table, and the like, to a portable information terminal via broadcast waves or a communication network. The program distribution system includes a program table external accumulation unit 4501, a program table accumulation unit 4502, a program table display unit 4503, a display priority decision unit 4504, an e-mail receiving unit 4505, an e-mail notice place decision unit 4506, an e-mail display unit 4507, a scroll instruction input unit 4508, and an e-mail display position change judgment unit 4509. Here, the program table external accumulation unit 4501, the program table accumulation unit 4502, the program table display unit 4503, the display priority decision unit 4504, the e-mail receiving unit 4505, the e-mail notice place decision unit 4506, and the e-mail display unit 4507 correspond to the same name units described in the fifth embodiment, so that details of these units are not described again in the sixth embodiment.

Figure 47:
FIG. 47 is a diagram showing a display example in which the program table is scrolled in a vertical direction.

The scroll instruction input unit 4508 receives an inputted instruction for scrolling of the program table displayed by the program table display unit 4503. The instruction for scrolling is inputted by directional arrow keys or the like in a portable telephone, for example. Here, the program table is scrolled in a vertical direction for an amount of one time slot as shown in FIG. 47, or scrolled in a horizontal direction to change displayed channels as shown in FIG. 48. In the case of FIG. 47, some pieces of program information still remain displayed on the screen even after scrolling. In the case of FIG. 48, on the other hand, all displayed channels are changed, so that same program information does not remain displayed after scrolling.

The e-mail display position change judgment unit 4509 judges, according to detail of a scroll instruction inputted by the scroll instruction input unit 4508, whether or not a display position (cell) of the electronic mail is to be changed after scrolling. More specifically, when, as shown in FIG. 47, the program table is scrolled for an amount of only one time slot, it is judged that the user wishes to see program information on Channel 104 from 10:00 which has been hidden under the electronic mail, and a display position (display position on the screen) of the electronic mail is not changed. On the other hand, if, as shown in FIG. 48, the user scrolls the program table to see other program information on different channels, a display priority is calculated again by the display priority decision unit 4504 for each piece of program information newly displayed by the program table display unit 4503, and the electronic mail information is displayed on low-priority program information (cell), changing the display position. In other words, judgment is made as to whether or not the electronic mail is to be displayed again, depending on (i) an amount and a direction of the scroll instruction inputted by the scroll instruction input unit 4508, and (ii) a place at which the electronic mail is currently displayed. Thereby, it is possible to automatically judge whether the user scrolls to check program information hidden under the displayed electronic mail, or the user scrolls to see other program information, and eventually deciding a new display position of the electronic mail on the screen.

Figure 49:
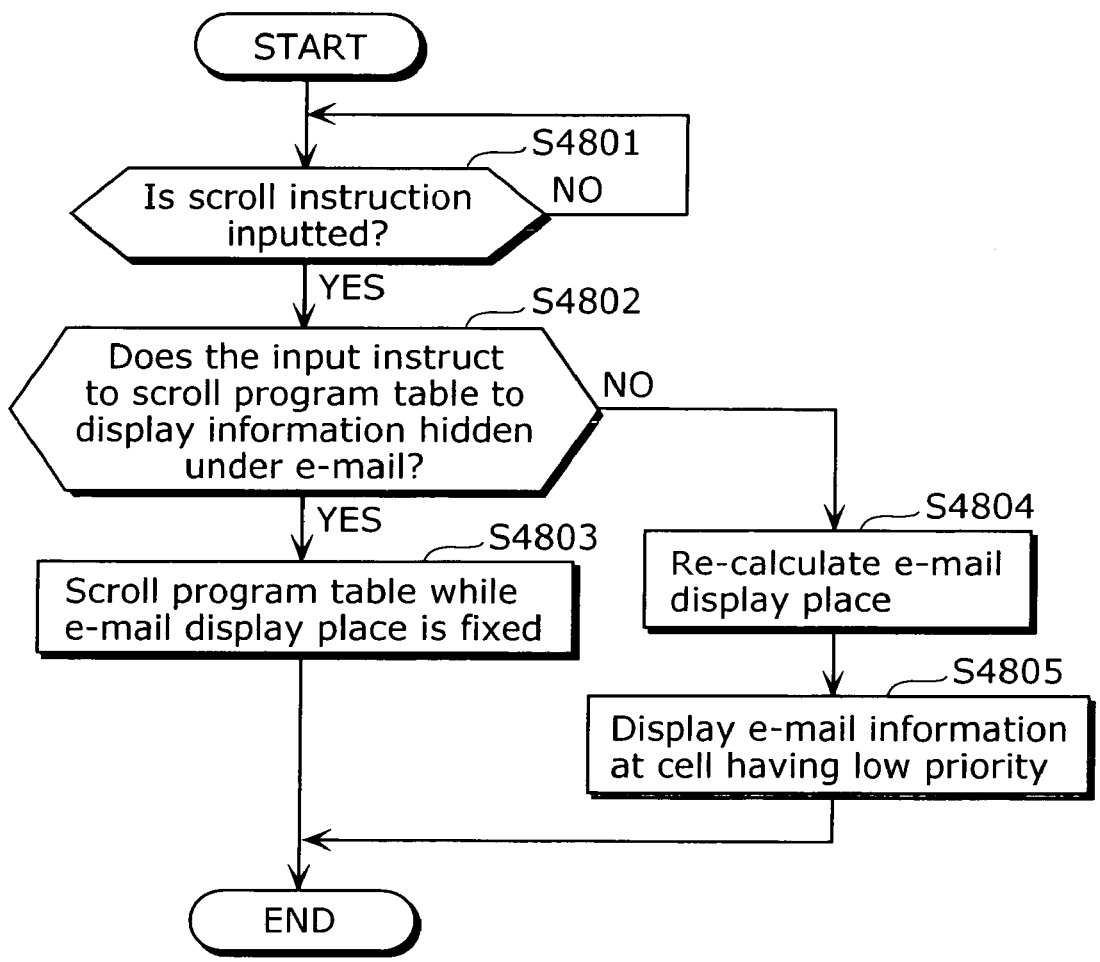
FIG. 49 is a flowchart showing processing performed by a portable information terminal in the program distribution system.

Next, processing performed by the portable information terminal in the program distribution system having the above structure according to the sixth embodiment is described with reference to a flowchart of FIG. 49.

Firstly, the scroll instruction input unit 4508 judges whether or not a scroll instruction is received, and if there is no scroll instruction, the processing repeats this step (S4801). If the scroll instruction is received, then it is judged whether or not the scroll instruction is to display program information hidden under the displayed electronic mail (S4802). If the scroll instruction is to display program information hidden under the electronic mail, then the e-mail display position change judgment unit 4509 scrolls the program table to change only program information, without changing a display position (display position on a screen) of the electronic mail (S4803). On the other hand, if the scroll instruction is not to display program information hidden under the electronic mail, then the processing proceeds to Step S4804, and the display priority decision unit 4504 calculates again a priority of each piece of program information newly displayed after scrolling (S4804). The e-mail notice place decision unit 4506 extracts a program information cell having a low display priority, and decides the extracted cell as a new display place for the electronic mail.

As a result of the above-described processing, if the program table is scrolled to display program information hidden under the displayed electronic mail, the program information can be displayed while the electronic mail remains on the same display position on the screen. If the program table is scrolled to display other new program information, the display position of the electronic mail is automatically changed, based on a newly calculated display priority of each cell in the scrolled program table.

Note that, in the sixth embodiment, when the program table is scrolled to display program information hidden under the displayed electronic mail, the display position of the electronic mail is not changed. On the other hand, in the sixth embodiment, when the program table is scrolled to totally change displayed program information, the display part on the screen for the electronic mail is again calculated. Alternatively or additionally, however, when, as shown in FIG. 50, a display priority of the part at which the electronic mail is displayed is low enough (no broadcasting, such as broadcast intermission, for example), the program table may be scrolled while the electronic mail remains displayed on the same cell. In other words, the electronic mail may be moved together with the moving of the cell, so that the electronic mail is always displayed on the cell even after scrolling.

Note also that it has been described in the sixth embodiment that, when the program table is scrolled to display program information hidden under the displayed electronic mail, the display position of the electronic mail is not changed. Alternatively or additionally, however, it is also possible to judge that the electronic mail is to be displayed if the program table is scrolled, then display to the user electronic mail for confirming of deleting the displayed electronic mail, and according to a replay of the user, cancel the displaying of the electronic mail.

Note also that, as shown in FIG. 51, the electronic mail is displayed on a part of Channel 104 from 10:00, and if the program table is further scrolled downwards, there is no place for displaying the electronic mail. In this case, it is possible to extract again low-priority program information in the newly displayed program table, and display the electronic mail information on the extracted program information.

Note also that, in the sixth embodiment, the electronic mail is displayed as overlapped on a part of the newly displayed program table immediately after scrolling the program table. However, it is also possible to display the electronic mail again after a predetermined time period (three seconds, for example). Thereby, the user can check the electronic mail after checking the whole newly displayed program table. Here, the predetermined time period may be changed depending on an amount of characters displayed in the cell, or an amount of characters in the electronic mail. Thereby, the electronic mail displaying can be changed according to the information amount of the cell on which the electronic mail is to be displayed.

Seventh Embodiment

Next, the seventh embodiment according to the present invention is described.

In the third embodiment, even if the electronic mail is received during browsing the program table, indication of the electronic mail can be checked by displaying the electronic mail on a cell in the program table. However, even if the electronic mail is displayed only on a part of the program table, it is difficult to see whole information of the electronic mail. Therefore, the seventh embodiment describes characteristic processing by which, the user focuses on the displayed electronic mail after the electronic mail is displayed on a cell in the program table, or a region for displaying the electronic mail is further enlarged when the cell on which the electronic mail is displayed is selected.

Figure 52:
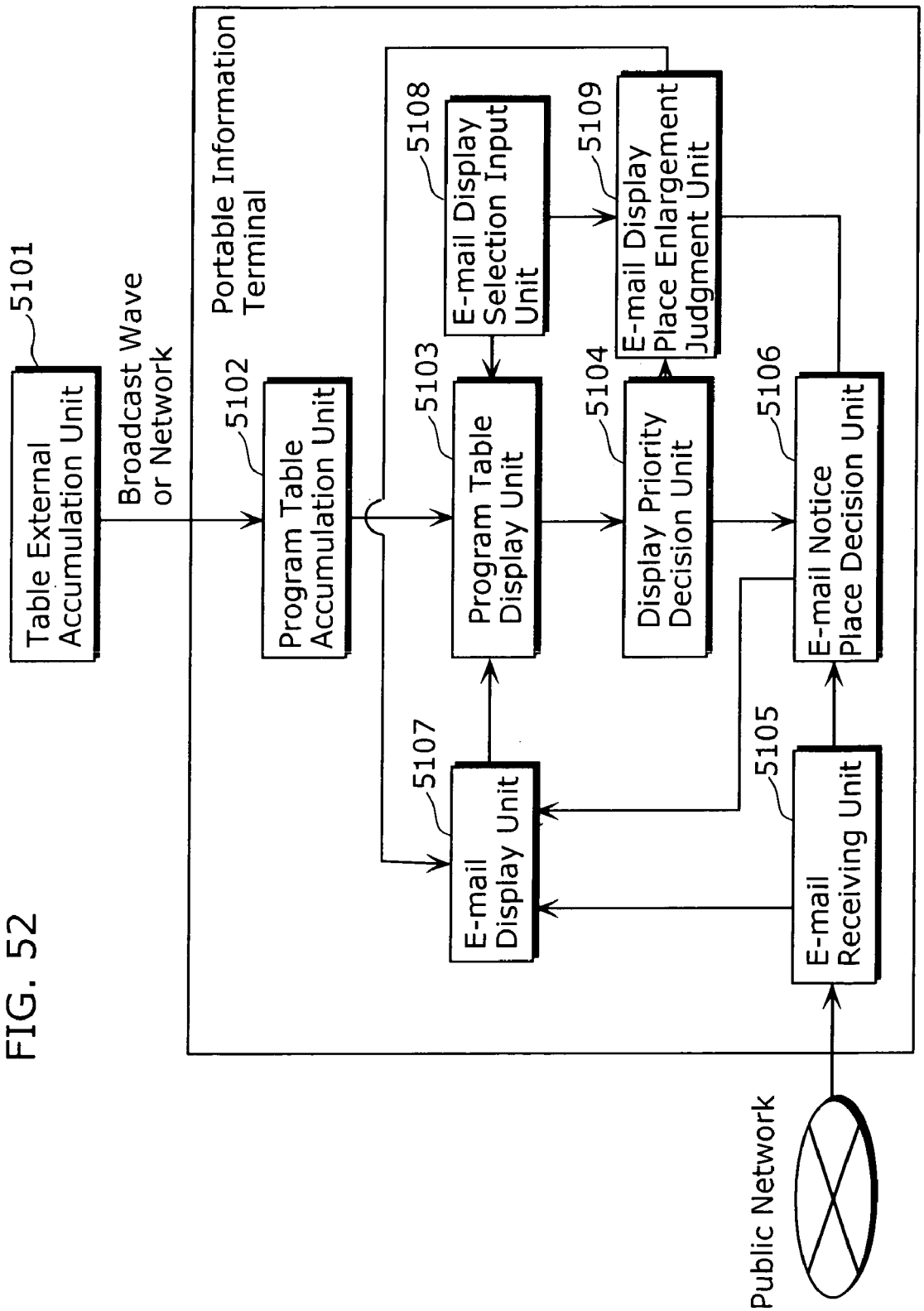
FIG. 52 is a block diagram of a program distribution system according to the seventh embodiment of the present invention.

FIG. 52 is a block diagram of a program distribution system according to the seventh embodiment of the present invention. This program distribution system is a system which distributes a program, a program table representing a schedule table, and the like, to a portable information terminal via broadcast waves or a communication network. The program distribution system includes a program table external accumulation unit 5101, a program table accumulation unit 5102, a program table display unit 5103, a display priority decision unit 5104, an e-mail receiving unit 5105, an e-mail notice place decision unit 5106, an e-mail display unit 5107, an e-mail display selection input unit 5108, and an e-mail display position enlargement judgment unit 5109. Here, the program table external accumulation unit 5101, the program table accumulation unit 5102, the program table display unit 5103, the display priority decision unit 5104, the e-mail receiving unit 5105, the e-mail notice place decision unit 5106, and the e-mail display unit 5107 correspond to the same name units described in the fifth and sixth embodiments, so that details of these units are not described again in the seventh embodiment.

The e-mail display selection input unit 5108 receives an input operation by which the user selects a cell in the program table, on which the electronic mail is displayed. For example, the user moves a frame to the cell on which the electronic mail is displayed, using a cross key in a portable telephone, and selects the cell by pressing a decision key or the like.

Figure 53:
FIG. 53 is a diagram showing how the display region of the electronic mail is to be enlarged.
Figure 54:
FIG. 54 is a diagram showing an example in which the electronic mail is displayed in the enlarged region.

The e-mail display position enlargement judgment unit 5109 selects a cell which is adjacent to the cell selected by the inputting by the e-mail display selection input unit 5108 (cell on which the electronic mail is displayed), decides to enlarge a region for displaying the electronic mail, and re-displays the electronic mail on the cell enlarged by the e-mail display unit 5107. For example, as shown in FIG. 53, a cell on Channel 104 from 10:00 has a low display priority, so that the electronic mail is displayed on the cell. Here, the e-mail display position enlargement judgment unit 5109 judges whether the cell on which the electronic mail is displayed is to be enlarged in a vertical direction, or in a horizontal direction. As shown in a right-hand diagram of FIG. 53, there are two enlarging directions as shown by regions P1 and P2. In this example, a display priority of each piece of program information, which is to be hidden when the display region for the electronic mail is enlarged in each direction, is calculated, and then, based on the calculation, the display region is enlarged towards the low-priority program information, in order to display the electronic mail. In the example shown in FIG. 53, a display priority of the region P2 is assumed to be lower than a display priority of the region P1. As a result, as shown in FIG. 54, the display region is enlarged in a horizontal direction to display the electronic mail.

Next, processing performed by the portable information terminal in the program distribution system having the above structure according to the seventh embodiment is described with reference to a flowchart of FIG. 55.

Firstly, the e-mail display selection input unit 5108 judges whether or not a cell on which the electronic mail is displayed is selected (S5401). If the cell is selected, then the e-mail display position enlargement judgment unit 5109 selects another cell positioned in a direction of enlarging the current display region for the electronic mail (S5402). In the example shown in FIG. 53, the regions P1 and P2 are selected. In addition, the e-mail display position enlargement judgment unit 5109 selects an enlarging direction, based on the display priority calculated by the display priority decision unit 5104 for each cell positioned in the enlarging direction (S5403). In the example shown in FIG. 53, the region P2 has a lower priority, so that the cells in the region P2 are combined, and the e-mail display unit 5107 displays the information of the electronic mail on the combined region (S5404).

As a result of the above-described processing, even when the electronic mail is received during displaying the program table, indication of the electronic mail can be checked. Moreover, when the electronic mail is selected, the indication of the electronic mail can be checked, by deleting the display region of the program table and enlarging the display region of the electronic mail.

Note that, in the seventh embodiment, the e-mail display position enlargement judgment unit 5109 selects an enlarged region from the regions P1 and P2, for example. However, when the display priorities of both regions are less than a predetermined value, or when the display priorities of both regions are equal, it is also possible to create a further rectangle by combining the both enlarged regions, to display the indication of the electronic mail. As a result, as shown in FIG. 56, it is also possible to obtain a new region by combining plural enlarged regions, to display the electronic mail.

Eighth Embodiment

Next, the eighth embodiment according to the present invention is described.

In the third embodiment, when the electronic mail, which does not relate to broadcast contents (programs), is received during displaying the program table regarding the broadcast contents, a position, at which the text information of the electronic mail is to be displayed, is automatically decided. However, some text information obtained via a network relates to a cell in the displayed program table. Therefore, the eighth embodiment describes characteristic processing by which, when information related to a cell in the program table is received, the received text information is displayed near the cell.

Figure 57:
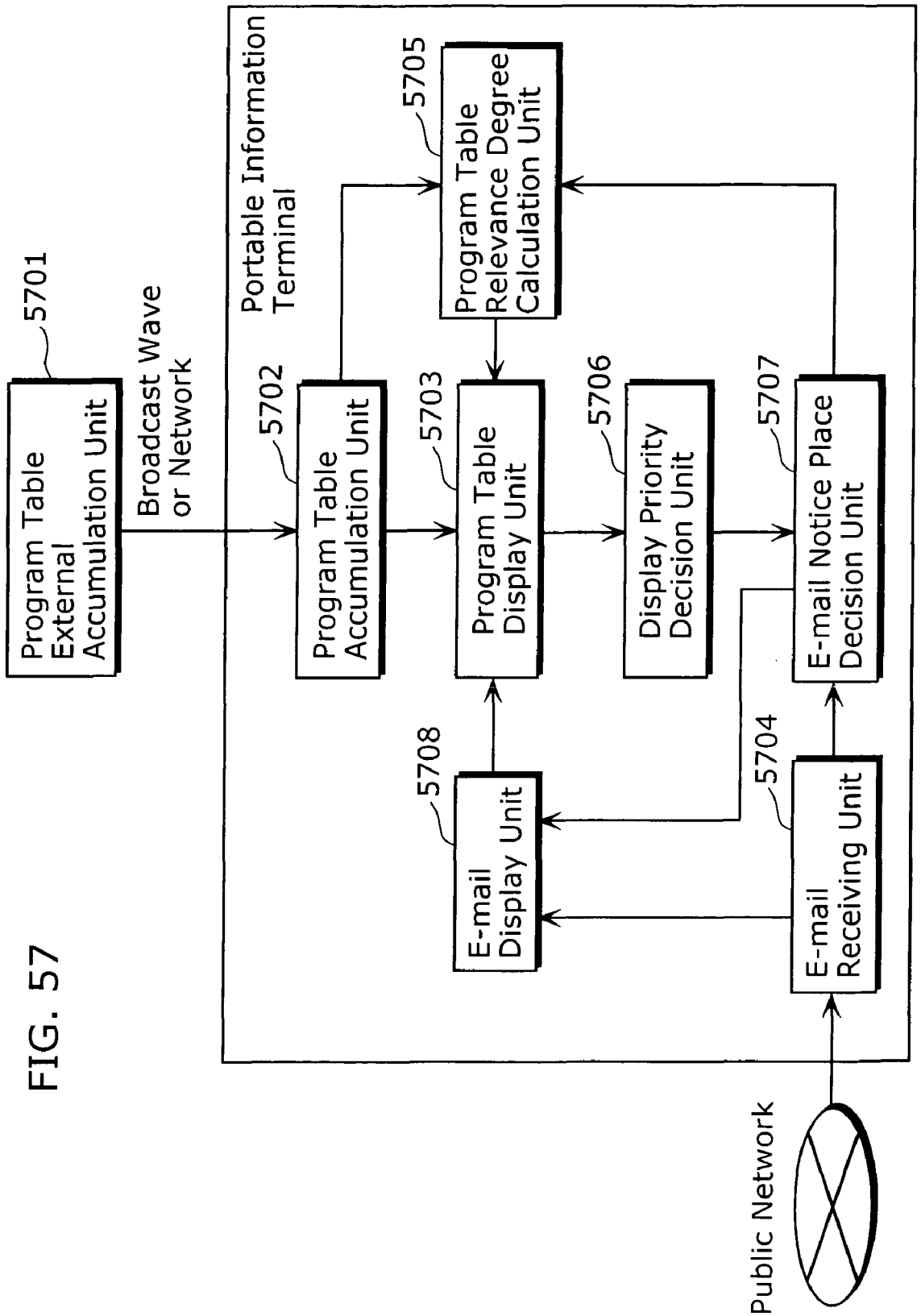
FIG. 57 is a block diagram of a program distribution system according to the eighth embodiment of the present invention.

FIG. 57 is a block diagram of a program distribution system according to the eighth embodiment of the present invention. This program distribution system is a system which distributes a program, a program table representing a schedule table, and the like, to a portable information terminal via broadcast waves or a communication network. The program distribution system includes a program table external memory unit 5701, a program table accumulation unit 5702, a program table display unit 5703, an e-mail receiving unit 5704, a program table relevance degree calculation unit 5705, a display priority decision unit 5706, an e-mail notice place decision unit 5707, and an e-mail display unit 5708. Here, the program table external memory unit 5701, the program table accumulation unit 5702, the program table display unit 5703, the e-mail receiving unit 5704, the e-mail notice place decision unit 5707, and the e-mail display unit 5708 correspond to the same name units described in the fifth embodiment, so that details of these units are not described again in the eighth embodiment.

Figure 58:
FIG. 58 is a diagram showing a display priority of each cell in the program table.

The program table relevance degree calculation unit 5705 compares (i) text information of electronic mail received by the e-mail receiving unit 5704, with (ii) text information displayed in a display terminal, in order to detect identical information in the both text information. Then, a relevance degree between the received text information and each cell in the displayed table is calculated. For example, if indication of the text information of the electronic mail is regarding a theme song of a program whose information is displayed in the program table, an identical part exists in both of the text information in the electronic mail and the text information in the cell. In such case, the program table relevance degree calculation unit 5705 supposes that the received text information has particular relevance to a particular cell. More specifically, when the program table as shown in FIG. 58 is displayed, if an advertisement mail regarding theme music of a program "Robot Gacchan", the received mail is supposed to have a high relevance degree to a cell positioned in the upper right corner of the program table.

The display priority decision unit 5706 decides a display priority of each cell, based on the relevance degree to the program information, calculated by the program table relevance degree calculation unit 5705. In other words, this display priority decision unit 5706 is one example of a second priority decision unit which decides a priority of displaying program information in each cell. In the example of FIG. 58, when a program priority of each cell is calculated as shown in a left-hand diagram, if the mail regarding "Robot Gacchan" theme music is received, a display priority of a cell in the upper right corner is increased twice, while display priorities of cells around the cell is reduced by half. In this way, when information related to a displayed cell is obtained, a display priority of the cell is modified.

Here, the e-mail notice place decision unit 5707 displays the text information of the electronic mail as shown in FIG. 59, based on the display priority decided by the display priority decision unit 5706.

With the above structure, when electronic mail is received, if information related to the electronic mail is displayed in a cell in the information terminal, indication of the electronic mail can be displayed without hiding the related information in the cell.

Figure 60:
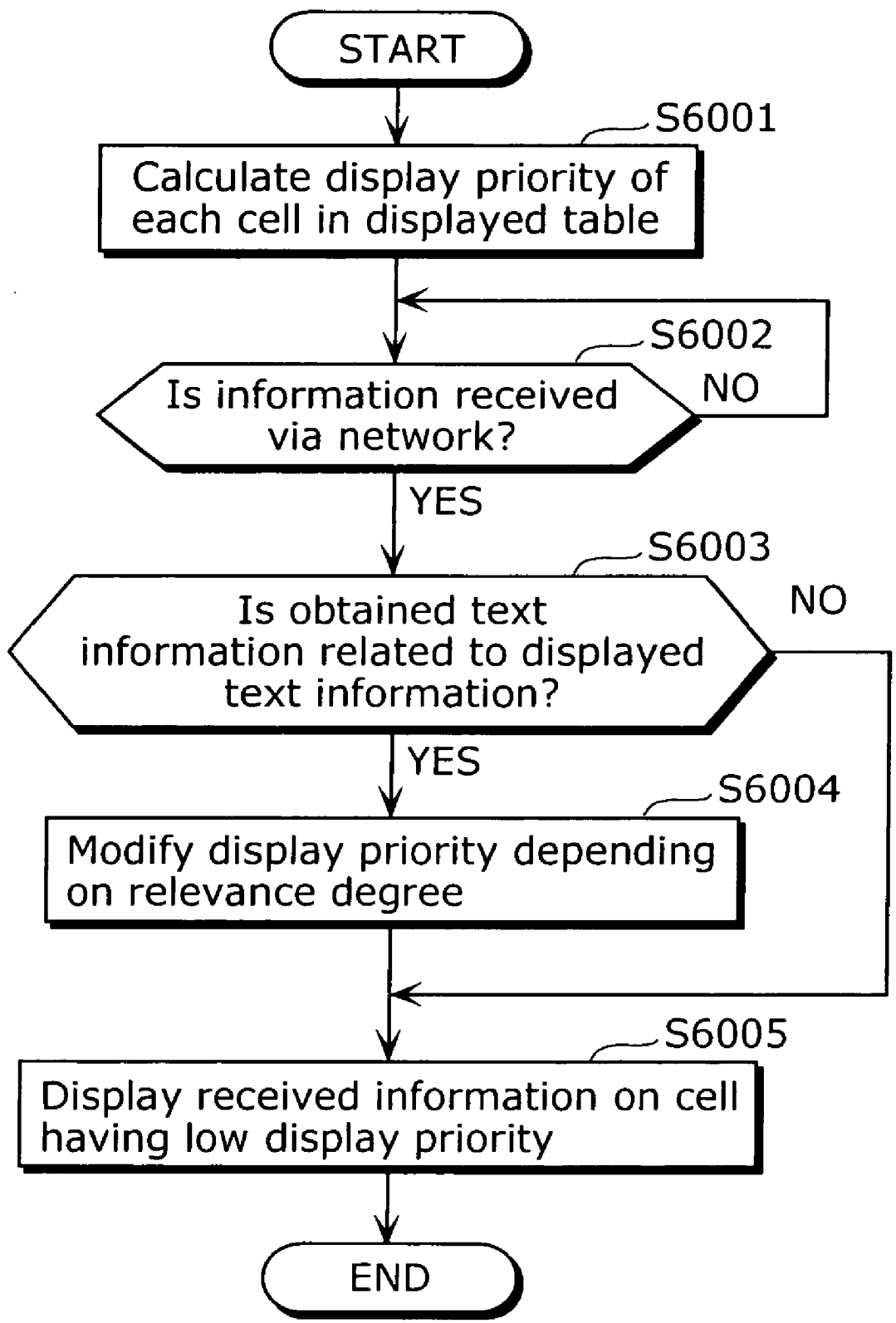
FIG. 60 is a flowchart showing processing performed by a portable information terminal in the program distribution system.

Next, processing performed by the portable information terminal in the program distribution system having the above structure according to the eighth embodiment is described with reference to a flowchart of FIG. 60.

Firstly, the display priority decision unit 5706 calculates a display priority of each cell in the displayed table in the terminal (S6001). This step is repeated until electronic mail is received via a network, and when electronic mail is received, then the processing proceeds to a next step (S6002). The program table relevance degree calculation unit 5705 judges whether or not there is an identical part, such as a title, between (i) text information of the electronic mail obtained by the e-mail receiving unit 5704 and (ii) text information of each cell displayed by the program table display unit 5703, in order to judge a relevance degree between the electronic mail and each cell (S6003). If the relevance degree is high, for example, if it is judged that the electronic mail and the program information have the same program title, then the processing proceeds to Step S6004, and the display priority decision unit 5706 calculates display priorities of cells again (S6004). On the other hand, if the relevance degree is low, for example, if it is judged that the titles of the electronic mail and the program information are not same, then the processing proceeds to Step S6005. The e-mail notice place decision unit 5707 selects a cell having a low display priority, and displays the text information of the electronic mail on the selected cell (S6005).

As a result of the above-described processing, when electronic mail related to the program table is received, if information related to the mail is displayed in the program table, the indication of the electronic mail can be displayed near the cell without hiding the cell. Thereby, it is possible to compare the received information with the displayed information in the table, to be checked. Especially, in a system for providing service of downloading music regarding programs, it is possible to download music during confirming information of the program.

Note that, in the eight embodiment, the relevance of the electronic mail to each cell is supposed, using a relevance degree between the text information of the received electronic mail and the text information of each cell in the displayed program table. Alternatively or additionally, however, the relevance degree to each piece of program information may be estimated, based on meta-information of the electronic mail, which includes a program ID, a channel number, a name of a broadcasting station, a time, and the like, in the program table.

Although the first to eight embodiments of the present invention have been described in detail above, those skilled in the art will be readily appreciate that many modifications and combinations are possible in the exemplary embodiments without materially departing from the novel teachings and advantages of the present invention. Accordingly, all such modifications and combinations are intended to be included within the scope of the present invention.

For example, the portable information terminal according to the first and second embodiments may has a function of receiving and displaying electronic mail which is described in the third to eighth embodiments. This means that the portable information terminal may have the information obtainment unit which obtains information via a communication network, and the table display unit which displays communication information obtained from the outside, on a low-priority cell among the cells included in the displayed table. More practically, one of the first and second embodiments may be combined with one of the third to eighth embodiments to realize the present invention.

INDUSTRIAL APPLICABILITY

The present invention is useful as a display apparatus which displays a schedule table, such as a program table or a time table, and especially as a display apparatus having a small-sized display screen, such as a portable telephone, a PDA, or a television set.

What is claimed is:

1. A display apparatus for displaying information in a program table, the program table including pieces of program information, each of the pieces of program information being specified by a time slot and a channel, said display apparatus comprising:
    a program table accumulation unit in which a program table including information of already broadcast programs is accumulated in a past program table;
    a first priority decision unit operable to decide a priority for displaying each of the pieces of program information in the program table by (i) comparing (a) the past program table having the information of the already broadcast programs accumulated in said program table accumulation unit, with (b) a future program table having information of programs to be broadcast in the future, (ii) judging whether or not there is a change between (a) the past program table having the information of the already broadcast programs and (b) the future program table having the information of the programs to be broadcast in the future, the change corresponding to a difference in information in a time slot and channel common to both the past program table and the future program table, and (iii) deciding a high priority for a piece of program information in the program table specified by the time slot and channel having the change;
    a time-slot-and-channel decision unit operable to decide, from among the time slots and the channels that specify the pieces of program information in the program table, a time slot and a channel which include a high-priority piece of program information decided by said first priority decision unit;
    a table display unit operable to create and display a displayed part of the program table which includes an area having the high-priority piece of program information specified by the decided time slot and channel; and
    an information obtainment unit operable to obtain communication information via a communication network,
    wherein said table display unit is further operable to display the obtained communication information on an area of the program table having a low-priority piece of program information, from among pieces of program information in the displayed part of the program table.

2. The display apparatus according to claim 1,
    wherein in said program table accumulation unit, program tables including information of already broadcast programs for at least the past two weeks are accumulated, and
    said first priority decision unit is further operable to (i) compare plural pieces of program information specified by a time slot and channel common to a program table of two weeks ago, a program table of one week ago, and a program table of a current week, and (ii) to decide a low-priority for program information in the program table of the current week when the program information is different from the corresponding program information in the program table of one week ago, and is the same as the corresponding program information in the program table of two weeks ago.

3. A display method of displaying information in a program table, the program table including pieces of program information, each of the pieces of program information being specified by a time slot and a channel, said display method comprising:
    accumulating, in a past program table, information of already broadcast programs;
    deciding a priority for displaying each of the pieces of program information in the program table, by (i) comparing (a) the past program table having the information of the already broadcast programs accumulated in said accumulating, with (b) a future program table having information of programs to be broadcast in the future, (ii) judging whether or not there is a change between (a) the past program table having the information of the already broadcast programs and (b) the future program table having the information of the programs to be broadcast in the future, the change corresponding to a difference in information in a time slot and channel common to both the past program table and the future program table, and (iii) deciding a high priority for a piece of program information in the program table specified by the time slot and channel having the change;

deciding, from among the time slots and the channels that specify the pieces of program information in the program table, a time slot and a channel which include a high-priority piece of program information decided in said deciding of the priority;

creating and displaying a displayed part of the program table which includes an area having the high-priority piece of program information specified by the decided time slot and channel; and obtaining communication information via a communication network, wherein in said displaying, the obtained communication information is displayed on an area of the program table having a low-priority piece of program information, from among pieces of program information in the displayed part of the program table.

4. A computer program being stored upon on a computer-readable recording medium and used in a display apparatus for displaying information in a program table, the program table including pieces of program information, each of the pieces of program information being specified by a time slot and a channel, said computer program causing a computer to execute a display method comprising:

accumulating, in a past program table, information of already broadcast programs;

deciding a priority for displaying each of the pieces of program information in the program table, by (i) comparing (a) the past program table having the information of the already broadcast programs accumulated in said accumulating, with (b) a future program table having information of programs to be broadcast in the future, (ii) judging whether or not there is a change between (a) the past program table having the information of the already broadcast programs and (b) the future program table having the information of the programs to be broadcast in the future, the change corresponding to a difference in information in a time slot and channel common to both the past program table and the future program table, and (iii) deciding a high priority for a piece of program information in the program table specified by the time slot and channel having the change;

deciding, from among the time slots and the channels that specify the pieces of program information in the program table, a time slot and a channel which include a high-priority piece of program information decided in said deciding of the priority;

creating and displaying a displayed part of the program table which includes an area having the high-priority piece of program information specified by the decided time slot and channel; and obtaining communication information via a communication network, wherein in said displaying, the obtained communication information is displayed on an area of the program table having a low-priority piece of program information, from among pieces of program information in the displayed part of the program table.

* * * * *